United States Patent
Martin et al.

(10) Patent No.: US 7,920,841 B2
(45) Date of Patent: Apr. 5, 2011

(54) ALARM SYSTEM WITH TWO-WAY VOICE

(75) Inventors: Jean-Paul Martin, Oakton, VA (US); Stephen Scott Trundle, Falls Church, VA (US); David Saul Goldfarb, Arlington, VA (US); David James Hutz, Herndon, VA (US)

(73) Assignee: Alarm.com Incorporated, Vienna, VA (US)

( * ) Notice: Subject to any disclaimer, the term of this patent is extended or adjusted under 35 U.S.C. 154(b) by 794 days.

(21) Appl. No.: 11/871,920

(22) Filed: Oct. 12, 2007

(65) Prior Publication Data

US 2008/0311878 A1 Dec. 18, 2008

Related U.S. Application Data

(60) Provisional application No. 60/944,392, filed on Jun. 15, 2007, provisional application No. 60/946,586, filed on Jun. 27, 2007.

(51) Int. Cl.
*H04M 11/04* (2006.01)

(52) U.S. Cl. .................. 455/404.1; 340/825.37

(58) Field of Classification Search .................. None
See application file for complete search history.

(56) References Cited

U.S. PATENT DOCUMENTS

| | | | |
|---|---|---|---|
| 4,918,717 A | 4/1990 | Bissonnette et al. | |
| 5,629,687 A | 5/1997 | Sutton et al. | |
| 6,175,307 B1 * | 1/2001 | Peterson | 340/531 |
| 6,658,091 B1 | 12/2003 | Naidoo et al. | |
| 7,046,985 B2 | 5/2006 | Seales et al. | |
| 7,106,193 B2 | 9/2006 | Kovach | |
| 7,133,511 B2 | 11/2006 | Buntin et al. | |
| 2005/0134450 A1 * | 6/2005 | Kovach | 340/506 |
| 2005/0242948 A1 | 11/2005 | Tarr | |
| 2006/0256789 A1 | 11/2006 | Otto et al. | |
| 2008/0012760 A1 * | 1/2008 | Derrick et al. | 342/357.07 |
| 2008/0293374 A1 * | 11/2008 | Berger | 455/404.2 |

OTHER PUBLICATIONS

USPTO Non-Final Office Action issued in U.S. Appl. No. 11/871,941, mailed Sep. 22, 2010, 21 pages.
USPTO Non-Final Office Action issued in U.S. Appl. No. 11/871,943, mailed Sep. 21, 2010, 11 pages.
U.S. Patent Examiner Mirza F. Alam, Non-Final Office Action issued Jan. 28, 2011 in U.S. Appl. No. 11/871,936, 21 pages.

* cited by examiner

*Primary Examiner* — Erika A Gary
(74) *Attorney, Agent, or Firm* — Fish & Richardson P.C.

(57) ABSTRACT

Techniques are described for establishing a two-way voice communication session with an alarm system. The alarm system may establish a two-way voice communication session with an operator associated with a monitoring service that provides monitoring services for alarm events detected by the alarm system. The alarm system also may establish a two-way voice communication session with a notification recipient that is interested in receiving notifications associated with events detected by the alarm system.

39 Claims, 19 Drawing Sheets

ALARM SYSTEM WITH TWO-WAY VOICE

CROSS REFERENCE TO RELATED APPLICATIONS

The present application claims priority to U.S. Provisional Application No. 60/944,392, filed Jun. 15, 2007, and U.S. Provisional Application No. 60/946,586, filed Jun. 27, 2007, the contents of each are incorporated herein by reference in their entirety.

TECHNICAL FIELD

This disclosure relates to alarm systems.

BACKGROUND

Many people equip homes and businesses with alarm systems to provide increased security for their homes and businesses. Alarm systems may include control panels that a person may use to control operation of the alarm system and sensors that monitor for security breaches. In response to an alarm system detecting a security breach, the alarm system may generate an audible alert and, if the alarm system is monitored by a monitoring service, the alarm system may send electronic data to the monitoring service to alert the monitoring service of the security breach.

SUMMARY

In one aspect, establishment of a voice communication session is coordinated between an alarm system and an operator handling an alarm event for the alarm system. Alarm data is received that is transmitted over a wireless data channel by a wireless communication module included in an alarm system in response to the alarm system detecting an alarm event. The alarm data indicates the alarm event. An operator is enabled to handle the alarm event based on the received alarm data and voice communication information associated with the wireless communication module included in the alarm system is accessed. A voice communication session, over a wireless voice channel that is decoupled from the wireless data channel, is established between a communication device used by the operator handling the alarm event and the wireless communication module included in the alarm system based on the accessed voice communication information.

Implementations may include one or more of the following features. For example, a call from the wireless communication module may be received over the wireless voice channel, and a number associated with the wireless communication module may be identified based on the received call. In this example, an operator handling the alarm event may be identified based on the identified number, a number associated with the communication device used by the operator may be accessed, and the received call may be routed to the communication device used by the operator based on the accessed number.

In some implementations, a phone number associated with the wireless communication module may be accessed, and a call may be placed to the wireless communication module over the wireless voice channel. In other implementations, confirmation information may be transmitted to the wireless communication module over the wireless data channel in response to receiving the alarm data, and a call from the wireless communication module may be received over the wireless voice channel. The call may be placed by the wireless communication module in response to receiving the confirmation information. In these implementations, a number associated with the received call may be accessed, and an operator handling the alarm event may be identified based on the identified number. A number associated with the communication device used by the operator may be accessed, and the received call may be routed to the communication device used by the operator based on the accessed number.

In some examples, it may be determined that the alarm system includes a two-way voice feature based on the received alarm data. In response to determining that the alarm system includes the two-way voice feature, processing of the received alarm data may be delayed for a predetermined and configurable amount of time, and an incoming call associated with the alarm data may be monitored for during the predetermined and configurable amount of time. A call from the wireless communication module may be received over the wireless voice channel while monitoring for the incoming call, and a number associated with the received call may be identified. It may be identified that the received call is associated with the received alarm data, an operator to handle the alarm event may be identified, the received call may be routed to a first communication device used by the identified operator, and the alarm data may be routed to a second communication device used by the identified operator.

A command to initiate a voice call may be transmitted to the wireless communication module. The command may be transmitted in response to user input entered by the operator handling the alarm event. A call from the wireless communication module may be received over the wireless voice channel. The call may be placed by the wireless communication module in response to receiving the command to initiate the call. A number associated with the received call may be identified, and an operator handling the alarm event may be identified based on the identified number. A number associated with the communication device used by the operator may be accessed, and the received call may be routed to the communication device used by the operator based on the accessed number.

In some implementations, it may be determined that the alarm system includes a two-way voice feature based on the received alarm data, and a command to initiate a voice call may be transmitted to the wireless communication module in response to determining that the alarm system includes the two-way voice feature. A call from the wireless communication module may be received over the wireless voice channel. The call may be placed by the wireless communication module in response to receiving the command to initiate the call, and a number associated with the received call may be identified. An operator handling the alarm event may be identified based on the identified number, a number associated with the communication device used by the operator may be accessed, and the received call may be routed to the communication device used by the operator based on the accessed number.

The alarm system may be a security system installed in a building. The security system may be configured to receive a signal from at least one sensor and detect an alarm event based on the received signal. A voice communication session may be established with the security system to enable the operator to listen in on an area in the building and communicate with a person who is in the area in the building.

Implementations of the described techniques may include hardware, a method or process, or computer software on a computer-accessible medium. The details of one or more implementations are set forth in the accompanying drawings and the description below. Other features will be apparent from the description and drawings.

DETAILED DESCRIPTION

Figure 1:
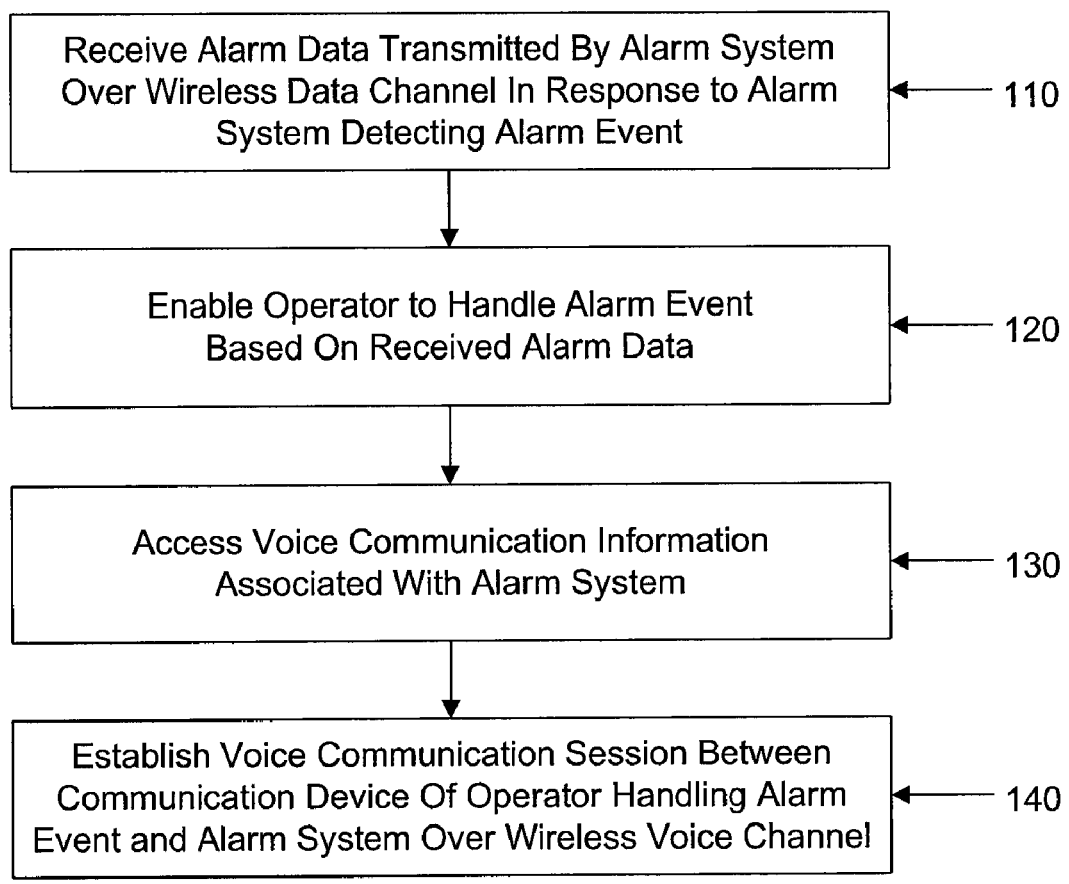
FIG. 1 is a flow chart illustrating an example of a process for establishing a voice communication session between an alarm system and an alarm operator.

Techniques are provided for establishing a voice communication session with an alarm system. In some implementations, two-way voice communications are provided between a central monitoring station or a notification recipient and an alarm system (e.g., a security system in residence) that is not connected to a traditional phone line or one for which the phone line is disabled. In these implementations, the alarm system is configured to transmit data over a wireless data channel and establish a two-way voice communication session with the central monitoring station or notification recipient over a wireless voice channel that is separate and distinct from the wireless data channel.

In one particular implementation, an alarm system (e.g., a security system installed in a residence or commercial building that includes one or more control panels) detects an alarm event (e.g., a security breach or emergency condition). The alarm system may include one or more sensors (e.g., contact sensors, motion sensors, glass breaker sensors, temperature sensors, smoke sensors, carbon monoxide sensors, panic button sensors, etc.) and may detect an alarm event based on a signal sent from the one or more sensors. For example, when the alarm system is in an armed mode, the alarm system may detect an intruder entering a building in response to receiving a signal from a contact sensor provided on a door to the building.

In some implementations, the alarm system may be configured for remote monitoring by a monitoring system (e.g., a central monitoring station alone or in combination with an intermediary alarm server). In these implementations, the alarm system is configured to transmit data to the monitoring system in response to detecting an alarm event.

For example, the alarm system may include a wireless communication module and the wireless communication module may be configured to wirelessly transmit alarm data indicating the alarm event (e.g., data identifying the alarm system, a customer account number, other information about the alarm system or customer, a type of alarm event, a sensor giving rise to the alarm event, or other information about the alarm event) to the monitoring system. In this example, the wireless communication module may be configured to transmit the alarm data over a wireless data channel (e.g., Global System for Mobile communications (GSM)/General Packet Radio Service (GPRS) data channel, a Code Division Multiple Access (CDMA) data channel or data carrying mechanism, an Enhanced Data Rates for GSM Evolution (EDGE) or Enhanced GPRS (EGPRS) data channel, an Evolution-Data Optimized or Evolution-Data only (EV-DO or EVDO) data channel, a Universal Mobile Telecommunications System (UMTS) data channel, any type of Internet Protocol (IP) based wireless protocol, a cellular control channel, etc.). The wireless data channel may or may not be able to transmit voice communications or establish voice communication sessions. Transmission of alarm data over the wireless data channel may provide increased reliability, quality, and speed over transmission of alarm data over a wireless voice channel (e.g., a GSM voice channel, a cellular voice channel, etc.) and may reduce the need of an owner of the alarm system to maintain a wired telephone line (e.g., a plain old telephone service (POTS) line). In one example described above, when the alarm system detects an intruder entering a building, a wireless communication module included in the alarm system may send alarm data to the monitoring system over a GSM/GPRS data channel. The alarm data may include a customer account number associated with the alarm system and information indicating an intruder detection.

The monitoring system may receive the alarm data over the wireless data channel and enable an operator to handle the alarm event based on the received alarm data. In one example, the monitoring system may include a central monitoring system alone. In this example, the central monitoring system receives the alarm data directly from the wireless communication module over the wireless data channel and queues the alarm data for processing by the next available operator.

In another example, the monitoring system may include a central monitoring system and an intermediary alarm server. In this example, the intermediary alarm server may receive the alarm data directly from the wireless communication module over the wireless data channel, convert or reformat the alarm data (e.g., convert the alarm data to a digital dialer signal or to a format or type accepted by the central monitoring station), and transmit the alarm data to the central monitoring station. When an operator at the central monitoring station is assigned to handle the alarm data, the operator may handle the alarm event by determining more information associated with the alarm event, dispatching emergency services, or performing other services that may assist in handling the alarm event. For instance, in the example described above, when an operator at a central monitoring station is assigned to handle the alarm data transmitted over the GSM/GPRS data channel by the wireless communication module in response to the alarm system detecting an intruder, the operator may determine that the alarm event is an intruder event based on the alarm data and attempt to determine more information associated with the intruder event. The operator also may determine a physical location of the building associated with the alarm system based the customer account number included in the alarm data and dispatch emergency services to the physical location.

In some implementations, the monitoring system and the alarm system coordinate to establish a two-way voice communication session (e.g., an intercom-like connection with a speaker and microphone associated with the alarm system) between the operator handling the alarm event at the central monitoring station and the alarm system. For example, the monitoring system and the alarm system may coordinate to establish a two-way voice communication session over a wireless voice channel (e.g., a GSM voice channel, a cellular voice channel, etc.). In implementations in which the alarm system transmits alarm data over the wireless data channel, coordination between the monitoring system and the alarm system to establish the two-way voice communication session with a device associated with the operator handling the alarm event at the central station may be required because the wireless voice channel is different from (e.g., separate, distinct, unrelated, decoupled, etc.) the wireless data channel. In these implementations, the alarm system may achieve high reliability in transmission of alarm data and provide two-way voice communication services without having to maintain a POTS telephone line. In the example described above, a device at the central monitoring station associated with the operator handling the intruder event and the alarm system may establish a two-way voice communication session over a GSM voice channel. The two-way voice communication session allows the operator to listen in on the intruder event through a microphone included in the alarm system and speak to individuals proximate to the intruder event through a speaker included in the alarm system. Listening in on the intruder event and communicating with individuals proximate to the intruder event may enable the operator to determine whether the detected event is a real event or a false alarm and may enable the operator to determine special circumstances associated with the intruder event (e.g., the intruder is still present, individuals are injured and need medical attention, etc.)

In one example, the central monitoring station may be configured to transmit a confirmation signal to the alarm system in response to receiving alarm data and the wireless communication module included in the alarm system may be configured to place a voice call to the central monitoring station in response to receiving the confirmation. In this example, the confirmation signal may include the telephone number of the central monitoring system or the alarm system may access, from electronic storage, the telephone number to call in response to receiving the confirmation signal. The central monitoring station may be configured to route the wireless voice call to the operator handling the previously received alarm data by identifying the alarm system or customer associated with the alarm system and identifying the operator handling alarm data associated with the identified alarm system or customer. For example, the central monitoring station may identify the phone number of the wireless voice call from the alarm system using automatic number identification (ANI) or Dialed Number Identification Service (DNIS), determine a customer account number associated with the identified phone number, and route the call to an operator handling an alarm event associated with the customer account number to establish a two-way voice communication session.

In another example, the alarm system may wait a predetermined and configurable amount of time (e.g., fifteen seconds) after sending the alarm data over the wireless data channel prior to placing the voice call to central monitoring station over the wireless voice channel. The predetermined amount of time may be configurable such that the predetermined amount of time may be set or changed by an operator or system administrator in controlling the alarm system. Further, the predetermined amount of time may be dynamically configurable based on current operating conditions of the alarm system communications network.

In yet another example, the central monitoring station may, upon receipt of alarm data, determine whether the alarm system sending the alarm data has a two-way voice feature, hold the alarm data (at least temporarily) until a wireless voice call is received from the alarm system conditioned on determining that the alarm system has a two-way voice feature, and route the alarm data and the wireless voice call received to an operator upon receipt of the wireless voice call. In this example, the voice call may be answered by the next available operator and the alarm data may be presented to the operator who answered the voice call. In a further example, the central monitoring station may transmit a command to the alarm system to initiate the wireless communication module included in the alarm system to place a wireless voice call to the central monitoring station or may access a phone number for the wireless communication module included in the alarm system and place a call to the wireless communication module.

In some implementations, the technology used to perform two-way voice services with alarm systems over wired phone lines (e.g., POTS phone lines) may be leveraged to provide two-way voice services over a wireless voice channel. For example, central monitoring stations connected to alarm systems using POTS phone lines may route two-way voice calls to an appropriate operator based on a shelf/slot number associated with the physical phone line connection at the central monitoring station. In some examples, central monitoring stations may assign shelf/slot numbers to extensions or identifiers for incoming wireless phone calls (e.g., private branch exchange (PBX) extensions) such that shelf/slot numbers may be associated with incoming wireless voice calls. Central monitoring stations may allocate a pool of shelf/slot numbers for wireless phone numbers (e.g., PBX extensions) to an intermediary alarm server. In these implementations, the intermediary alarm server may coordinate provision of alarm data, received from an alarm system over a wireless data channel, to a central monitoring station and establishment of a two-way voice communication session, over a wireless voice channel, between the central monitoring station and the alarm system by leveraging the technology used by the central monitoring station to perform two-way voice services with alarm systems over wired phone lines. For example, the intermediary alarm server receives alarm data from the alarm system over a wireless data channel. In response to receiving the alarm data, the intermediary alarm server assigns the alarm data an available shelf/slot number from among its allocated pool of shelf/slot numbers corresponding to wireless phone numbers (e.g., PBX extensions) associated with the central monitoring station. The intermediary alarm server generates a signal that enables identification of the alarm data and the assigned shelf/slot number and transmits the generated signal to the central monitoring station. In response to receiving the signal, the central monitoring station associates the alarm data with the assigned shelf/slot number such that calls placed to the wireless phone number (e.g., PBX extension) associated with the assigned shelf/slot number will be routed to an operator handling the alarm data using the same technology used to route two-way voice communication sessions established over wired phone lines (e.g., POTS phone lines). The intermediary alarm server also transmits the telephone number associated with the assigned shelf/slot number to the alarm system. In response to receiving the telephone number, the alarm system places a call over a wireless voice channel to the phone number associated with the assigned shelf/slot number. Because the intermediary alarm server transmitted the alarm data to the central station in a manner that enables identification of the assigned shelf/slot number, the wireless voice call from the alarm system to the telephone number associated with the assigned shelf/slot number is routed to an operator handling the previously transmitted alarm data using the same software used to provide two-way voice for wired phone lines. These implementations may provide cost effective solutions because modifications to central monitoring station technology and wireless communication modules included in alarm systems may be unnecessary.

In other implementations, central monitoring stations may allocate a pool of pairs of PBX extension identifiers and associated PBX phone numbers to an intermediary alarm server. In these implementations, the intermediary alarm server may coordinate provision of alarm data, received from an alarm system over a wireless data channel, to a central monitoring station and establishment of a two-way voice communication session, over a wireless voice channel, between the central monitoring station and the alarm system using the PBX extension identifiers. For example, the intermediary alarm server receives alarm data from the alarm system over a wireless data channel. In response to receiving the alarm data, the intermediary alarm server appends to the alarm data an available PBX extension identifier from among its allocated pool of PBX extension identifiers associated with the central monitoring station. The intermediary alarm server generates a signal that enables identification of the alarm data and the assigned PBX extension identifier and transmits the generated signal to the central monitoring station. In response to receiving the signal, the central monitoring station associates the alarm data with the assigned PBX extension identifier and provides the assigned PBX extension identifier with the alarm data to an operator. The intermediary alarm server also transmits the telephone number associated with the assigned PBX extension identifier to the alarm system. In response to receiving the telephone number, the alarm system places a call over a wireless voice channel to the phone number associated with the assigned PBX extension identifier. Because the central monitoring station provides the assigned PBX extension identifier with the alarm data to the operator, the operator may answer the call, from the alarm system, to the phone number associated with the assigned PBX extension identifier and establish a two-way voice communication session with the alarm system over the wireless voice channel.

In some implementations, an alarm system may be configured to establish a two-way voice communication session with a notification recipient (e.g., an owner of alarm system) rather than or in addition to an operator at a central monitoring station. Establishing a two-way voice communication session with a notification recipient may enable the notification recipient to better monitor the notification recipient's building (e.g., residence or commercial establishment) and may enable the notification recipient to respond to and assist in events detected by the alarm system that may not give rise to notification of an operator at a central monitoring station. For example, an alarm system may detect a medicine cabinet opening. The alarm system may transmit event data indicating that the medicine cabinet has been opened to an alarm server over a wireless data channel. The alarm system or the alarm server may determine that detection of the medicine cabinet opening does not warrant alerting an operator at a central monitoring station of the event, but that a notification recipient should be notified. In this example, the alarm server receives, from the alarm system, the data indicating that the medicine cabinet has been opened. The alarm server identifies a notification recipient for this event. For example, the alarm server may identify the customer associated with the alarm system that sent the event data and identify the owner of the alarm system as the notification recipient. In other examples, multiple recipients may be associated with an alarm system and a particular notification recipient or multiple notification recipients may be selected based on the type of event. In response to identifying the notification recipient, the alarm server facilitates establishment of a two-way voice communication session, over a wireless voice channel, with the alarm system and an electronic device associated with the notification recipient. For example, a two-way voice communication session may be established between the alarm system and a cellular telephone associated with the notification recipient. In this example, the notification recipient may be able to communicate with individuals in an area around the medicine cabinet to determine more information associated with the event. For instance, the notification recipient may establish a two-way voice communication session with the alarm system, determine that the recipient's grandmother opened the medicine cabinet, and ask the grandmother if she took the correct medication to ensure that a medical emergency does not arise.

Implementations in which an alarm system is configured to transmit data over a wireless data channel and establish a two-way voice communication session with a central monitoring station or notification recipient over a wireless voice channel that is decoupled from the wireless data channel may provide benefits of transmitting data over the wireless data channel and benefits of transmitting two-way voice communications over the wireless voice channel. In particular, a wireless voice channel may be a communication medium a service provider or carrier uses to transmit voice communications and a wireless data channel may be a communication medium a service provider or carrier uses to transmit data communications. For example, a service provider implementing a GSM/GPRS communication system may allocate a particular frequency band in the GSM/GPRS spectrum for a wireless voice channel and a different frequency band in the GSM/GPRS spectrum for a wireless data channel. In this example, the wireless voice channel may be configured to handle voice calls and, therefore, sending voice data through the wireless voice channel may include processing operations such as digitization, compression, and encoding to optimize voice communications transmitted over the wireless voice channel. In some implementations, processing data for transmission over a wireless voice channel may include sampling an analog waveform and transmitting sampled data over the wireless voice channel. In these implementations, to transmit digital data (e.g., alarm data) over the wireless voice channel, the digital data is converted to an analog waveform, sampled, and the sampled data is transmitted over the wireless voice channel. Further, in these implementations, the sampled data is received over the wireless voice channel and the analog waveform is reconstructed based on the received sampled data. To obtain the digital data (e.g., alarm data), the reconstructed analog waveform is converted into a digital format. Accordingly, digital data received over a wireless voice channel may have integrity problems and data may be lost because of the sampling, conversion, and other operations (e.g., compression, packet routing, and encoding) required to transmit the digital data over the wireless voice channel.

On the other hand, a wireless data channel may be optimized for data transmission. Accordingly, sending data over the wireless data channel may not include the same processing operations as sending data over the wireless voice channel. In particular, processing data for transmission over a wireless data channel may not include sampling an analog waveform and transmitting sampled data, but, instead, may include transmitting a direct representation of the digital data (e.g., alarm data) over the wireless data channel. In these implementations, the direct representation of the digital data is received over the wireless data channel and the digital data may be received without substantial integrity problems and without loss.

Because transmission of data over the wireless voice channel includes substantial processing operations, includes sampling an analog signal, and requires more information in each packet, digital data (e.g., alarm data) may not be transmitted as accurately or as quickly over the wireless voice channel as the wireless data channel. Moreover, because the wireless data channel does not include substantial voice processing operations, does not include sampling an analog waveform, and does not include as much information in a packet, transmission of voice communications over the wireless data channel may be more costly and require a significant amount of additional processing as compared to transmission of voice communications over the wireless voice channel. As such, by transmitting data over a wireless data channel and establishing a two-way voice communication session over a wireless voice channel that is decoupled from the wireless data channel, the benefits of both transmission of data over a wireless data channel and transmission of voice communications over a wireless voice channel may be realized.

FIG. 1 illustrates an example of a process 100 for establishing a voice communication session between an alarm system and an alarm operator. The operations in flow chart 100 are described generally as being performed by a processor. In some implementations, the processor may be included in an electronic device or system configured to send and receive communications over a network. For example, the processor may be included in an alarm server, a central monitoring station server, or another type of electronic device included in a system configured to monitor an alarm system. In another example, the operations of process 100 may be performed by multiple processors included in one or more electronic devices or systems.

The processor receives alarm data transmitted by an alarm system over a wireless data channel in response to the alarm system detecting an alarm event (110). For example, the processor may receive the alarm data in one or more electronic communications from a network. The alarm data included in the one or more electronic communications may include information associated with the alarm event. For instance, the alarm data may include information identifying the alarm system or the user associated with the alarm system that detected the alarm event and information describing or identifying the particular alarm event that the alarm system detected. In one implementation, the alarm system detects, based on a signal from a contact sensor, opening of a door in a building that the alarm system is monitoring. In this implementation, the alarm data may include information identifying the alarm system, the user of the alarm system, and the building being monitored by the alarm system. The alarm data also may include information identifying the type of alarm event (e.g., security breach) and the particular door that the alarm system detected as being opened.

In some implementations, the processor receives the alarm data directly from the alarm system over a wireless data channel. For example, the processor may be included in an electronic system that exchanges electronic communications over a wireless data channel. In this example, the processor may be included in an intermediary alarm server that communicates with the alarm system and provides information related to detected alarm events to a central monitoring station over a communication medium other than a wireless data channel. For instance, the intermediary alarm server may receive alarm data from the alarm system over the wireless data channel and forward the alarm data to a monitoring station over a POTS telephone line.

In other examples, the processor may be included in a monitoring station device that exchanges communications over a wireless data channel. In these examples, the alarm system may provide the alarm data directly to the monitoring station over the wireless data channel.

In further implementations, the processor receives, from a device other than the alarm system, the alarm data using a communication medium other than a wireless data channel. For example, the alarm system may transmit alarm data to an intermediary alarm server over a wireless data channel. The intermediary alarm server may receive the alarm data and forward the alarm data to another electronic device that includes the processor using a communication medium other than a wireless data channel. For instance, the intermediary alarm server may receive the alarm data over a wireless data channel and forward the alarm data, over a POTS telephone line, to a monitoring station that includes the processor. Accordingly, the processor receives the alarm data, originally transmitted over the wireless data channel by the alarm system, over the POTS telephone line. In these implementations, the intermediary alarm server may enable a user to use an alarm system that does not require a POTS telephone line with a monitoring station that requires a POTS telephone line. The intermediary alarm server may transform or convert the alarm data received over the wireless data channel to a format suitable for transmission over a POTS telephone line to the monitoring station.

As discussed above, the alarm system may transmit the alarm data over a wireless data channel that is optimized for digital data transmission and carries a direct representation of digital data (e.g., alarm data). For example, the alarm system may transmit the alarm data over a GSM/GPRS data channel, the alarm system may transmit the alarm data as IP packets over a wireless data channel configured to transport IP packets, or the alarm system may transport the alarm data as a Short Message Service (SMS) message over a wireless data channel configured to transport SMS messages.

The processor enables an operator to handle the alarm event based on the received alarm data (120). For example, the processor enables provision of the alarm data to an electronic device (e.g., a computer, a terminal, etc.) that an operator uses to handle alarm events. The electronic device may determine information associated with the alarm event based on the alarm data and render a display of the information to the operator handling the event. The information associated with the alarm event may include information identifying the type of alarm event, the user, alarm system, or building associated with the alarm event, the particular sensor giving rise to the alarm event, and any other information associated with the alarm event that may be useful to the operator in handling the alarm event. The operator may handle the alarm event based on the information. For instance, the operator may determine whether the alarm event is a real alarm event or a false alarm and the operator may dispatch emergency services to a building associated with the alarm event in response to determining that the alarm event is a real alarm.

In implementations in which the processor is included in an electronic device of a monitoring station, the processor may queue the alarm data for processing by a next available operator. The next available operator may access, from a queue, the alarm data associated with the alarm event and handle the alarm event based on the alarm data. By queuing the alarm data, the monitoring station may process alarm events in the order in which the alarm events occurred. In another example, the processor may assign an operator to handle the alarm event and transmit the alarm data to an electronic device associated with the operator. In this example, the electronic device associated with the operator may determine information associated with the alarm event based on the alarm data and render a display of the information to the operator handling the event to enable the operator to handle the alarm event as discussed above.

In implementations in which the processor is included in an electronic device of an intermediary alarm server, the processor may forward the alarm data to a monitoring service to enable an operator to handle the alarm event. In these implementations, the intermediary alarm server may provide information to the monitoring service to enable the operator to handle the alarm event. For example, the processor may determine information associated with the alarm event based on the alarm data and provide the determined information to the monitoring service. The processor also may format or convert the alarm data or information determined based on the alarm data to a format used by the monitoring service prior to forwarding the alarm data or the information to the monitoring service.

The processor accesses voice communication information associated with the alarm system (130). For example, the processor may access a telephone number associated with a wireless communication module included in the alarm system. The processor may access the telephone number from electronic storage or may access the telephone number based on a call received from the wireless communication module included in the alarm system.

In implementations in which the processor accesses the voice communication information from electronic storage, the processor may use the accessed information to place a call to the wireless communication module included in the alarm system. For example, the processor may access a telephone number for the wireless communication module included in the alarm system and render a display of the telephone number to an operator to enable the operator to place a call to the wireless communication module included in the alarm system. In another example, the processor may access the telephone number and automatically place a call to the wireless communication module and connect the call to an operator at a monitoring service. In further examples, the processor may use the accessed information to identify a call placed by the wireless communication module included in the alarm system to the monitoring station. For instance, the processor may access the voice communication information associated with the alarm system to identify a call received from the wireless communication module included in the alarm system such that the processor may route the call to an operator handling an alarm event associated with the alarm system. In some implementations, the processor may access voice communication information associated with the alarm system from electronic storage and transmit the accessed voice communication information to another electronic device.

In implementations in which the processor accesses voice communication information based on a call received from the wireless communication module included in the alarm system, the processor may use the accessed information to route the call to an operator handling the alarm event associated with the alarm system. For example, the processor may receive, over a wireless voice channel, a call from a wireless communication module included in the alarm system. The processor may identify a number or other information associated with the wireless communication module based on the received call and route the received call to an appropriate operator based on the identified number. The processor may identify the phone number of the wireless voice call from the wireless communication module using ANI, DNIS, or other similar techniques.

The processor establishes a voice communication session between a communication device of the operator handling the alarm event and the alarm system over a wireless voice channel (140). For example, the processor may establish a voice communication session that includes exchanging cellular voice communications over a wireless voice channel configured to transport cellular voice communications. The voice communication session may be an intercom-like, two-way voice communication session with the alarm system. The two-way voice communication session may enable an operator to listen-in to an area that is proximate to the sensor that caused detection of the alarm event or enable the operator to communicate with a person who is in an area proximate to the sensor. The processor may establish the voice communication session by facilitating placement of a call from the communication device of the operator to a wireless communication module included in the alarm system or by facilitating placement of a call from the wireless communication module included in the alarm system to the communication device of the operator.

For example, the wireless communication module may place a call that is routed to the communication device of the operator a predetermined and configurable amount of time after the alarm system detects the alarm event. In this example, the alarm system may transmit the alarm data prior to placing the call such that by waiting the predetermined amount of time (e.g., fifteen seconds, forty-five seconds, etc.) the intermediary alarm server or monitoring station may receive the alarm data prior to receiving the call. By receiving the alarm data prior to receiving the call, the intermediary alarm server or the monitoring station may ensure that the call is handled as a two-way voice call associated with an alarm event and that the call is routed to the operator handling the alarm event. The wireless communication module may place the call directly to the electronic communication device of the operator or may place the call to another device that routes the call to the communication device of the operator.

In other examples, the wireless communication module included in the alarm system may place a call that is routed to the communication device of the operator after receiving confirmation that alarm data transmitted by the alarm system has been received by an intermediary alarm server or a monitoring station. The confirmation may include voice communication information for the communication device of the monitoring station (e.g., a telephone number for the operator handling the alarm event) or the alarm system may maintain voice communication information for the monitoring station (e.g., a general telephone number for the monitoring station) in electronic storage. For instance, an intermediary alarm server may provide the alarm system with a phone number for an operator at a monitoring station that the alarm system may call to establish the voice communication session. In some implementations, the alarm system may maintain a general telephone number of a monitoring station that the alarm system calls each time an alarm event triggers a monitoring procedure. In these implementations, the monitoring station may receive a call, analyze properties of the call (e.g., using ANI or DNIS), identify an operator handling the alarm event associated with the alarm system that placed the call, and route the call to the appropriate operator.

The operator also may place a call from the communication device associated with the operator to the wireless communication module included in the alarm system. For example, the processor may, in response to receiving alarm data associated with the alarm system, access voice communication information for the wireless communication module included in the alarm system and render a display of the accessed voice communication information to the operator. In this example, the operator may use the voice communication information (e.g., a telephone number, etc.) to place a call to the wireless communication module included in the alarm system. The wireless communication module included in the alarm system receives the call to establish the voice communication session.

In some implementations, the processor establishes the voice communication session soon after the alarm system detects the alarm event. For example, the processor may establish the voice communication session in less than one minute after the alarm system detects the alarm event or less than fifteen seconds after the alarm system detects the alarm event. Establishing the voice communication session soon after the alarm system detects the alarm event may be beneficial because the voice communication session may enable the operator to quickly determine whether the alarm event is a real alarm event and provide prompt service in the event that the alarm event is a real alarm event and people are in need of immediate assistance.

As discussed above, the processor establishes the voice communication session over a wireless voice channel. The wireless voice channel may be a communication medium a service provider or carrier uses to transmit voice communications. Sending voice data through the wireless voice channel may include processing operations such as digitization, compression, and encoding to optimize voice communications transmitted over the wireless voice channel. In some implementations, processing data for transmission over a wireless voice channel may include sampling an analog waveform and transmitting sampled data over the wireless voice channel. In these implementations, the sampled data is received over the wireless voice channel and the analog waveform is reconstructed based on the received sampled data. The wireless voice channel is different from the wireless data channel over which the processor received the alarm data. By receiving alarm data over the wireless data channel and establishing the two-way voice communication session over a wireless voice channel that is decoupled from the wireless data channel, the benefits of both transmission of data over a wireless data channel and transmission of voice communications over a wireless voice channel may be realized.

Figure 2:
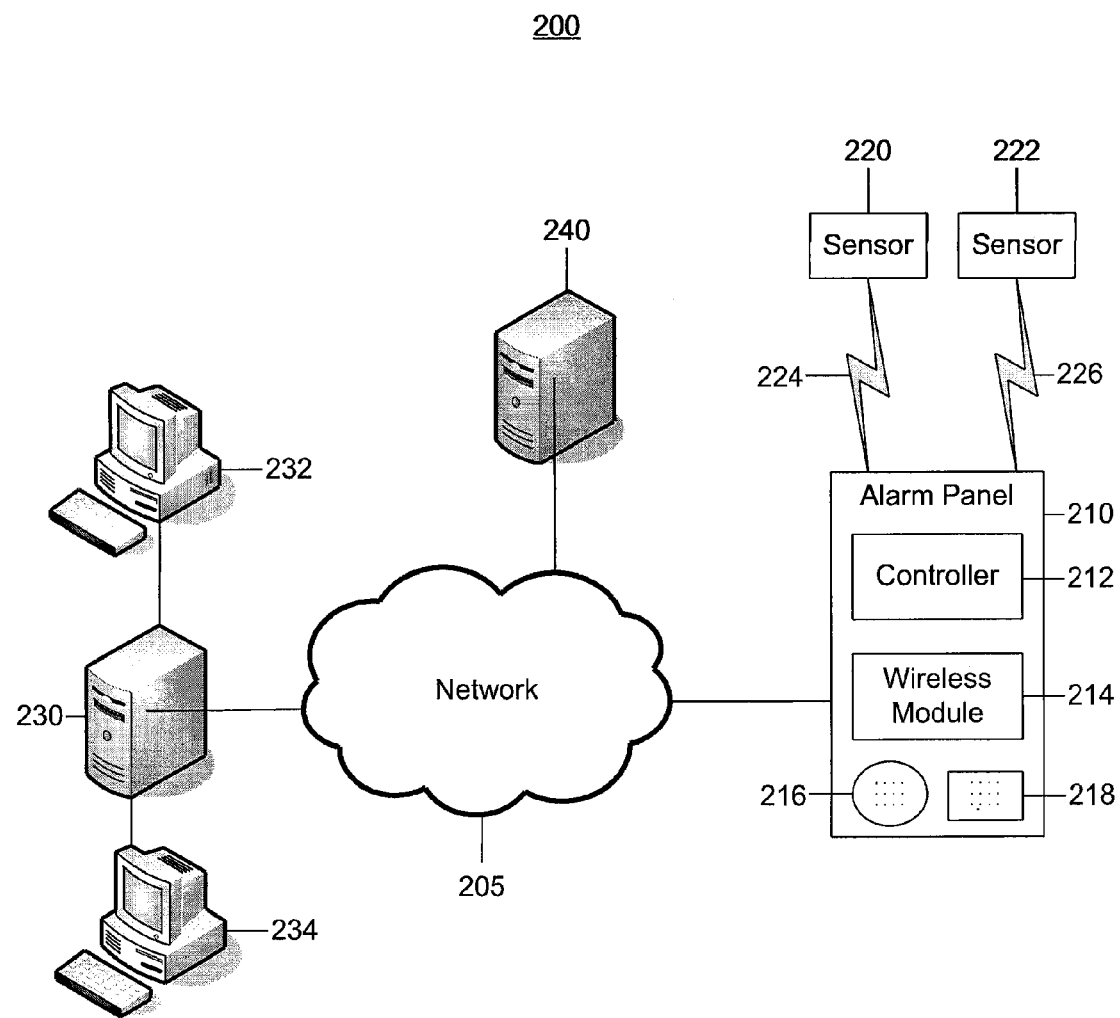
FIG. 2 is a block diagram of an example of an electronic system configured to establish a voice communication session between an alarm system and an alarm operator.

FIG. 2 illustrates an example of an electronic system 200 configured to establish a voice communication session between an alarm system and an alarm operator. The electronic system 200 includes a network 205, an alarm panel 210, a monitoring system 230, and an alarm server 240. The network 205 facilitates communications between the alarm panel 210, the monitoring system 230, and the alarm server 240.

The network 205 is configured to enable exchange of electronic communications between devices connected to the network 205. For example, the network 205 may be configured to enable exchange of electronic communications between the alarm panel 210, the monitoring system 230, and the alarm server 240. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels.

The alarm panel 210 includes a controller 212, a wireless communication module 214, a speaker 216, and a microphone 218. The controller 212 is configured to control an alarm system that includes the alarm panel 210. In some examples, the controller 212 may include a processor or other control circuitry configured to execute instructions of a program that controls operation of an alarm system. In these examples, the controller 212 may be configured to receive input from sensors, detectors, or other devices included in the alarm system and control operations of devices included in the alarm system. For example, the controller 212 may be configured to control operation of the wireless communication module 214, the speaker 216, and the microphone 218 included in the alarm panel 210.

The wireless communication module 214 is a communication device configured to exchange wireless communications over the network 205. For example, the wireless communication device 214 may be configured to exchange communications over a wireless data channel and a wireless voice channel. In this example, the wireless communication module may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, or IP.

The speaker 216 may include an electromechanical transducer that converts an electrical signal into sound. The speaker 216 may receive an electrical signal from the controller 212 and produce an audible output based on the electrical signal. For example, the controller 212, in response to detecting an alarm event, may send a signal to the speaker 216 to cause the speaker to produce an audible alarm sound. In another example, the controller 212 may send a signal representative of a voice communication to the speaker 216 to cause the speaker to produce an audible output of the voice communication. In this example, the controller 212 may control the wireless communication module 214 to establish a voice communication session over a wireless voice channel and provide an electrical signal to the speaker 216 to cause the speaker to produce an audible output of voice communications received in the voice communication session by the wireless communication module 214. In other examples, the wireless communication module may provide an electrical signal representative of a voice communication directly to the speaker 216. In some implementations, the speaker 216 may be positioned in a location separate from the alarm panel such that the speaker 216 may have a coverage area that is different from the location of the alarm panel. In these implementations, the alarm system may include multiple speakers to provide a larger coverage area, such as an entire building the alarm system is monitoring or areas proximate to all of the sensors included in the alarm system.

The microphone 218 may include an acoustic to electronic transducer or sensor that converts sound into an electrical signal. The microphone 218 may sense sound (e.g., from a person speaking proximate to the microphone 218) and produce an electrical signal based on the sound. For example, the microphone 218 may sense sound produced in an area proximate to the microphone 218 and send a signal representative of the sound to the controller 212. The controller 212 may determine a user input control based on the signal or provide the signal to the wireless communication module 214 to include as a voice communication in a voice communication session established by the wireless communication module 214 with another entity (e.g., a monitoring station). In some examples, the microphone 218 may transmit the electrical signal directly to the wireless communication module 214 instead of transmitting the signal through the controller 212. In further implementations, the microphone 218 may be positioned in a location separate from the alarm panel such that the microphone 218 may have a coverage area that is different from the location of the alarm panel. In these implementations, the alarm system may include multiple microphones to provide a larger coverage area, such as an entire building the alarm system is monitoring or areas proximate to all of the sensors included in the alarm system.

The alarm system that includes the alarm panel 210 includes one or more sensors or detectors. For example, the alarm system may include multiple sensors 220 and 222. The sensors 220 and 222 may be contact sensors, motion sensors, glass breaker sensors, temperature sensors, smoke sensors, carbon monoxide sensors, panic button sensors, or any other type of sensor that senses an environmental or physical condition. The sensors 220 and 222 communicate with the controller 212 over communication links 224 and 226. The communication links 224 and 226 may be a wired or wireless data pathway configured to transmit signals from the sensors 220 and 222 to the controller 212. The sensors 220 and 222 may continuously transmit sensed values to the controller 212, periodically transmit sensed values to the controller 212, or transmit sensed values to the controller 212 in response to a change in a sensed value. The controller 212 may receive signals from the sensors 220 and 222 and detect an alarm event based on the sensed values. For example, the sensor 220 may be a contact sensor provided on a door to a residence and the communication link 224 may be a wireless connection between the sensor 220 and the controller 212. In this example, the sensor 220 may sense that the door has been opened (e.g., absence of a connection between contacts included as part of the sensor) and wirelessly transmit data over communication link 224 to the controller 212 indicating that the door has been opened. The controller 212 receives the data from the sensor 220 over the communication link 224 and determines that an alarm event (e.g., the door opened) has occurred based on the signal from the sensor 220. The controller 212 controls operation of the alarm system based on the determination that the alarm event has occurred.

The monitoring system 230 is an electronic device (e.g., a server, host, etc.) configured to provide alarm monitoring service by exchanging communications with the alarm panel 210 and the alarm server 240 over the network 205. For example, the monitoring system 230 may be configured to monitor alarm events generated by the alarm panel 210. In this example, the monitoring system 230 may exchange communications with the wireless communication module 214 included in the alarm panel 210 to receive information regarding alarm events detected by the alarm panel 210. The monitoring system 230 may receive information regarding alarm events from the wireless communication module 214 in wireless data communications transmitted over a wireless data channel.

In some implementations, the monitoring system 230 may be configured to establish two-way voice communication sessions with the wireless communication module 214 included in the alarm panel 210. In these implementations, the monitoring system 230 may establish a voice communication session with the wireless communication module 214 over a wireless voice channel. The monitoring system 230 may establish a two-way voice communication session with the wireless communication module 214 included in the alarm panel 210 in response to receiving data from the alarm panel 210 indicating that an alarm event has occurred. By establishing a two-way voice communication session with the wireless communication module 214, the monitoring system 230 may enable an operator to handle an alarm event by listening in to an area covered by the microphone 218 and providing voice communications to an area covered by the speaker 216.

The monitoring system 230 includes multiple terminals 232 and 234. The terminals 232 and 234 may be used by operators to process alarm events. For example, the monitoring system 230 may route alarm data to the terminals 232 and 234 to enable an operator to process the alarm data. The terminals 232 and 234 may include general-purpose computers (e.g., desktop personal computers, workstations, or laptop computers) that are configured to receive alarm data from a server in the monitoring system 230 and render a display of information based on the alarm data. For example, in the example described above, the controller 212 may control the wireless communication module 214 to transmit, over a wireless data channel to the monitoring system 230, alarm data indicating that the sensor 220 detected the door opening. The monitoring system 230 may receive the alarm data and route the alarm data to the terminal 232 for processing by an operator associated with the terminal 232. The terminal 232 may render a display to the operator that includes information associated with the alarm event (e.g., the name of the user of the alarm system, the address of the building the alarm system is monitoring, the type of alarm event, etc.) and the operator may handle the alarm event based on the displayed information. Further, in this example, the monitoring system 230 may establish a voice communication session between the wireless communication module 214 and the terminal 232 (or another device associated with the operator using the terminal 232) over a wireless voice channel. By establishing a voice communication session, the operator may listen in to an area covered by the microphone 218 and speak to people in the area covered by the speaker 216. As such, the operator may be able to determine whether the alarm event is real alarm event or a false alarm and also may be able to provide more effective handling of the alarm event in the event that the alarm event is a real alarm event.

In some implementations, the terminals 232 and 234 may be mobile devices or devices designed for a specific function.

Although FIG. 2 illustrates two terminals for brevity, actual implementations may include more (and, perhaps, many more) terminals.

The alarm server 240 is an electronic device (e.g., a server, host, etc.) configured to provide alarm monitoring services by exchanging electronic communications with the alarm panel 210 and the monitoring system 230 over the network 205. For example, the alarm server 240 may be configured to monitor alarm events generated by the alarm panel 210. In this example, the alarm server 240 may exchange electronic communications with the wireless communication module 214 included in the alarm panel 210 to receive information regarding alarm events detected by the alarm panel 210. The alarm server 240 may receive information regarding alarm events from the wireless communication module 214 in wireless data communications transmitted over a wireless data channel.

In some examples, the alarm server 240 may route the alarm data received from the wireless communication module 214 to the monitoring system 230. For example, the alarm server 240 may transmit the alarm data to the monitoring system 230 over the network 205. In this example, the alarm server 240 may transmit the alarm data to the monitoring system 230 over a communication medium or channel other than a wireless data channel. For instance, the alarm server 240 may transmit the alarm data received from the wireless communication module 214 over the wireless data channel to the monitoring system 230 over a wired telephone connection. The alarm server 240 may add information the alarm data received from the wireless communication module 214 and may convert or transform the alarm data into a format used by the monitoring system 230.

The alarm server 240 also may facilitate establishment of a voice communication session between the monitoring system 230 and the wireless communication module 214 included in the alarm panel 210. For example, the alarm server 240 may provide telephone information to the monitoring system 230 or the wireless communication module 214 for use in establishing a wireless voice communication session over a wireless voice channel. The alarm server 240 also may provide confirmation signals to the wireless communication module and the monitoring system regarding the receipt and transmission of alarm data. In some implementations, the alarm panel 210 and the monitoring system 230 directly exchange communications and the alarm server 240 is not necessary.

Figure 3:
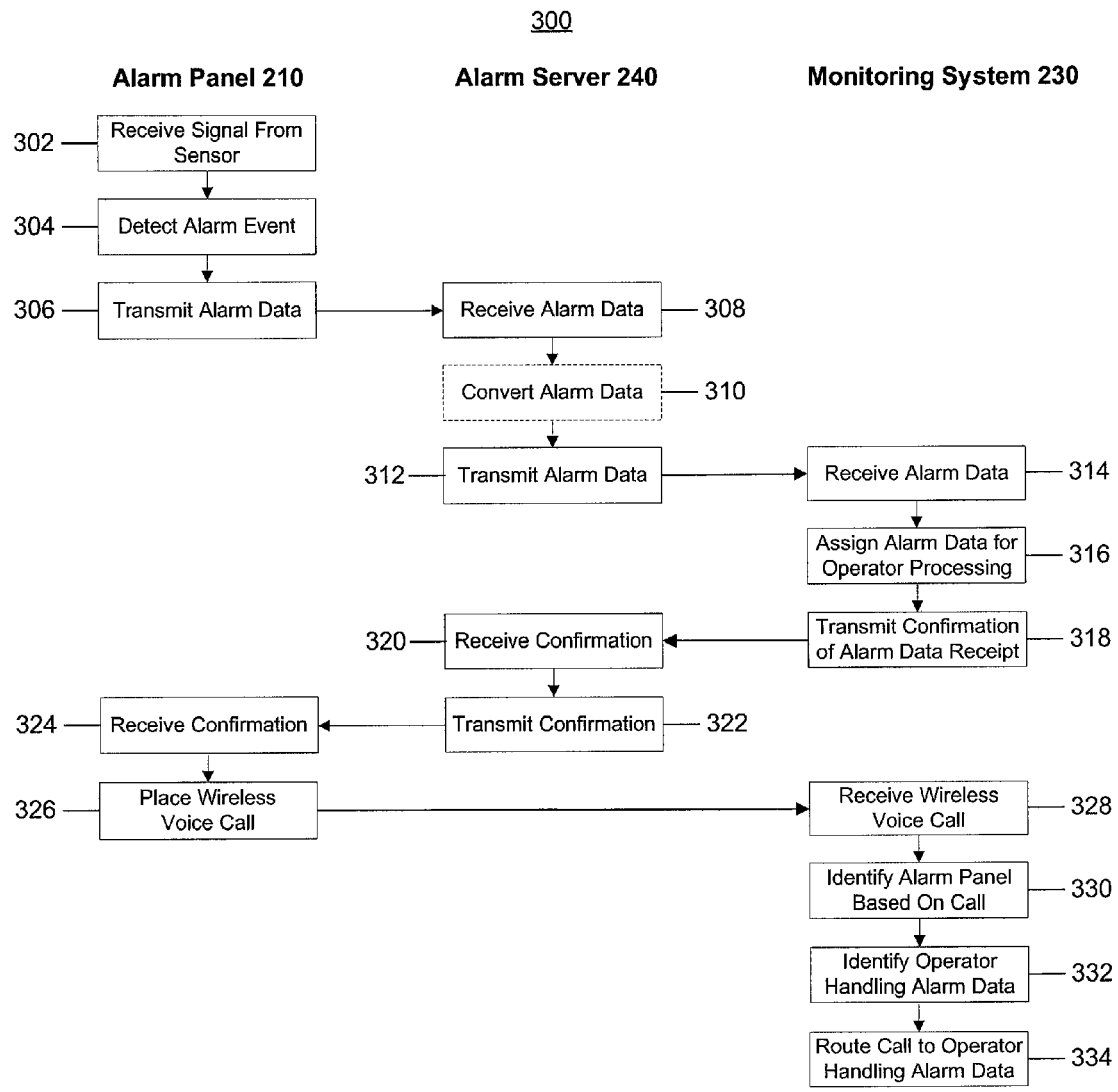
FIGS. 3, 4, 5, 6A, and 6B are flow charts illustrating examples of processes for establishing a voice communication session between an alarm system and an alarm operator.

FIG. 3 illustrates an example of a process 300 for establishing a voice communication session between an alarm system and an alarm operator. For convenience, particular components described with respect to FIG. 2 are referenced as performing the process 300. However, similar methodologies may be applied in other implementations where different components are used to define the structure of the system, or where the functionality is distributed differently among the components.

The alarm panel 210 receives a signal from the sensor 220 (302). For example, the controller 212 may receive a signal from the sensor 220 over the communication link 224. The signal may provide information associated with an alarm event or security breach. For instance, the sensor 220 may be a contact sensor attached to a door and the signal may be a signal that the contact has been broken (e.g., that the door has been opened). In other examples, the sensor 220 may be a smoke detector and the signal may indicate that smoke has been detected by the smoke detector or the sensor 220 may be a motion detector and the signal may indicate that motion has been detected by the motion detector.

The alarm panel 210 detects an alarm event based on the signal (304). For example, the controller 212 analyzes the signal received from the sensor 220 and determines whether an alarm event has occurred based on the signal. The controller 212 may access a set of criteria used in detecting alarm events and compare the received signal to the set of criteria to determine whether an alarm event has occurred. For instance, the controller 212 may determine that an alarm event has occurred in response to receiving the signal from the sensor 220 when the alarm system has been set to an armed state.

In some implementations, the set of criteria may require multiple signals from multiple sensors prior to detecting an alarm event or may compare other factors, such as time and date, prior to detecting an alarm event. For example, the controller 212 may detect an alarm event only when both a motion sensor and either a contact sensor or a glass breaker sensor has been triggered. In this example, the user of the alarm system may have a pet that is capable of triggering the motion sensor such that detection of the motion sensor alone should not trigger an alarm event unless detected in combination with another sensor. In another example, the controller 212 may compare the signal with a time or date associated with the received signal in detecting an alarm event. In this example, the alarm panel 210 only may detect an alarm event if the signal is received at a particular date and/or time.

In response to detecting an alarm event, the alarm panel 210 transmits alarm data to the alarm server 240 (306). For example, the wireless communication module 214 may transmit the alarm data over a wireless data channel to the alarm server 240. In some implementations, the wireless communication module 214 may send the alarm data in IP packets over a wireless data channel configured to transport IP packets. In other implementations, the wireless communication module 214 may send the alarm data in an SMS message over a wireless data channel configured to transport SMS messages. In implementations in which the wireless communication module 214 communicates directly with the monitoring system 230, the wireless communication module 214 may send the alarm data directly to the monitoring system 230 and the alarm server 240 is not necessary.

The alarm data includes information sufficient for the alarm server 240 to handle the alarm event. For instance, the alarm data may include information identifying the alarm panel 210, the user of the alarm panel 210, or the location associated with the alarm panel 210. The alarm data may include a customer account number with which the alarm server 240 may access stored information associated with the customer's account. In addition, the alarm data may include information indicating the type of alarm event (e.g., security breach, fire alarm, etc.), the type of services needed (e.g., police services, fire services, etc.), and the specific sensor or detected condition that triggered the alarm event (e.g., basement door sensor, third floor smoke detector, etc.).

The alarm server 240 receives the alarm data from the wireless communication module 214 (308). For instance, the alarm server 240 receives the alarm data over the wireless data channel using a wireless communication interface. Upon receipt of the alarm data, the alarm server 240 processes the alarm data to determine information associated with the alarm event. In some implementations, the alarm server 240 extracts an account number from the alarm data and accesses, from electronic storage associated with the alarm server 240, information associated with the account number. The alarm server 240 may access information related to the address of the location that the alarm system associated with the account number is protecting, information related to the name and telephone number of the user associated with the account number, and information related to the monitoring system or service associated with the account number. For instance, the alarm server 240 may access information identifying the monitoring system 230 as the monitoring system used by the customer associated with the account number and also access information associated with contacting the monitoring system 230. The alarm server 240 may use the accessed information to forward the alarm data to the monitoring system 230.

The alarm server, optionally, converts the alarm data (310). The alarm server 240 may convert the content of the alarm data from a first format into a second format used by the monitoring system 230. In addition, the alarm server 240 may convert the protocol used to transmit the alarm data from a first communication protocol used by the alarm panel 210 to a second communication protocol used by the monitoring system 230. In one example, the alarm server 240 may receive the alarm data as IP packets transmitted over a wireless data channel and may convert the alarm data into a digital dialer signal for transmission over a POTS telephone line. In another example, the alarm server 240 may receive the alarm data in an SMS message transmitted over a wireless data channel and may convert the alarm data into IP packets for transmission over an IP-based network.

In some implementations, the alarm server 240 may add information to the alarm data prior to transmitting the alarm data to the monitoring system 230. For instance, the alarm server may add information associated with the customer's account (e.g., the customer's phone number) or other information required by the monitoring system 230 to process the alarm data (e.g., an account number for the monitoring system 230). Because the monitoring system 230 may not recognize an account number associated with the alarm server 240, the alarm server 240 may have to add additional identifying data to the alarm data to enable the monitoring system 230 to identify the customer associated with the alarm panel 210.

The alarm server 240 transmits the alarm data to the monitoring system 230 (312). For example, the alarm server 240 forwards the alarm data received from the alarm panel 210 to the monitoring system 230. In this example, the alarm server 240 may directly forward the received alarm data or may convert or supplement the received alarm data. In some implementations, the alarm server 240 transmits the alarm data to the monitoring system 230 using a communication medium that is different from the communication medium from which the alarm server 240 received the alarm data. For instance, the alarm server 240 may receive the alarm data from the wireless communication module 214 included in the alarm panel 210 over a wireless data channel and may transmit the alarm data to the monitoring system over a POTS telephone line.

The monitoring system 230 receives the alarm data (314) and assigns the alarm data for operator processing (316). For example, the monitoring system 230 receives the alarm data over the network 205 in an electronic communication from the alarm server 240 and processes the alarm data to enable an operator to handle the alarm event. In some implementations, the monitoring system assigns an operator to process the alarm event and sends the alarm data to a terminal associated with the assigned operator (e.g., terminal 232 or 234). In other implementations, the monitoring system 230 places the alarm data in a queue for processing by the next available operator and the next available operator accesses the alarm data from the queue.

In assigning the alarm data for operator processing, the monitoring system 230 may process the alarm data and extract information from the alarm data that is needed by the operator to handle the alarm event. The monitoring system 230 also may access, from electronic storage associated with the monitoring system, information that an operator may use in handling the alarm event (e.g., name, address, telephone number, etc.). In some implementations, the monitoring system 230 may assign a priority to processing the alarm data and place the alarm data in the queue for processing based on the priority. For example, the monitoring system 230 may assign a higher priority to a smoke alarm event received for a residence at a time when people are assumed to be sleeping in the residence than a smoke alarm event received for a commercial building at a time when people are assumed to absent from the commercial building.

The monitoring system 230 transmits a confirmation message indicating receipt of the alarm data to the alarm server 240 (318). For example, the monitoring system 230 transmits a confirmation message to the alarm server 240 in an electronic communication over the network 205. In this example, the confirmation message may indicate that the monitoring system 230 received the alarm data properly and that the monitoring system 230 is handling the alarm event.

The alarm server 240 receives the confirmation message from the monitoring system 230 (320). For example, the alarm server 240 receives the confirmation message from the monitoring system 230 in an electronic communication over the network 205. The alarm server 240 may process the confirmation message to ensure that the monitoring system 230 received accurate alarm data. In addition, the alarm server 240 may determine that additional transmission of the alarm data in not needed because the monitoring system 230 has confirmed receipt of the alarm data.

The alarm server 240 transmits the confirmation message to the alarm panel 210 (322). For example, the alarm server 240 forwards the confirmation message received from the monitoring system 230 to the alarm panel 210 over the network 205. In this example, the alarm server 240 may directly forward the received confirmation message or may convert or supplement the received confirmation message. In some implementations, the alarm server 240 transmits the confirmation message to the alarm panel 210 using a communication medium that is different from the communication medium from which the alarm server 240 received the confirmation message. For instance, the alarm server 240 may receive the confirmation message from the monitoring system 230 over a POTS telephone line and may transmit the confirmation message to the wireless communication module 214 included in the alarm panel 210 over a wireless data channel.

The alarm panel 210 receives the confirmation message (324) and places a wireless voice call to the monitoring system 230 (326). For example, the wireless communication module 214 included in the alarm panel 210 receives the confirmation message over the network 205 in an electronic communication from the alarm server 240. In response to receiving the confirmation message, the controller 212 included in the alarm panel 210 may access information associated with a telephone number of the monitoring system 230 and place a wireless voice call to the telephone number associated with the monitoring system 230 using the wireless communication module 214. The controller 212 may access the telephone number for the monitoring system 230 from electronic storage associated with the alarm panel 210 or may receive the telephone number for the monitoring system 230 in the confirmation message or another message from the alarm server 240.

In some implementations, the wireless communication module 214 included in the alarm panel 210 places the call to the monitoring system over a wireless voice channel that is different from the wireless data channel with which the wireless communication module 214 transmitted the alarm data to the alarm server 240. As discussed above, transmitting the alarm data over a wireless data channel optimized for transmitting data and placing the wireless voice call over a wireless voice channel that is optimized for transmitting voice communications may provide benefits of transmitting data over the wireless data channel and benefits of transmitting voice communications over the wireless voice channel.

By waiting for the confirmation message indicating that the monitoring system 230 has received the alarm data prior to placing the wireless voice call, the establishment of a two-way voice communication session may be coordinated with the transmission of the alarm data such that the monitoring system 230 may appropriately handle the wireless voice call. For instance, had the wireless communication module 214 placed the wireless voice call prior to the monitoring system 230 receiving the alarm data, the monitoring system 230 may handle the wireless voice call as an ordinary call and not process the call to establish a two-way voice communication session. Alternatively, by waiting for receipt of a confirmation message prior to placing the wireless voice call, the alarm panel 210 may ensure that the monitoring system 230 has the alarm data and is capable of associating the wireless voice call with the proper alarm event to establish a two-way voice communication session between the operator handling the alarm event and the alarm panel 210.

The monitoring system 230 receives the wireless voice call (328). For example, the monitoring system 230 receives the wireless voice call placed by the wireless communication module 214 over a wireless voice channel and routed to the monitoring system 230 by a wireless service provider associated with the wireless communication module 214. The monitoring system 230 may receive the call using a telephone exchange (e.g., a PBX) or telephone switch.

The monitoring system 230 identifies the alarm panel 210 based on the received call (330). For example, the monitoring systems 230 identifies the call as being from the alarm panel 210 based on a telephone number associated with the received call. In this example, the monitoring system 230 may identify the call as being from the wireless communication module 214 included in the alarm panel by using ANI, DNIS, or other similar techniques. For instance, the monitoring system 230 may identify a customer account number associated with the alarm panel 210 by looking up the customer account number associated with the ANI or DNIS information for the received call. Other methods of identifying the call as being from the alarm panel 210 may be used.

The monitoring system 230 identifies the operator handling the alarm data for the alarm panel 210 (332). In some implementations, the monitoring system 230 may determine that the received call is from the alarm panel 210 and then identify which operator is handling the alarm event associated with the alarm data sent from the alarm panel 210. For example, the monitoring system 230 may identify a customer account number associated with the received call based on the ANI or DNIS information and then identify an operator handling the alarm data associated with the identified customer account number.

The monitoring system 230 routes the call from the alarm panel 210 to the operator handling the alarm data associated with the alarm panel 210 (334). For example, the monitoring system 230 may access communication information associated with the operator identified as handling the alarm data associated with the alarm panel 210 and route the call to a communication device used by the operator based on the accessed communication information. In this example, the monitoring system 230 may access a telephone number for the operator handling the alarm data and route the call to the operator's telephone number. By routing the call to the operator's telephone number, the operator may answer the telephone call and establish a two-way voice communication session with the alarm panel 210. The two-way voice communication session may enable the operator to listen-in to an area proximate to the microphone 218 included in the alarm panel 210 and speak to people that are in an area proximate to the speaker 216 included in the alarm panel 210.

Using the two-way voice communication session, the operator may determine whether the alarm event associated with the alarm data is a real alarm event or a false alarm. For instance, the operator may ask a person in an area proximate to the speaker 216 for a secret code if the person indicates that the alarm event is a false alarm and determine that the alarm event is a false alarm if the correct secret code is provided. In addition, the operator may provide better emergency services using the two-way voice communication session. For example, the operator may be able to communicate with a person who is incapacitated in an area proximate to the alarm panel 210 and send medical assistance for the person. In this example, the incapacitated person may have no other way to communicate with the operator or emergency services (e.g., the person could not get up to place or answer a phone call) without establishing the two-way voice communication session.

Figure 4:
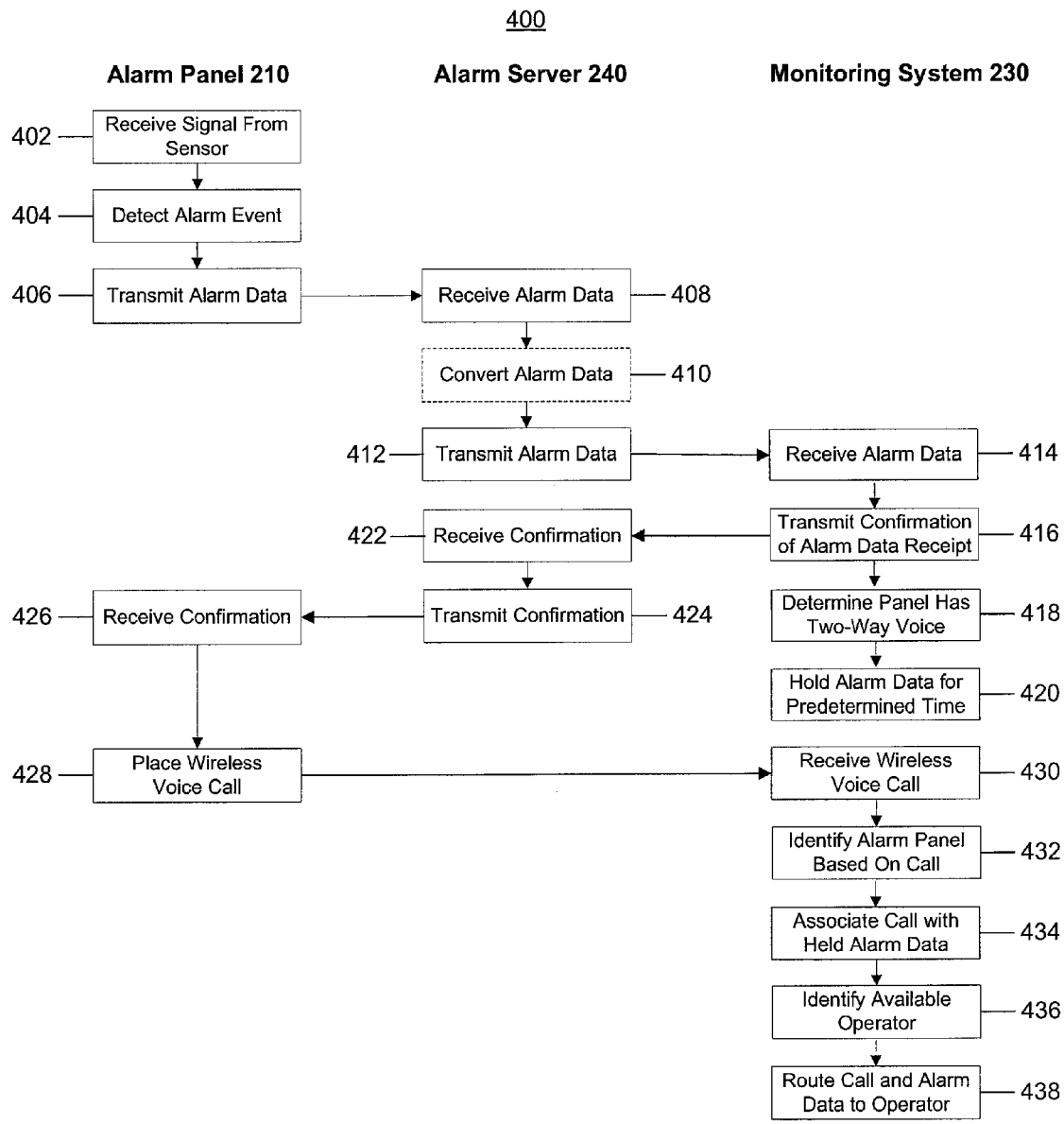

FIG. 4 illustrates another example of a process 400 for establishing a voice communication session between an alarm system and an alarm operator. For convenience, particular components described with respect to FIG. 2 are referenced as performing the process 400. However, similar methodologies may be applied in other implementations where different components are used to define the structure of the system, or where the functionality is distributed differently among the components.

The alarm panel 210 receives a signal from the sensor 220 (402) and detects an alarm event based on the signal (404). For example, the alarm panel 210 receives a signal from the sensor 220 and detects an alarm event based on the signal using techniques described above with respect to steps 302 and 304 shown in FIG. 3.

In response to detecting an alarm event, the alarm panel 210 transmits alarm data to the alarm server 240 (406). For example, the alarm panel 210 transmits alarm data to the alarm server 240 using techniques described above with respect to step 306 shown in FIG. 3.

The alarm server 240 receives the alarm data from the wireless communication module 214 (408), optionally converts the alarm data (410), and transmits the alarm data to the monitoring system 230 (412). For example, the alarm server 240 receives the alarm data from the wireless communication module 214, optionally converts the alarm data, and transmits the alarm data to the monitoring system 230 using the techniques described above with respect to steps 308, 310, and 312 shown in FIG. 3.

The monitoring system 230 receives the alarm data (414) and transmits a confirmation message indicating receipt of the alarm data to the alarm server 240 (416). For example, the monitoring system 230 receives the alarm data and transmits a confirmation message indicating receipt of the alarm data to the alarm server 240 using techniques described above with respect to steps 314 and 318 shown in FIG. 3.

The monitoring system 230 determines that the alarm panel 210 has a two-way voice feature (418). For example, the monitoring system 230 processes the alarm data to determine whether the alarm panel 210 associated with the alarm data has a two-way voice feature. In some implementations, the alarm data may include information indicating whether the alarm panel 210 associated with the alarm data has a two-way voice feature. In these implementations, a code or part of an account number included in the alarm data may indicate whether the alarm panel 210 associated with the alarm data has a two-way voice feature and the monitoring system 230 may determine whether the alarm panel 210 has a two-way voice feature by extracting the code or part of the account number and comparing the code or part of the account number to known information. In other implementations, the monitoring system 230 may identify the alarm panel 210 based on the alarm data and access, from electronic storage associated with the monitoring system 230, information indicating whether the alarm panel has a two-way voice feature. In some examples, the monitoring system 230 may determine a model number associated with the alarm panel 210 and access information indicating whether alarm panels with that model number have a two-way feature. In other examples, the monitoring system 230 may access information associated with the customer using the alarm panel 210 and determine whether the customer has subscribed for monitoring services that include a two-way voice feature.

In response to determining that the alarm panel 210 has a two-way voice feature, the monitoring system 230 holds the alarm data (420). For example, the monitoring system 230 may hold the alarm data in temporary storage until the monitoring system 230 receives a call from the alarm panel 210 or a predetermined and configurable amount of time passes. In this example, the monitoring system 230 may not assign the alarm data for operator processing until a call is received from the alarm panel 210 such that the alarm data and the call from the alarm panel 210 may be routed to an operator at the same time. The monitoring system 230 assigns the alarm data for operator processing after a predetermined and configurable amount of time passes such that the alarm data is processed without two-way voice services in the event that establishing a two-way voice communication session fails. The predetermined amount of time may be equal or greater than an amount of time (e.g., one minute) anticipated for receiving a call from the alarm panel or an amount of time determined to be an acceptable delay in responding to an alarm event.

In some implementations, if the predetermined and configurable amount of time passes, the monitoring system 230 may initiate processing of the alarm data, send a command to the alarm panel 210 or the alarm server 240 indicating that the monitoring system 230 is waiting to receive a call, or place a call to the alarm panel 210. The monitoring system 230 may send a command to the alarm panel 210 instructing the alarm panel 210 to stop attempting to call the monitoring system 230 and wait for a call from the monitoring system 230. The monitoring system 230 then may place a call to the alarm panel 210.

The alarm server 240 receives the confirmation message from the monitoring system 230 (422) and transmits the confirmation message to the alarm panel 210 (424). For example, the alarm server 240 receives the confirmation message from the monitoring system 230 and transmits the confirmation message to the alarm panel 210 using techniques described above with respect to steps 320 and 322 shown in FIG. 3.

The alarm panel 210 receives the confirmation message (426) and places a wireless voice call to the monitoring system 230 (428). For example, the alarm panel 210 receives the confirmation message and places a wireless voice call to the monitoring system 230 using techniques described above with respect to steps 324 and 326 shown in FIG. 3.

The monitoring system 230 receives the wireless voice call (430) and identifies the alarm panel 210 based on the received call (432). For example, the monitoring system 230 receives the wireless voice call and identifies the alarm panel 210 based on the received call using techniques described above with respect to steps 328 and 330 shown in FIG. 3.

The monitoring system 230 associates the call with the held alarm data (434). In some implementations, the monitoring system 230 may determine that the received call is from the alarm panel 210 and identify held alarm data sent from the alarm panel 210. For example, the monitoring system 230 may identify a customer account number associated with the received call based on ANI or DNIS information and then identify held alarm data associated with the identified customer account number. In this example, the monitoring system 230 may analyze held alarm data stored in temporary storage and identify held alarm data associated with the customer account number.

The monitoring system identifies an available operator (436) and routes the held alarm data and the call received from the alarm panel 210 to the available operator (438). For example, the monitoring system 230 analyzes information regarding the status of operators of the monitoring system 230 and identifies an operator that is currently available (e.g., not currently handling another alarm event). In this example, the monitoring system 230 may access communication information associated with the available operator, route the alarm data to a terminal associated with the available operator based on the accessed communication information, and route the call received from the alarm panel 210 to a communication device used by the operator based on the accessed communication information. For instance, the monitoring system 230 may access an IP address and a telephone number for the available operator, route the alarm data to the IP address associated with the available operator, and route the call to the operator's telephone number. By providing the alarm data to the available operator and routing the call to the operator's telephone number, the operator may handle the alarm event and answer the telephone call to establish a two-way voice communication session with the alarm panel 210. The two-way voice communication session may enable the operator to listen-in to an area proximate to the microphone 218 included in the alarm panel 210 and speak to people that are in an area proximate to the speaker 216 included in the alarm panel 210. Providing the held alarm data to the available operator and routing the call to the available operator's telephone number at the same time, enables coordination of the establishment of a two-way voice communication session between the operator and the alarm panel 210 when the alarm data is transmitted using a communication medium (e.g., a wireless data channel) that is different from a communication medium used to establish the two-way voice communication session (e.g., a wireless voice channel).

Figure 5:
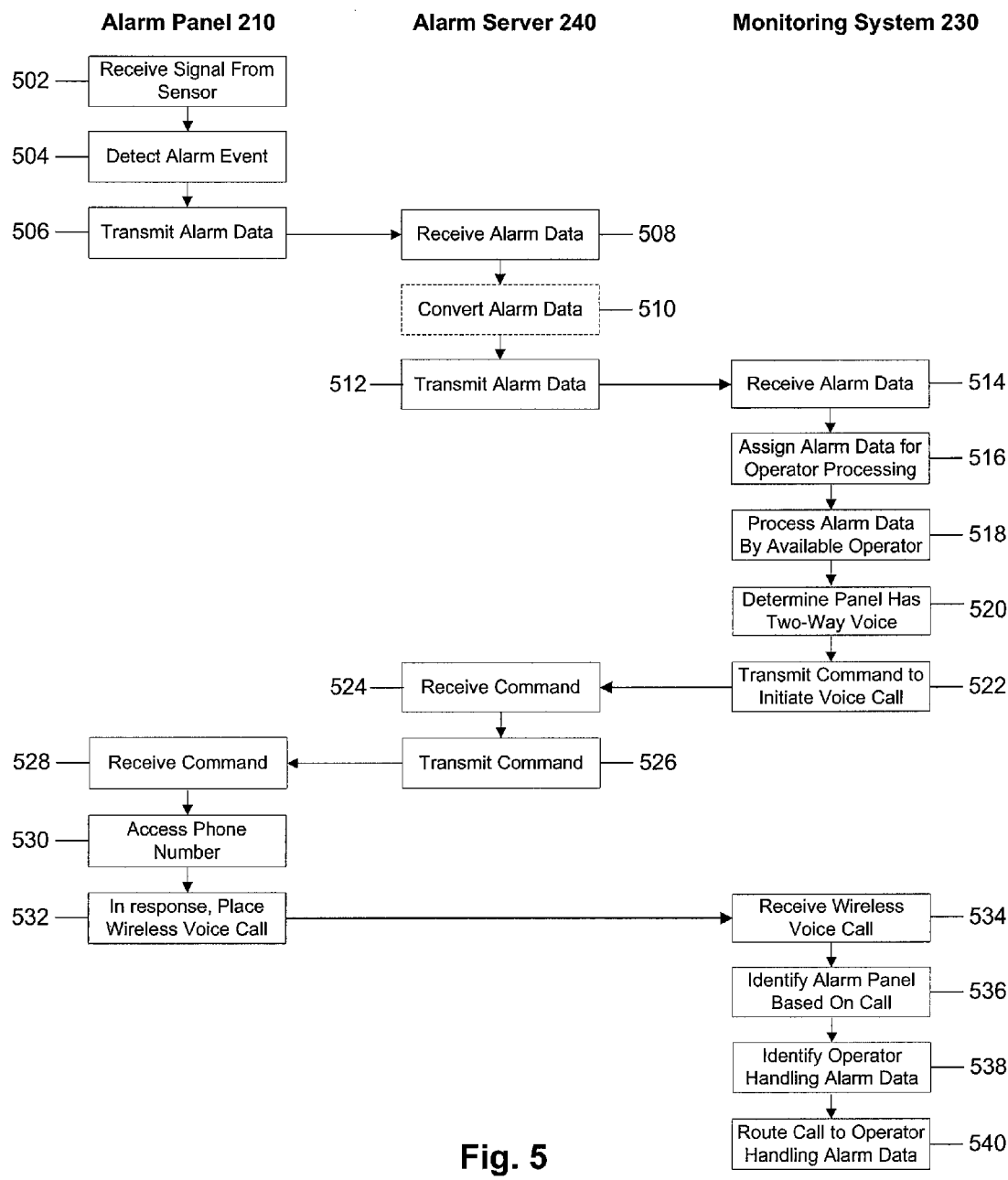

FIG. 5 illustrates a further example of a process 500 for establishing a voice communication session between an alarm system and an alarm operator. For convenience, particular components described with respect to FIG. 2 are referenced as performing the process 500. However, similar methodologies may be applied in other implementations where different components are used to define the structure of the system, or where the functionality is distributed differently among the components.

The alarm panel 210 receives a signal from the sensor 220 (502) and detects an alarm event based on the signal (504). For example, the alarm panel 210 receives a signal from the sensor 220 and detects an alarm event based on the signal using techniques described above with respect to steps 302 and 304 shown in FIG. 3.

In response to detecting an alarm event, the alarm panel 210 transmits alarm data to the alarm server 240 (506). For example, the alarm panel 210 transmits alarm data to the alarm server 240 using techniques described above with respect to step 306 shown in FIG. 3.

The alarm server 240 receives the alarm data from the wireless communication module 214 (508), optionally converts the alarm data (510), and transmits the alarm data to the monitoring system 230 (512). For example, the alarm server 240 receives the alarm data from the wireless communication module 214, optionally converts the alarm data, and transmits the alarm data to the monitoring system 230 using the techniques described above with respect to steps 308, 310, and 312 shown in FIG. 3.

The monitoring system 230 receives the alarm data (514) and assigns the alarm data for operator processing (516). For example, the monitoring system 230 receives the alarm data and assigns the alarm data for operator processing using techniques described above with respect to steps 314 and 316 shown in FIG. 3.

The monitoring system 230 enables an available operator to process the alarm data and handle the alarm event associated with the alarm data (518). For example, the monitoring system 230 transmits the alarm data or other information based on the alarm data to a terminal associated with an available operator. The terminal associated with the available operator renders a display to the operator based on the alarm data or the other information based on the alarm data. Using the displayed information, the operator begins to handle the alarm event associated with the alarm data. The display may include user interface elements with which the operator may interact to provide user input to the terminal to handle the alarm event.

The monitoring system 230 determines that the alarm panel 210 has a two-way voice feature (520). For example, the operator may determine that the alarm panel 210 has a two-way voice feature based on information provided on the display rendered on the operator's terminal. In some examples, the monitoring system 230 processes the alarm data to determine whether the alarm panel 210 associated with the alarm data has a two-way voice feature using the techniques described above with respect to step 418 shown in FIG. 4.

The monitoring system 230 transmits a command to initiate a voice call (522). For instance, the operator may send a command to initiate a voice call by interacting with user interface elements displayed by the terminal associated with the operator. In some implementations, the monitoring system 230 may determine that the operator has begun processing the alarm data and automatically transmit the command to initiate a voice call. The command may include a telephone number associated with the monitoring system 230 to which the alarm panel 210 may place the call. In some examples, the command may include a telephone number of a communication device associated with the operator that has begun processing the alarm data. In these examples, the call placed by the alarm panel 210 may be directly routed to the communication device associated with the operator processing the alarm data such that a two-way voice communication session may be established with the operator without any additional routing.

The alarm server 240 receives the command from the monitoring system 230 (524) and transmits the command to the alarm panel 210 (526). For example, the alarm server 240 receives the command from the monitoring system 230 in an electronic communication over the network 205 and forwards the command received from the monitoring system 230 to the alarm panel 210 over the network 205. In this example, the alarm server 240 may directly forward the received command or may convert or supplement the received command such that the command sent to the alarm panel 210 is appropriate. For instance, the alarm server 240 may add telephone number information for the monitoring system 230 to the command prior to transmitting the command to the alarm panel 210.

In some implementations, the alarm server 240 transmits the command to the alarm panel 210 using a communication medium that is different from the communication medium from which the alarm server 240 received the command. For instance, the alarm server 240 may receive the command from the monitoring system 230 over a POTS telephone line and may transmit the command to the wireless communication module 214 included in the alarm panel 210 over a wireless data channel.

The alarm panel 210 receives the command (528) and accesses telephone number information for the monitoring system 230 (530). For example, the wireless communication module 214 included in the alarm panel 210 receives the command over the network 205 in an electronic communication from the alarm server 240. In response to receiving the command, the controller 212 included in the alarm panel 210 may access information associated with a telephone number of the monitoring system 230. The controller 212 may access the telephone number for the monitoring system 230 from electronic storage associated with the alarm panel 210 or may access the telephone number for the monitoring system 230 from information included in the command or another message from the alarm server 240. In implementations in which the controller 212 accesses the telephone number from information included in the command, the telephone number may be a direct dial telephone number for the operator that is handling the alarm event associated with the alarm panel 210 and initiated transmission of the command.

In response to receiving the command and accessing the telephone number information, the alarm panel 210 places a wireless voice call to the monitoring system 230 based on the accessed telephone number information. For example, the alarm panel 210 places a call to the monitoring system 230 at an accessed telephone number using the wireless communication module 214. By placing the wireless voice call in response to receiving the command transmitted from the monitoring system, the establishment of a two-way voice communication session between the operator handling the alarm data and the alarm panel 210 may be coordinated with the transmission of the alarm data even when different communication mediums are used for transmitting alarm data and establishing the two-way voice communication session. The alarm panel 210 may place a call to the monitoring system 230 using techniques described above with respect to step 326 shown in FIG. 3.

The monitoring system 230 receives the wireless voice call (534), identifies the alarm panel 210 based on the call (536), identifies the operator handling the alarm data (538), and routes the call to the operator handling the alarm data (540). For example, the monitoring system 230 receives the wireless voice call, identifies the alarm panel 210 based on the call, identifies the operator handling the alarm data, and routes the call to the operator handling the alarm data using techniques described above with respect to steps 328, 330, 332, and 334 shown in FIG. 3. In implementations in which the command includes the telephone number of the operator handling the alarm data, the alarm panel 210 may place the call directly to a communication device of the operator handling the alarm data and identifying the alarm panel 210 based on the call, identifying the operator handling the alarm data, and routing the call to the operator handling the alarm data may not be necessary.

Figure 6A:
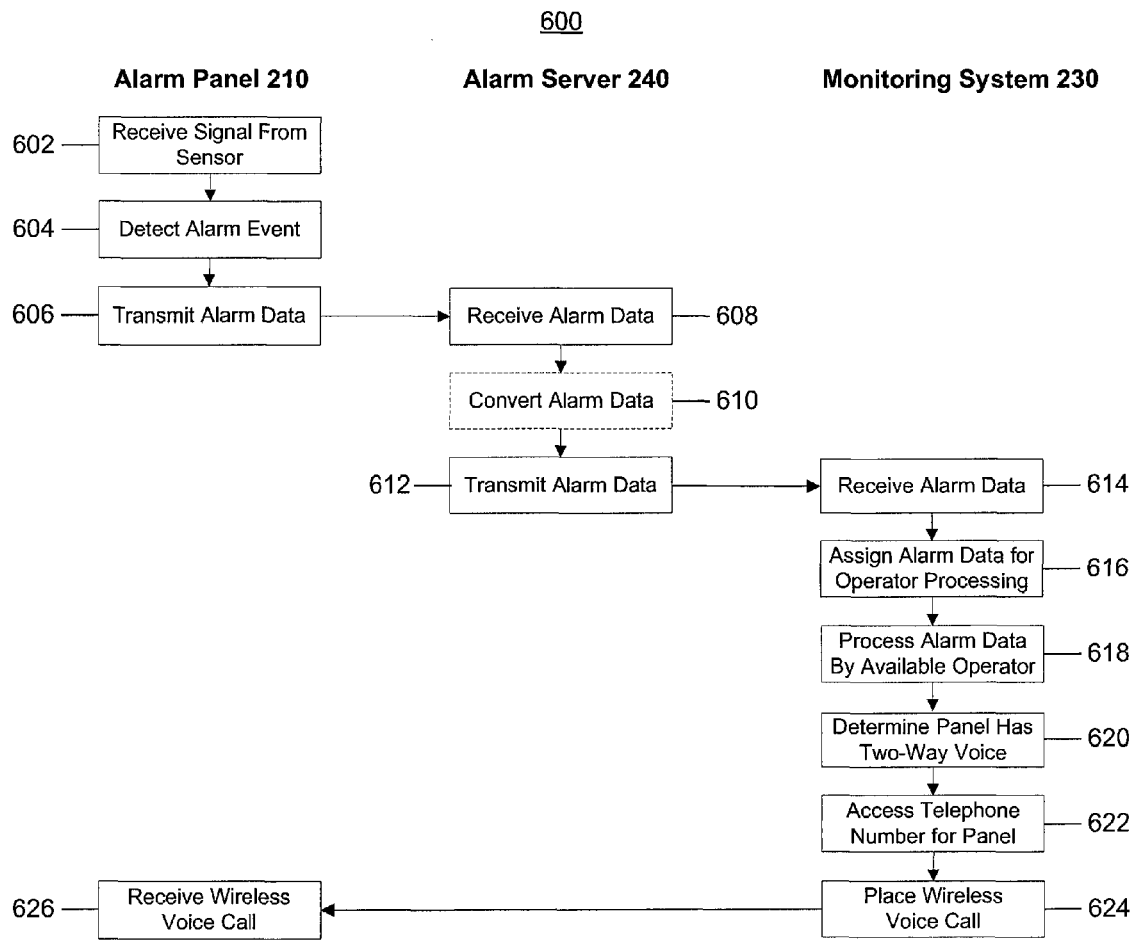

FIG. 6A illustrates another example of a process 600 for establishing a voice communication session between an alarm system and an alarm operator. For convenience, particular components described with respect to FIG. 2 are referenced as performing the process 600. However, similar methodologies may be applied in other implementations where different components are used to define the structure of the system, or where the functionality is distributed differently among the components.

The alarm panel 210 receives a signal from the sensor 220 (602) and detects an alarm event based on the signal (604). For example, the alarm panel 210 receives a signal from the sensor 220 and detects an alarm event based on the signal using techniques described above with respect to steps 302 and 304 shown in FIG. 3.

In response to detecting an alarm event, the alarm panel 210 transmits alarm data to the alarm server 240 (606). For example, the alarm panel 210 transmits alarm data to the alarm server 240 using techniques described above with respect to step 306 shown in FIG. 3.

The alarm server 240 receives the alarm data from the wireless communication module 214 (608), optionally converts the alarm data (610), and transmits the alarm data to the monitoring system 230 (612). For example, the alarm server 240 receives the alarm data from the wireless communication module 214, optionally converts the alarm data, and transmits the alarm data to the monitoring system 230 using the techniques described above with respect to steps 308, 310, and 312 shown in FIG. 3.

The monitoring system 230 receives the alarm data (614) and assigns the alarm data for operator processing (616). For example, the monitoring system 230 receives the alarm data and assigns the alarm data for operator processing using techniques described above with respect to steps 314 and 316 shown in FIG. 3.

The monitoring system 230 enables an available operator to process the alarm data and handle the alarm event associated with the alarm data (618) and determines that the alarm panel 210 has a two-way voice feature (620). For example, the monitoring system 230 enables an available operator to process the alarm data and handle the alarm event associated with the alarm data and determines that the alarm panel 210 has a two-way voice feature using techniques described above with respect to steps 518 and 520 shown in FIG. 5.

The monitoring system 230 accesses a telephone number associated with the alarm panel 210 (622). For example, the monitoring system 230 identifies that the alarm data was received from the alarm panel 210 and accesses a telephone number associated with the alarm panel 210 from electronic storage. In this example, the monitoring system 230 may identify a customer account number associated with the alarm data and access a telephone for the alarm panel 210 associated with the identified customer account number. In some implementations, the monitoring system 230 may access the telephone number for the alarm panel 210 from the alarm data. In these implementations, the alarm panel 210 may include a telephone number for the alarm panel 210 in the alarm data the alarm panel 210 transmits to the alarm server 240 or the alarm server 240 may add a telephone number for the alarm panel 210 to the alarm data prior to transmitting the alarm data to the monitoring system 230. In other examples, the operator may access the telephone number for the alarm panel 210 after beginning to process the alarm data.

The monitoring system 230 places a wireless voice call to the alarm panel 210 (624). For example, the monitoring system 230 places a wireless voice call over a wireless voice channel to the alarm panel 210 using the accessed telephone number for the alarm panel 210. The monitoring system 230 may automatically place the wireless voice call to the alarm panel 210 and connect the call to a communication device associated with the operator handling the alarm event. The monitoring system 230 also may display the accessed telephone number to the operator handling the alarm event and the operator may place a call to the alarm panel 210. By having the monitoring system 230 place a call to the alarm panel 210 after an operator has been assigned to process alarm data received for the alarm panel 210, the monitoring system 230 coordinates the establishment of a two-way voice communication session between the operator handling the alarm event and the alarm panel 210 with the receipt of the alarm data.

The alarm panel 210 receives the wireless voice call (626). For example, the wireless communication module 214 included in the alarm panel 210 may be configured to receive incoming calls and may receive the call from the monitoring system 230. After receiving the call, the wireless communication module 214 may establish a two-way voice communication session with a communication device associated with the operator handling the alarm event for the monitoring system 230. The two-way voice communication session may enable the operator to listen-in to an area proximate to the microphone 218 included in the alarm panel 210 and speak to people that are in an area proximate to the speaker 216 included in the alarm panel 210.

In some implementations, security measures may be implemented to prevent the alarm panel 210 from answering incoming calls that are unrelated to alarm events. For example, the wireless communication module 214 included in the alarm panel 210 only may accept incoming calls a predetermined and configurable amount of time after transmitting alarm data or only may accept incoming calls from trusted phone numbers. In other arrangements, the wireless communication module 214 included in the alarm panel 210 only may accept an incoming call that includes a password or other identifying information that the wireless communication module 214 may use to authenticate or verify the trustworthiness of the call.

Figure 6B:
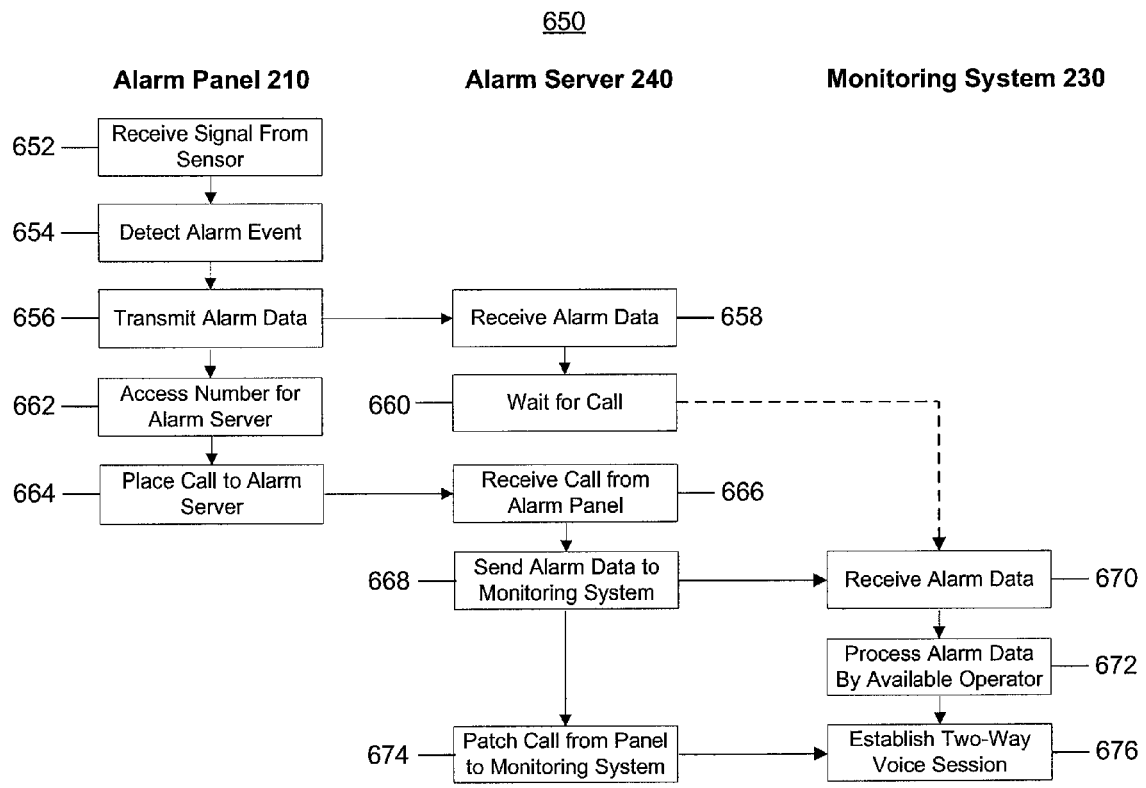

FIG. 6B illustrates a further example of a process 650 for establishing a voice communication session between an alarm system and an alarm operator. For convenience, particular components described with respect to FIG. 2 are referenced as performing the process 650. However, similar methodologies may be applied in other implementations where different components are used to define the structure of the system, or where the functionality is distributed differently among the components.

The alarm panel 210 receives a signal from the sensor 220 (652) and detects an alarm event based on the signal (654). For example, the alarm panel 210 receives a signal from the sensor 220 and detects an alarm event based on the signal using techniques described above with respect to steps 302 and 304 shown in FIG. 3.

In response to detecting an alarm event, the alarm panel 210 transmits alarm data to the alarm server 240 (656). For example, the alarm panel 210 transmits alarm data to the alarm server 240 using techniques described above with respect to step 306 shown in FIG. 3.

The alarm server 240 receives the alarm data from the wireless communication module 214 (658). For example, the alarm server 240 receives the alarm data from the wireless communication module 214 using the techniques described above with respect to steps 308 shown in FIG. 3.

In response to receiving the alarm data, the alarm server 240 waits for a call from the alarm panel 210 (660). For instance, the alarm server 240 delays processing of the alarm data and monitors incoming calls for calls from the alarm panel 210. If the alarm server 240 does not receive a call from the alarm panel 210 in a predetermined and configurable amount of time, the alarm server 240 may initiate processing of the alarm data (e.g., transmit the alarm data to the monitoring system 230 as shown with the broken line), place a call to the alarm panel 210, or send a command to the alarm panel 210 instructing the alarm panel 210 to place a call to the alarm server 240.

After transmitting the alarm data to the alarm server 240, the alarm panel 210 accesses a number for the alarm server 240 (662) and places a call to the alarm server 240 (664). For example, the alarm panel 210 accesses, from electronic storage, a telephone number associated with the alarm server 240 and places a call to the alarm server 240 over a wireless voice channel. The alarm server 240 also may access a telephone number by receiving the telephone number in an electronic communication from the alarm server 240 or another electronic device. The alarm panel 210 may wait a predetermined amount of time prior to placing the call to increase the likelihood that the alarm server 240 receives the alarm data prior to receiving the call.

The alarm server 240 receives the call from the alarm panel 210 (666). For example, the alarm server 240 receives a wireless voice call placed by the wireless communication module 214 over a wireless voice channel and routed to the alarm server 240 by a wireless service provider associated with the wireless communication module 214. The alarm server 240 identifies the call as being from the alarm panel 210 and associates the call with the alarm data the alarm server 240 previously received from the alarm panel 210.

In response to receiving the call from the alarm panel 210, the alarm server 240 transmits the alarm data to the monitoring system 230. For example, the alarm server 240 transmits the alarm data to the monitoring system 230 over a POTS telephone line. The alarm server 240 may forward the received alarm data unchanged, or it may convert or supplement the received alarm data. In some implementations, the alarm server 240 transmits the alarm data to the monitoring system 230 using a communication medium that is different from the communication medium from which the alarm server 240 received the alarm data. For instance, the alarm server 240 may receive the alarm data from the wireless communication module 214 included in the alarm panel 210 over a wireless data channel and may transmit the alarm data to the monitoring system 230 over a POTS telephone line.

The monitoring system 230 receives the alarm data (670) and assigns the alarm data for operator processing (672). For example, the monitoring system 230 receives the alarm data and assigns the alarm data for operator processing using techniques described above with respect to steps 314 and 316 shown in FIG. 3.

After transmitting the alarm data to the monitoring system 230, the alarm server 240 patches the call received from the alarm panel 210 to the monitoring system 230 (674). In implementations in which the alarm server 240 transmits the alarm data to the monitoring system 230 over a POTS telephone line, the alarm server 240 patches the wireless voice call received from the alarm panel 210 onto the POTS telephone line with which the alarm server 240 transmitted the alarm data. By patching the wireless voice call from the alarm panel 210 onto the POTS telephone line with which the alarm server 240 transmitted the alarm data, the alarm server 240 may ensure that the voice call is routed to the operator handling the alarm data. For instance, the monitoring system 230 may treat the alarm server 240 as an alarm system monitored over a POTS telephone line. As such, the monitoring system 230 may receive the alarm data and establish a two-way voice communication session using techniques similar to those used for other alarm systems monitored directly over a POTS telephone line.

In patching the call received from the alarm panel 210 to the monitoring system 230, the alarm server 240 may initiate a call to the monitoring system 230 (e.g., after receiving confirmation from the monitoring system 230 of receipt of the alarm data) or may receive a call from the monitoring system 230. The alarm server 240 may connect the voice call established with the alarm panel to a voice call established with the monitoring system 230.

The monitoring system 230 establishes a two-way voice communication session (676). For instance, the monitoring system 230 routes or otherwise connects the patched voice call from the alarm server 240 to a communication device associated with the operator handling the alarm data. The operator may answer the call and establish a two-way voice communication session with the alarm panel 210 through the alarm server 240. The two-way voice communication session may be an intercom-like communication session between the operator and the alarm panel 210. The two-way voice communication session may enable the operator to listen-in to an area that is proximate to the alarm panel 210 or enable the operator to communicate with a person who is in an area proximate to the alarm panel 210.

Figure 7:
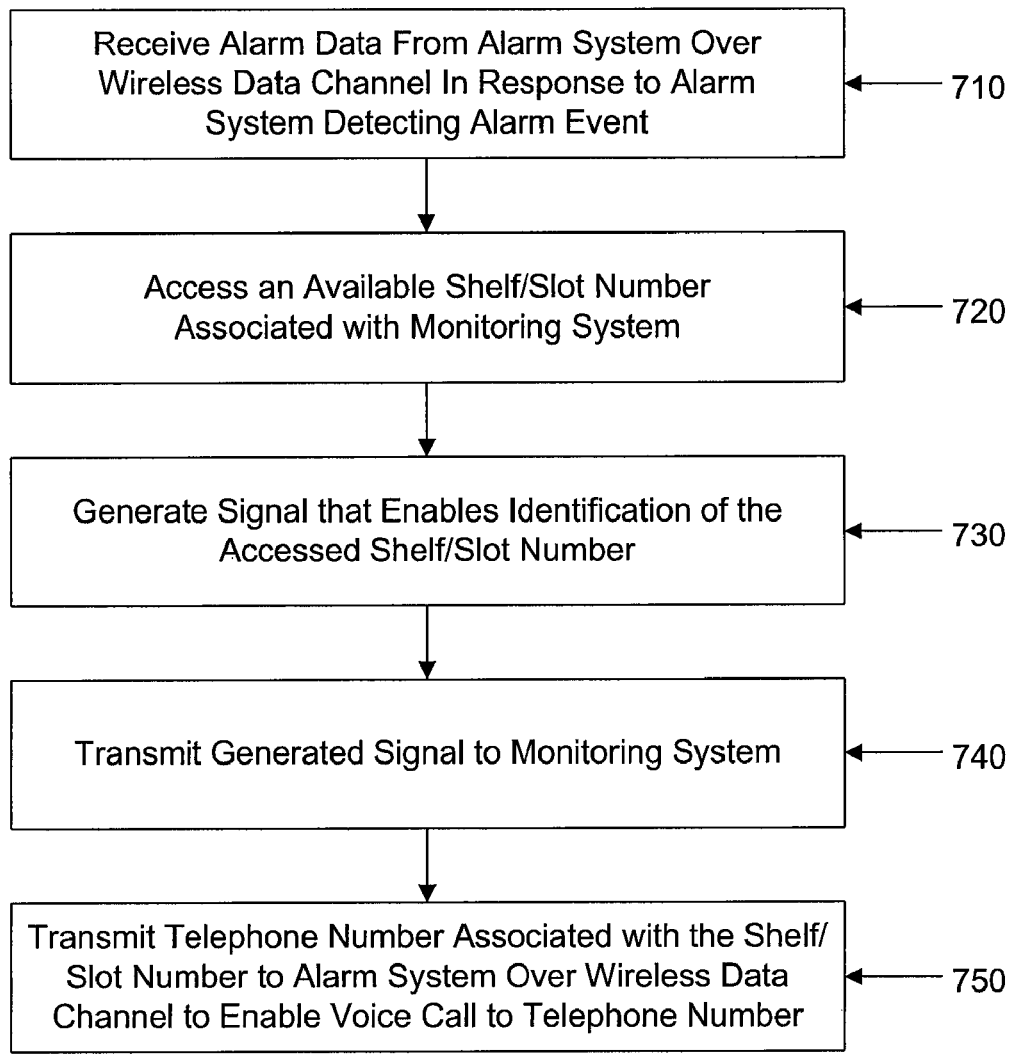
FIG. 7 is a flow chart illustrating an example of a process for establishing a voice communication session between an alarm system and an alarm operator using shelf and slot numbers.

FIG. 7 illustrates an example of a process 700 for establishing a voice communication session between an alarm system and an alarm operator using shelf and slot numbers. The operations in flow chart 700 are described generally as being performed by a processor. In some implementations, the processor may be included in an electronic device or system configured to send and receive communications over a network. For example, the processor may be included in an alarm server, a central monitoring station server, or another type of electronic device included in a system configured to monitor an alarm system. In another example, the operations of process 700 may be performed by multiple processors included in one or more electronic devices or systems.

The processor receives alarm data transmitted by an alarm system over a wireless data channel in response to the alarm system detecting an alarm event (710). For example, the processor may be included in an intermediary alarm server and the processor may receive data transmitted from an alarm system to the intermediary alarm server in response the alarm system detecting an alarm event (e.g., a security breach, a smoke detection event, etc.). The processor may receive alarm data transmitted by an alarm system over a wireless data channel in response to the alarm system detecting an alarm event using techniques described above with respect to step 110 shown in FIG. 1.

The processor accesses an available shelf/slot number associated with a monitoring system (720). For example, the processor may be included in an intermediary alarm server and the intermediary alarm server may maintain a list of available shelf/slot numbers associated with the monitoring system. In this example, the intermediary alarm server and the monitoring system may have an agreement by which the monitoring system allocates a pool of available shelf/slot number to the intermediary alarm server and assigns the allocated shelf/slot numbers to PBX extensions included in a PBX of the monitoring system.

The intermediary alarm server may maintain the allocated pairs of shelf/slot numbers and PBX extensions in electronic storage and assign an allocated pair to an alarm system that detects an alarm event. For instance, in response to receiving the alarm data from the alarm system, the processor included in the intermediary alarm server may access an available shelf/slot number from its allocated pool of shelf/slot numbers. An available shelf/slot number may be one that is not currently assigned to an alarm system that has detected an alarm event. To determine whether shelf/slot numbers are available, the processor may maintain data indicating which shelf/slot numbers are currently assigned to alarm systems and identify an available shelf/slot in response to receiving the alarm data by accessing the data indicating which shelf/slot numbers are currently assigned to alarm systems. The intermediary alarm server may maintain a number of allocated pairs of shelf/slot numbers and PBX extensions that is greater than the maximum number of simultaneous alarm events anticipated given the number of alarm systems that the intermediary alarm server is monitoring. In the event that an available shelf/slot number does not exist when the processor receives the alarm data, the processor may not provide two-way voice services in handling the alarm event, may wait until a shelf/slot number becomes available and assign that shelf/slot to the alarm system, or may provide two-way voice services using another mechanism or another monitoring service.

In some implementations, shelf/slot numbers are numbers associated with incoming POTS telephone lines of the monitoring system. A monitoring system that communicates with an alarm panel using a POTS telephone line may identify the alarm panel based on the shelf/slot number associated with the POTS telephone line that the alarm panel is using to communicate with the monitoring system. The monitoring system may be able to provide two-way voice services to the alarm panel by identifying the shelf/slot number of the POTS telephone line that the alarm panel is using to send alarm data to the monitoring system and establishing the two-way voice communication session over that POTS telephone line. As such, in these implementations, alarm data and two-way voice communication sessions are provided over a common communication medium that the monitoring system may use to route the communications to the appropriate operator. The monitoring system may be able to assign shelf/slot number to PBX extensions such that calls placed to PBX extensions may be routed to operators using the same technology used to route two-way voice communication sessions over POTS telephone lines.

The processor generates a signal the enables identification of the accessed shelf/slot number (730). For example, the processor generates an electronic communication that identifies the shelf/slot number accessed and assigned to the alarm system that transmitted the alarm data. In this example, the signal may include the alarm data received from the alarm system or other information that may be used to identify the alarm system. The processor may format the signal for transmission over a communication medium other than the communication medium from which the processor received the alarm data.

The processor transmits the generated signal to the monitoring system (740). For example, the processor may transmit the generated signal to the monitoring system in an electronic communication over a network. The processor may transmit the generated signal to the monitoring system over a wired connection using a digital dialer signal. In other arrangements, the processor may transmit the generated signal to the monitoring system over a wireless connection or may transmit the generated signal to the monitoring system using other communication protocols, such as IP packets. By transmitting the generated signal to the monitoring system, the monitoring system associates the accessed shelf/slot identified in the signal with the alarm data transmitted from the alarm panel such that calls placed to the wireless call port (e.g., PBX extension) associated with the shelf/slot number by the monitoring system may be routed to an operator handling the alarm data associated with the alarm panel. Because the monitoring system assigned the wireless call port (e.g., PBX extension) with a shelf/slot number and associated the alarm data with the shelf/slot number, a wireless voice call placed to the shelf/slot may be routed to an operator handling the alarm event associated with the alarm data using the same technology used to route two-way voice communication sessions to operators for alarm systems that communicate with the monitoring system using a POTS telephone line.

The processor transmits a telephone number (e.g., PBX extension) associated with the shelf/slot number to the alarm system over the wireless data channel to enable the alarm system to place a call over a wireless voice channel to the telephone number at the monitoring system associated with the shelf/slot number (750). For example, the processor transmits the telephone number to the alarm system in a data communication sent over a wireless data channel. In response to receiving the telephone number, the alarm system places a wireless voice call over a wireless voice channel to the telephone number. Because the processor transmitted the generated signal that identified the accessed shelf/slot number to the monitoring system, the monitoring system associated the alarm data from the alarm system with the shelf/slot number or the telephone number (e.g., PBX extension) assigned to the shelf/slot number. Based on the association of the alarm data from the alarm system with the shelf/slot number or the telephone number, the monitoring system may, using technology used to route two-way voice communication session over POTS telephone lines, route the call placed by the alarm system to the operator that is handling the alarm event associated with the alarm data. Thus, a two-way voice communication session may be established between the operator handling the alarm event associated with the alarm data and the alarm system.

In some implementations, the monitoring system or the alarm system may provide a disconnect message to the processor included in the intermediary alarm server in response to a two-way voice communication session completing. In implementations in which the alarm system provides the disconnect message, the disconnect message may be transmitted to the processor over a wireless data channel. In implementations in which the monitoring system provides the disconnect message, the disconnect message may be transmitted to the processor over a wired telephone line. In response to receiving the disconnect message, the processor may reallocate the shelf/slot number assigned to the alarm system to the pool of available shelf/slot numbers. By reallocating the shelf/slot number as available, the processor may assign the shelf/slot number to another alarm system that detects an alarm event. The other alarm system may be different from and unrelated to the alarm system to which the processor previously assigned the shelf/slot number.

Figure 8:
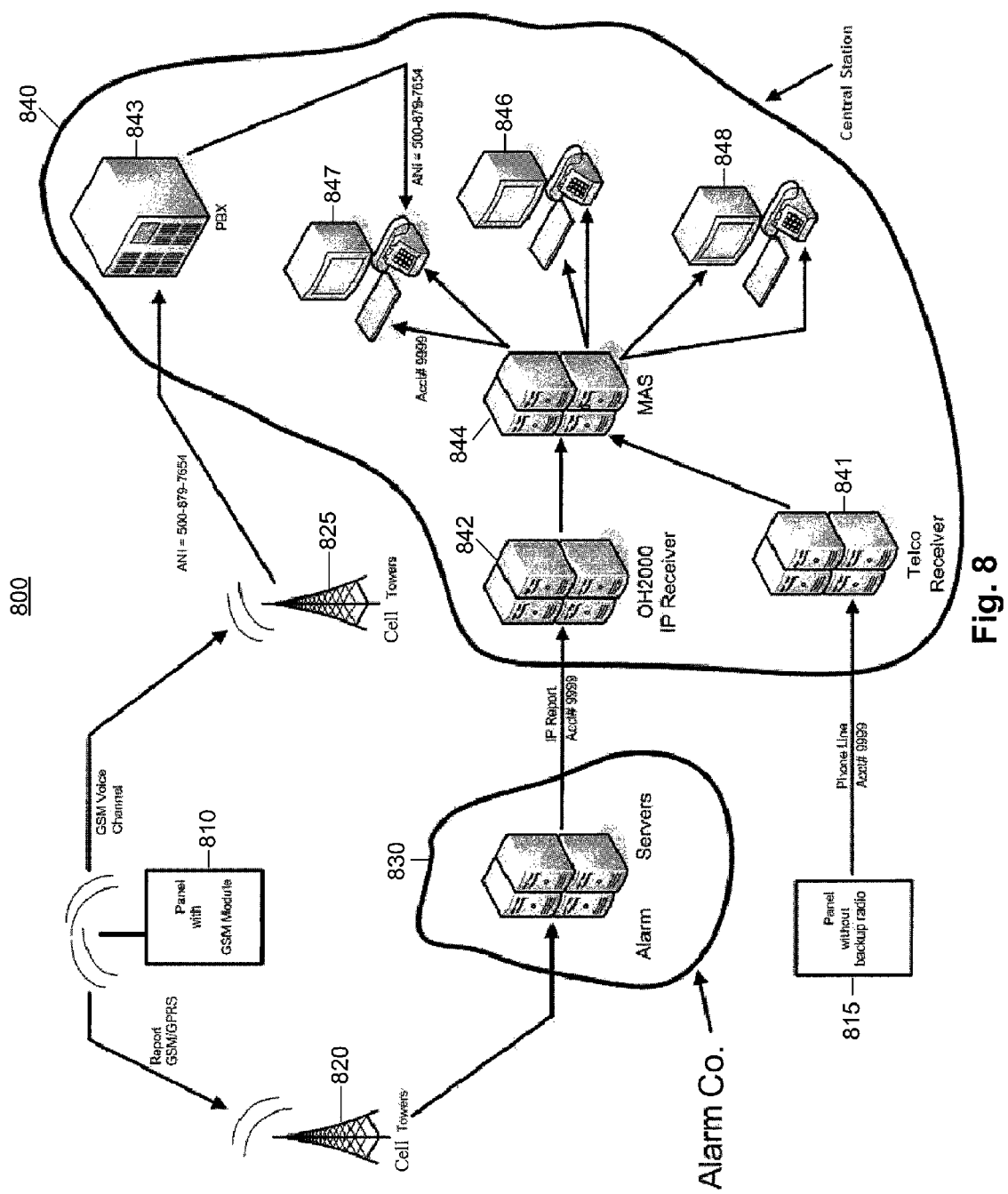
FIG. 8 is a block diagram of an example of an electronic system configured to establish a voice communication session between an alarm system and an alarm operator.

FIG. 8 illustrates an example of an electronic system 800 configured to establish a voice communication session between an alarm system and an alarm operator. The system 800 includes an alarm panel with a GSM module 810, a panel without a backup radio 815, cell towers 820 and 825, an intermediary alarm server 830, and a central monitoring station 840. The alarm panel 810 communicates with the intermediary alarm server 830 and the central monitoring station 840 over cell towers 820 and 825 to receive alarm monitoring services and the alarm panel 815 communicates with the central monitoring station 840 over a telephone line to receive alarm monitoring services.

The alarm panel with GSM module 810 may be an alarm panel included in alarm system configured to monitor a location, such as a commercial building or a residence, for alarm events. In some implementations, the alarm panel may be a security panel included in a security system configured to monitor a location for security breaches. The alarm panel 810 may be similar to the alarm panel 210 described above with respect to the FIG. 2. In this case, the wireless communication module 214 described with respect to FIG. 2 is a GSM module configured to communicate over a GSM/GPRS data channel and a GSM voice channel. The alarm panel 810 may not have a connection to a wired telephone line.

The alarm panel without radio backup 815 may be an alarm panel included in alarm system configured to monitor a location, such as a commercial building or a residence, for alarm events. In some implementations, the alarm panel may be a security panel included in a security system configured to monitor a location for security breaches. The alarm panel 810 may be similar to the alarm panel 210 described above with respect to the FIG. 2, except that the alarm panel 815 includes a wired communication module (e.g., a wired modem) rather than the wireless communication module 214. The alarm panel 815 may communicate with the central monitoring station 840 directly over a wired telephone line and the central monitoring station 840 may receive alarm data from the alarm panel 815 over the wired telephone line and establish a two-way voice communication session with the alarm panel 815 over the wired telephone line.

The cell towers 820 and 825 are cellular sites configured to transport cellular communications. For example, the cell towers 820 and 825 may include antennas and electronic communications equipment that are placed to create a cell in a cellular network configured to exchange wireless communications with electronic devices (e.g., cellular telephones, personal digital assistants (PDAs), wireless communication modules, etc.). The cell towers 820 and 825 may include an elevated structure for mounting antennas, and one or more sets of transmitter/receivers, transreceivers, digital signal processors, control electronics, a global positioning system (GPS) receiver, and regular and backup electrical power sources. The cell towers 820 and 825 may be used by one or more cellular service providers that provide wireless communication services.

In some implementations, the cellular service providers may allocate particular frequency bands for wireless data channels and different, particular frequency bands for wireless voice channels. In these implementations, the cellular service providers may optimize processing operations associated with the wireless data channels for transmission of digital data and may optimize processing operations associated with the wireless voice channels for transmission of voice communications. For example, as shown in FIG. 8, the alarm panel 810 may establish a two-way voice communication session with the central monitoring station 840 over the cell tower 825 using a wireless voice channel (e.g., a GSM voice channel) designated by a cellular service provider. In addition, the alarm panel 810 may transmit alarm data to the alarm server 830 over the cell tower 820 using a wireless data channel (e.g., a GSM/GPRS data channel) designated by the cellular service provider.

The alarm server 830 may include one or more electronic devices (e.g., servers, hosts, computers, etc.) configured to provide alarm monitoring services by exchanging electronic communications with the alarm panel 810 over a wireless data channel and the central monitoring station 840 over a wired IP-based network. For example, the alarm server 830 may be configured to monitor alarm events generated by the alarm panel 810. In this example, the alarm server 830 may exchange data communications with the GSM module included in the alarm panel 810 over a GSM/GPRS data channel to receive information regarding alarm events detected by the alarm panel 810.

In some examples, the alarm server 830 may route the alarm data received from the GSM module to the central monitoring station 840. For example, the alarm server 830 may transmit the alarm data to the central monitoring station 840 as IP packets over a wired IP-based network. The alarm server 830 may add information the alarm data received from the GSM module and may convert or transform the alarm data into a format used by the central monitoring station 840.

The alarm server 830 also may facilitate establishment of a voice communication session between the central monitoring station 840 and the GSM module included in the alarm panel 810. For example, the alarm server 830 may maintain, in electronic storage, a pool of pairs of shelf/slot numbers and PBX extensions that the central monitoring station 840 allocated to the alarm server 830. In this example, the alarm server 830 may assign a shelf/slot number to the alarm panel 810 in response to receiving alarm data from the alarm panel 810. The alarm server 830 may provide information to the central monitoring station 840 identifying the assigned shelf/slot number and provide information to the alarm panel 810 identifying the assigned PBX extension. By providing the assigned shelf/slot number to the central monitoring station 840 and providing the assigned PBX extension to the alarm panel 810, the alarm panel 810 may place a wireless voice call to a telephone number associated with the assigned PBX extension over a wireless voice channel. Because the central monitoring station 840 received information identifying the shelf/slot assigned to the alarm panel 810 and previously assigned that shelf/slot number to the PBX extension to which the alarm panel 810 placed the wireless voice call, the central monitoring station 840, using the shelf/slot number, may route the wireless voice call to the operator handling the alarm data sent from the alarm panel 810 to establish a two-way voice communication session.

The central monitoring station 840 includes a telco receiver 841, an IP receiver 842, a PBX 843, a server 844, and multiple terminals 846-848. The server 844 executes instructions of a program that controls operations and routing of communications for the central monitoring station 840. For example, the server 844 executes Monitoring Automation Systems (MAS) software.

The telco receiver 841 is an electronic device configured to provide an interface to wired telephone lines (e.g., POTS telephone lines) of a telephone company. The telco receiver 841 may enable the central monitoring station to receive electronic data and voice communications over wired telephone lines. In some examples, the wired telephone lines are assigned shelf/slot numbers in the telco receiver 841 for purposes of identification. For instance, the telco receiver 841 may receive alarm data from the alarm panel 815 over a wired telephone line with a particular shelf/slot number and provide the alarm data to the server 844 with the shelf/slot number. The server 844 routes the alarm data to one of the terminals 846-848 and may establish a two-way voice communication session between an operator at the terminal processing the alarm data and the alarm panel 815 using the telco receiver 841. The server 844 may route the two-way voice communication session between the operator at the terminal processing the alarm data and the alarm panel 815 by using the shelf/slot number of the telephone line from which the telco receiver 841 received the alarm data to identify the alarm panel 815.

The IP receiver 842 is an electronic device configured to provide an interface to an IP-based network. For example, the IP receiver 842 may provide an interface to the Internet and may be configured to receive IP packets. For instance, the IP receiver 842 may receive alarm data from the alarm server 842 as IP packets over a wired IP-based network. In some examples, the IP receiver receives information from the alarm server 830 identifying a shelf/slot number the alarm server 830 assigned to the alarm panel 810. In these examples, the server 844 routes the alarm data to one of the terminals 846-848 and associates the alarm data with the assigned shelf/slot number. By associating the alarm data with the assigned shelf/slot number, when the central monitoring station 840 receives a wireless voice call from the alarm panel 810 at the PBX extension associated with the assigned shelf/slot number, the server 844 may automatically route the wireless voice call to the terminal processing the alarm data using the same software (e.g., shelf/slot number routing software) used to route the two-way voice communication session for the alarm panel 815 to the appropriate terminal.

The PBX 843 is a telephone exchange that serves the central monitoring station 840. The PBX may receive wireless voice calls over the cell tower 825. The central monitoring station 840 may assign shelf/slot number (or other identifiers) to PBX extensions such that calls received by the PBX may be routed in a manner similar to calls handled by the telco receiver 841 as discussed above.

The terminals 846-848 are electronic devices that an operator uses to handle an alarm event. In some implementations, the terminals 846-848 may include a processing device (e.g., a computer) and a communication device (e.g., a telephone). In these implementations, an operator may use the processing device to process alarm data and may use the communication device to engage in a two-way voice communication session with an alarm panel. The terminals 846-848 may be similar to the terminals 232 and 234 described above with respect to FIG. 2.

Figure 9:
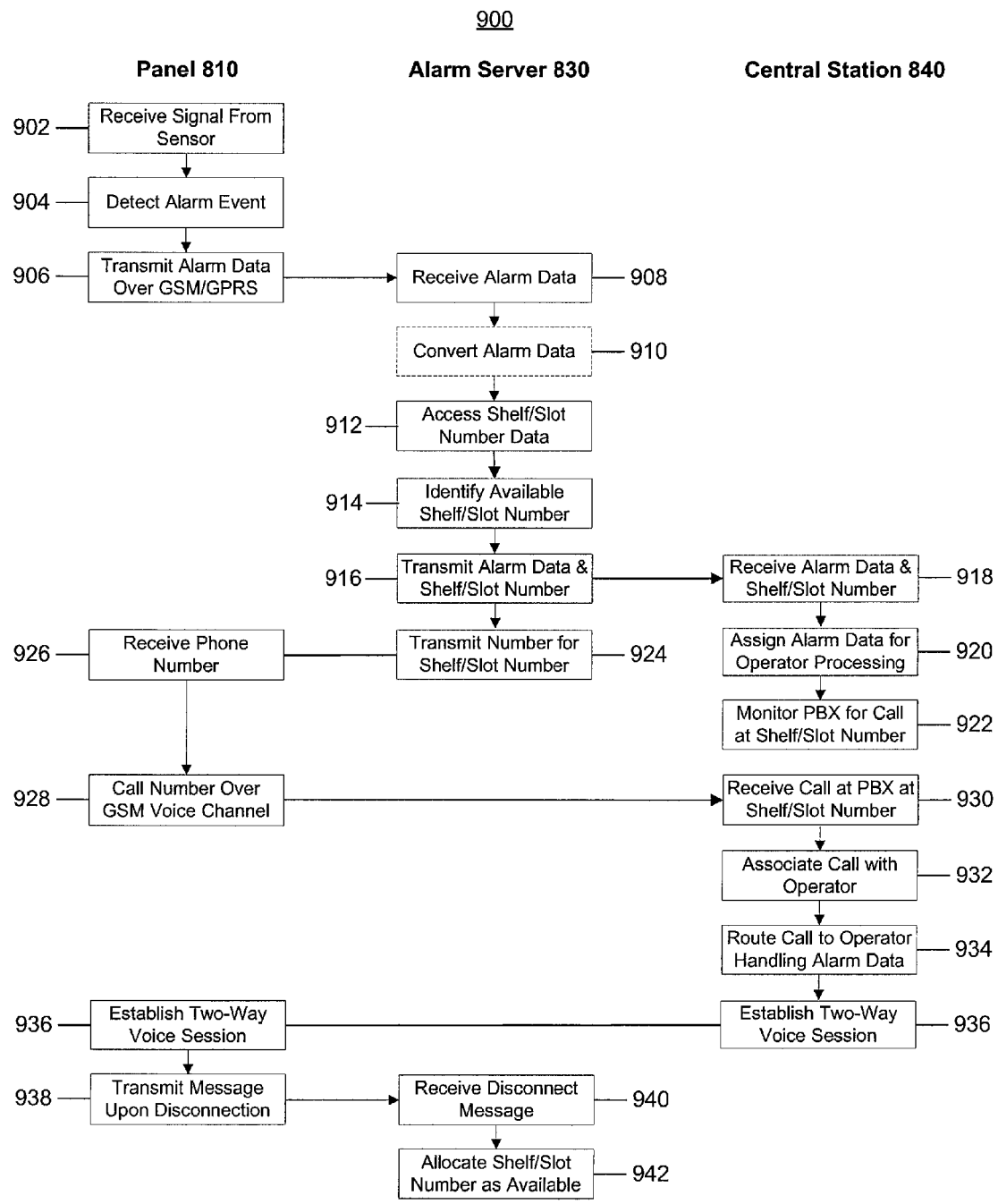
FIG. 9 is a flow chart illustrating an example of a process for establishing a voice communication session between an alarm system and an alarm operator using shelf and slot numbers.

FIG. 9 illustrates an example of a process 900 for establishing a voice communication session between an alarm system and an alarm operator using shelf and slot numbers. For convenience, particular components described with respect to FIG. 8 are referenced as performing the process 900. However, similar methodologies may be applied in other implementations where different components are used to define the structure of the system, or where the functionality is distributed differently among the components.

The alarm panel 810 receives a signal from a sensor (902) and detects an alarm event based on the signal (904). For example, the alarm panel 810 may receive a signal from a sensor that includes sensed values that may indicate a security breach or other alarm event. In this example, the alarm panel 810 processes the sensed values to determine if an alarm event has occurred. The alarm panel 810 may receive a signal from a sensor and detect an alarm event based on the signal using techniques described above with respect to steps 302 and 304 shown in FIG. 3.

The alarm panel 810 transmits alarm data over a GSM/GPRS data channel using the GSM module (906). For example, the alarm panel 810 may transmit the alarm data as IP packets or an SMS message over a GSM/GPRS data channel designated as a data channel by a service provider operating the cell tower 820. The alarm data may include information sufficient for the alarm server 830 to handle the alarm event. For instance, the alarm data may include information identifying the alarm panel 810, the user of the alarm panel 810, or the location associated with the alarm panel 810. The alarm data may include a customer account number with which the alarm server 830 may access stored information associated with the customer's account. In addition, the alarm data may include information indicating the type of alarm event (e.g., security breach, fire alarm, etc.), the type of services needed (e.g., police services, fire services, etc.), and the specific sensor or detected condition that triggered the alarm event (e.g., basement door sensor, third floor smoke detector, etc.).

The alarm server 830 receives the alarm data from the alarm panel 810 (908). For instance, the alarm server 830 receives the alarm data over the GSM/GPRS data channel using a wireless communication interface. Upon receipt of the alarm data, the alarm server 830 processes the alarm data to determine information associated with the alarm event. In some implementations, the alarm server 830 extracts an account number from the alarm data and accesses, from electronic storage associated with the alarm server 830, information associated with the account number.

The alarm server 830, optionally, converts the alarm data (910). The alarm server 830 may convert the content of the alarm data from a first format into a second format used by the central monitoring station 840. In addition, the alarm server 830 may convert the protocol used to transmit the alarm data from a first communication protocol used by the alarm panel 810 to a second communication protocol used by the central monitoring station 840.

The alarm server 830 accesses shelf/slot number data (912) and identifies an available shelf/slot number based on the accessed data (914). For example, as discussed above, the central monitoring station 840 may assign shelf/slot numbers with PBX extensions included in the PBX 843 and allocate a pool of those shelf/slot numbers to the alarm server 830. In this example, the alarm server 830 may maintain the allocated pool of shelf/slot numbers and associated PBX extensions in electronic storage and temporarily assigns a shelf/slot number/PBX extension pair to an alarm panel that has detected an alarm event. The alarm server 830 maintains data indicating which shelf/slot number/PBX extension pairs have been assigned to which alarm panels and which shelf/slot number/PBX extension pairs are available (e.g., not currently assigned to an alarm panel). In response to receiving the alarm data, the alarm server 830 accesses this information and identifies an available shelf/slot number based on the accessed information. The alarm server 830 may temporarily assign the identified shelf/slot number/PBX extension pair to the alarm panel 810 for purposes of processing the detected alarm event.

The alarm server 830 transmits the alarm data and the assigned shelf/slot number to the central monitoring station 840 (916). For example, the alarm server adds information identifying the assigned shelf/slot number to the alarm data and transmits the alarm data with the information identifying the assigned shelf/slot number to the central monitoring station 840 in IP packets over an IP-based network.

The central monitoring station 840 receives the alarm data and the assigned shelf/slot number (918) and assigns the alarm data for operator processing (920). For instance, the central monitoring station 840 receives the alarm data and the assigned shelf/slot number in IP packets using the IP receiver 842. The IP receiver 842 sends the alarm data and the assigned shelf/slot number to the server 844 and the server 844 assigns the alarm data for operator processing and associates the alarm data with the assigned shelf/slot number. By associating the alarm data with the assigned shelf/slot number, the server 844 may automatically route a call received by the PBX 843 at the PBX extension associated with the assigned shelf/slot to the operator processing the alarm data. The server 844 may assign the alarm data for operator processing using techniques described above with respect to step 316 shown in FIG. 3.

The central monitoring station 840 monitors the PBX 843 for a call at the PBX extension associated with the assigned shelf/slot number (922). For example, because the central monitoring station 840 received alarm data with the assigned shelf/slot number, the central monitoring station 840 expects to receive a call at the PBX extension associated with the assigned shelf/slot number for establishing a two-way voice communication session. The central monitoring station 840 may continuously monitor for a call at the PBX extension, periodically monitor for a call at the PBX extension, or respond to a call at the PBX extension when a call is received at the PBX extension.

The alarm server 830 transmits a telephone number associated with the PBX extension that corresponds to the assigned shelf/slot number to the alarm panel 810 (924). For example, the alarm server transmits the telephone number over the GSM/GPRS data channel to the alarm panel 810. In some implementations, the alarm server 830 transmits the telephone number to the alarm panel 810 simultaneously with transmitting the alarm data and assigned shelf/slot to the central monitoring station 840, transmits the telephone number to the alarm panel 810 after a predetermined delay from transmitting the alarm data and assigned shelf/slot to the central monitoring station 840, or transmits the telephone number to the alarm panel 810 after receiving a confirmation message from the central monitoring station 840 indicating that the central monitoring station 840 has received the alarm data and associated the alarm data with the assigned shelf/slot number.

The alarm panel 810 receives the telephone number associated with the PBX extension that corresponds to the assigned shelf/slot number (926) and places a wireless voice call to the received telephone number over a GSM voice channel (928). For example, the alarm panel 810 receives the telephone number from the alarm server 830 over the GSM/GPRS data channel over the cell tower 820 and places a call to the telephone number using the GSM voice channel over the cell tower 825.

The central monitoring station 840 receives the wireless voice call using the PBX 843 (930). For instance, the PBX 843 receives the wireless voice call using the GSM voice channel over the cell tower 825 at the PBX extension associated with the assigned shelf/slot number. Because the alarm server 830 transmitted the telephone number associated with the PBX extension that corresponds to the assigned shelf/slot number to the alarm panel 810 in response to assigning the shelf/slot number, the alarm panel 810 may place a call to the telephone number associated with the appropriate PBX extension at the central monitoring station 840.

The central monitoring station 840 associates the wireless voice call from the alarm panel 810 with the operator handling the alarm data sent from the alarm panel 810 (932) and routes the wireless voice call to the operator handling the alarm data sent from the alarm panel 810 (934). For example, the central monitoring station 840 determines the shelf/slot number associated with the PBX extension at which the wireless voice was received. Because the alarm server 830 transmitted the shelf/slot number assigned to the alarm panel 810 along with the alarm data from alarm panel 810, the central monitoring station 840 was able to associate the alarm data from the alarm panel 810 with the assigned shelf/slot number. Accordingly, in response to determining the shelf/slot number associated with the PBX extension at which the wireless voice was received, the central monitoring station 840 may identify the operator handling alarm data associated with the determined shelf/slot number (e.g., the operator handling the alarm data sent from the alarm panel 810). After identifying the operator handling alarm data associated with the determined shelf/slot number, the central monitoring station 840 accesses communication information associated with the operator and routes the wireless voice call to a communication device associated with the operator.

The central monitoring station 840 and the alarm panel 810 establish a two-way voice communication session (936). For instance, by routing the wireless voice call from the alarm panel 810 to a communication device associated with the operator handling the alarm data sent from the alarm panel 810, the operator may answer the call and establish a two-way voice communication session with the alarm panel over the GSM voice channel. The two-way voice communication session may be an intercom-like communication session between the operator and the alarm panel 810. The two-way voice communication session may enable the operator to listen-in to an area that is proximate to the alarm panel 810 or enable the operator to communicate with a person who is in an area proximate to the alarm panel 810.

In response to disconnection of the two-way voice communication session, the alarm panel 810 transmits a disconnect message to the alarm server 830 (938). For example, the alarm panel 810 transmits the disconnect message to the alarm server 830 using the GSM/GPRS data channel over the cell tower 820. The disconnect message may indicate that the two-way voice communication session has been completed and the alarm server 830 may reallocate the assigned shelf/slot number/PBX extension pair as available. The disconnect message may include information identifying the alarm panel 810 and/or information identifying the shelf/slot number/PBX extension pair assigned to the alarm panel 810.

The alarm server 830 receives the disconnect message (940) and allocates the assigned shelf/slot number as available (942). The alarm server 830 may receive the disconnect message using the GSM/GPRS data channel over the cell tower 820. The alarm server 830 may process the disconnect message to identify the shelf/slot number/PBX extension pair associated with the two-way voice communication session that has become disconnected. In response to identifying the shelf/slot number/PBX extension pair, the alarm server 830 may update data used to track the assignment of shelf/slot number/PBX extension pairs to indicate that this particular shelf/slot number/PBX extension pair is now available. By updating the data, the alarm server 830 may assign the shelf/slot number/PBX extension pair to another alarm system in response to the other alarm system detecting an alarm event. By using disconnect messages, the alarm server 830 may maintain data indicating which of the shelf/slot number/PBX extension pairs in its allocated pool are currently assigned to alarm panels and which are available.

Figure 10:
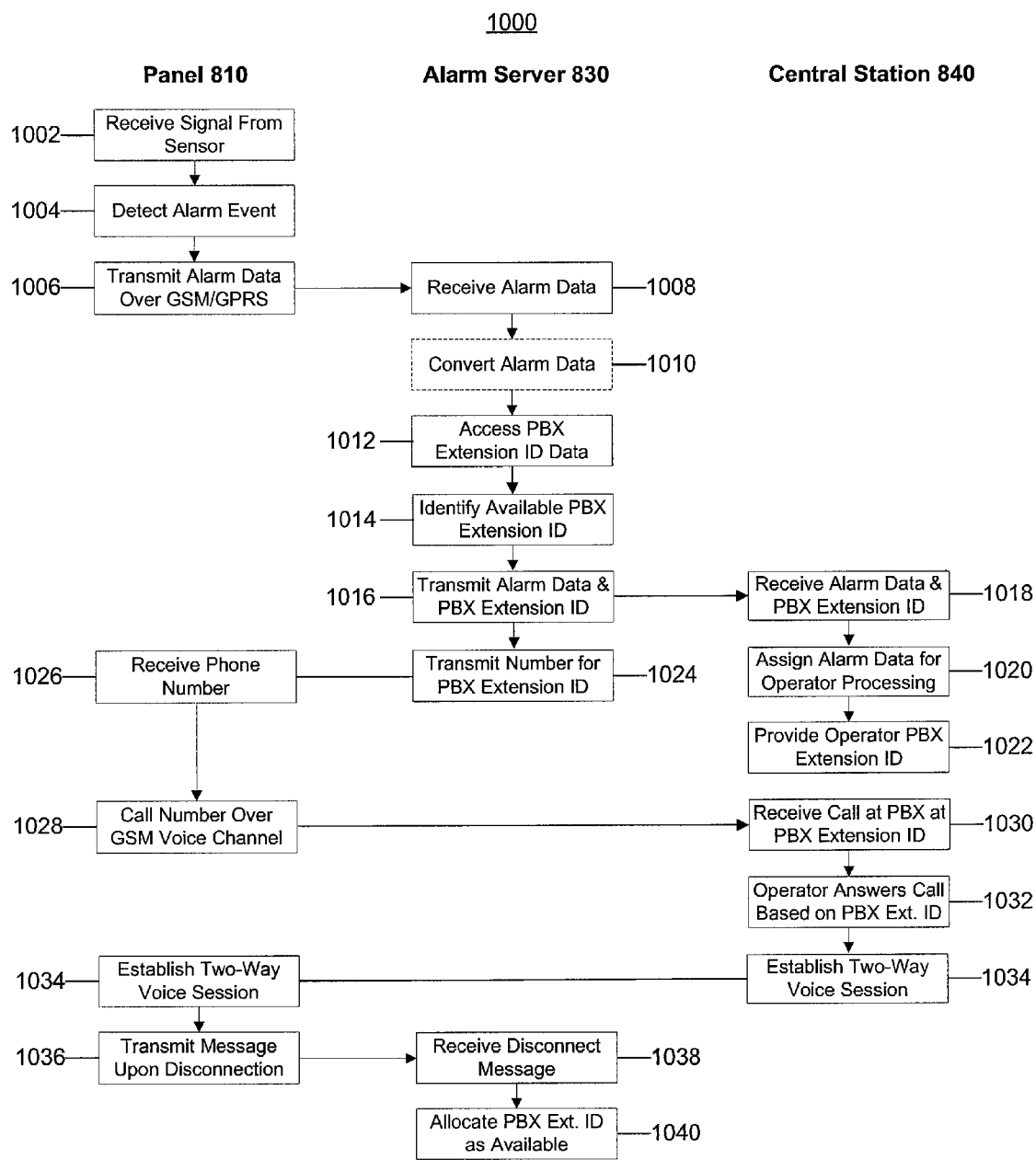
FIG. 10 is a flow chart illustrating an example of a process for establishing a voice communication session between an alarm system and an alarm operator using extension identifiers.

FIG. 10 illustrates an example of a process 1000 for establishing a voice communication session between an alarm system and an alarm operator using extension identifiers. For convenience, particular components described with respect to FIG. 8 are referenced as performing the process 1000. However, similar methodologies may be applied in other implementations where different components are used to define the structure of the system, or where the functionality is distributed differently among the components.

The alarm panel 810 receives a signal from a sensor (1002), the detects an alarm event based on the received signal (1004), and transmits alarm data over a GSM/GPRS data channel using the GSM module (1006). For example, the alarm panel 810 receives a signal from a sensor, the detects an alarm event based on the received signal, and transmits alarm data over a GSM/GPRS data channel using the GSM module using techniques similar to those described above with respect to steps 902, 904, and 906 shown in FIG. 9.

The alarm server 830 receives the alarm data (1008) and, optionally, converts the alarm data (1010). The alarm server 830 may receive the alarm data and, optionally, converts the alarm data using techniques similar to those described above with respect to steps 908 and 910 shown in FIG. 9.

The alarm server 830 accesses PBX extension identifier data (1012), identifies an available PBX extension identifier (1014), and transmits the alarm data and the identified PBX extension identifier to the central monitoring station 840 (1016). In some implementations, the central monitoring station 840 allocates a pool of PBX extension identifiers to the alarm server 830 and the alarm server 830 maintains data identifying the allocated pool of PBX extension identifiers and indicating whether each of the PBX extension identifiers is available to assign to an alarm panel. In these implementations, the alarm server 830 maintains a poll of allocated PBX extension identifiers in a manner similar to how the alarm server 830 maintains a pool of allocated shelf/slot number/PBX extension pairs described with respect to FIG. 9 except that the PBX extension identifiers have not been assigned shelf/slot numbers by the central monitoring station 840. Accordingly, the alarm server 830 may access PBX extension identifier data, identify an available PBX extension identifier, and transmit the alarm data and the identified PBX extension identifier to the central monitoring station 840 using techniques similar to those described above with respect to steps 912, 914, and 916 shown in FIG. 9.

The central monitoring station 840 receives the alarm data and assigned PBX extension identifier (1018) and assigns the alarm data for operator processing (1020). For instance, the central monitoring station 840 receives the alarm data and assigned PBX extension identifier and assigns the alarm data for operator processing using techniques similar to those described above with respect to steps 918 and 920 shown in FIG. 9.

The central monitoring station 840 provides the operator processing the alarm data with the PBX extension identifier (1022). For example, the central monitoring station 840 may send the assigned PBX extension identifier to the terminal that the operator is using to process the alarm data. In this example, the terminal may render a display to the operator identifying the assigned PBX extension identifier. By providing the operator with the assigned PBX extension identifier, the operator may know that a call placed to that PBX extension identifier is intended for the operator and may be from the alarm panel 810. Accordingly, the operator may answer a call placed to that PBX extension identifier or may configure their communication device to receive calls placed to that PBX extension identifier.

The alarm server 830 transmits the telephone number associated with the assigned PBX extension identifier to the alarm panel 810 (1024). The alarm server 830 may transmit the telephone number associated with the assigned PBX extension identifier to the alarm panel 810 using techniques similar to those described above with respect to step 924 shown in FIG. 9.

The alarm panel 810 receives the telephone number associated with the assigned PBX extension identifier (1026) and places a wireless voice call to the received telephone number over a GSM voice channel (1028). For instance, the alarm panel 810 receives the telephone number associated with the assigned PBX extension identifier and places a wireless voice call to the received telephone number over a GSM voice channel using techniques similar to those described above with respect to steps 1026 and 1028 shown in FIG. 9.

The central monitoring station 840 receives the wireless voice call using the PBX 843 (1030). For example, the central monitoring station 840 receives the wireless voice call using the PBX 843 using techniques similar to those described above with respect to step 930 shown in FIG. 9.

The central monitoring station 840 enables the operator handling the alarm data sent from the alarm panel 810 to answer the wireless voice call based on the PBX extension identifier (1032). For example, because the central monitoring system 840 provided the assigned PBX extension identifier to the operator handling the alarm data sent from the alarm panel 810, the operator may answer a call placed to the assigned PBX extension identifier. In some implementations, the operator may notice that a call is received at the assigned PBX extension identifier from the alarm panel 810 and answer the call. In other implementations, the operator may temporarily configure their communication device to receive calls placed to the telephone number associated with the assigned PBX extension identifier such that the communication device associated with the operator receives the call from the alarm panel 810. By enabling the operator to determine that a call placed to the assigned PBX extension identifier is from the alarm panel 810 and enabling the operator to answer the call, the central monitoring station 840 may establish a two-way voice communication session between the operator handling the alarm data and the alarm panel 810.

The central monitoring station 840 and the alarm panel 810 establish a two-way voice communication session (1034). For example, the central monitoring station 840 and the alarm panel 810 establish a two-way voice communication session using techniques similar to those described above with respect to step 936 shown in FIG. 9.

In response to disconnection of the two-way voice communication session, the alarm panel 810 transmits a disconnect message to the alarm server 830 (1036). The alarm panel 810 may transmit a disconnect message to the alarm server 830 using techniques similar to those described above with respect to step 938 shown in FIG. 9.

The alarm server 830 receives the disconnect message (1038) and allocates the assigned PBX extension identifier as available (1040). For instance, the alarm server 830 receives the disconnect message and allocates the assigned PBX extension identifier as available using techniques similar to those described above with respect to steps 940 and 942 shown in FIG. 9.

Figure 11:
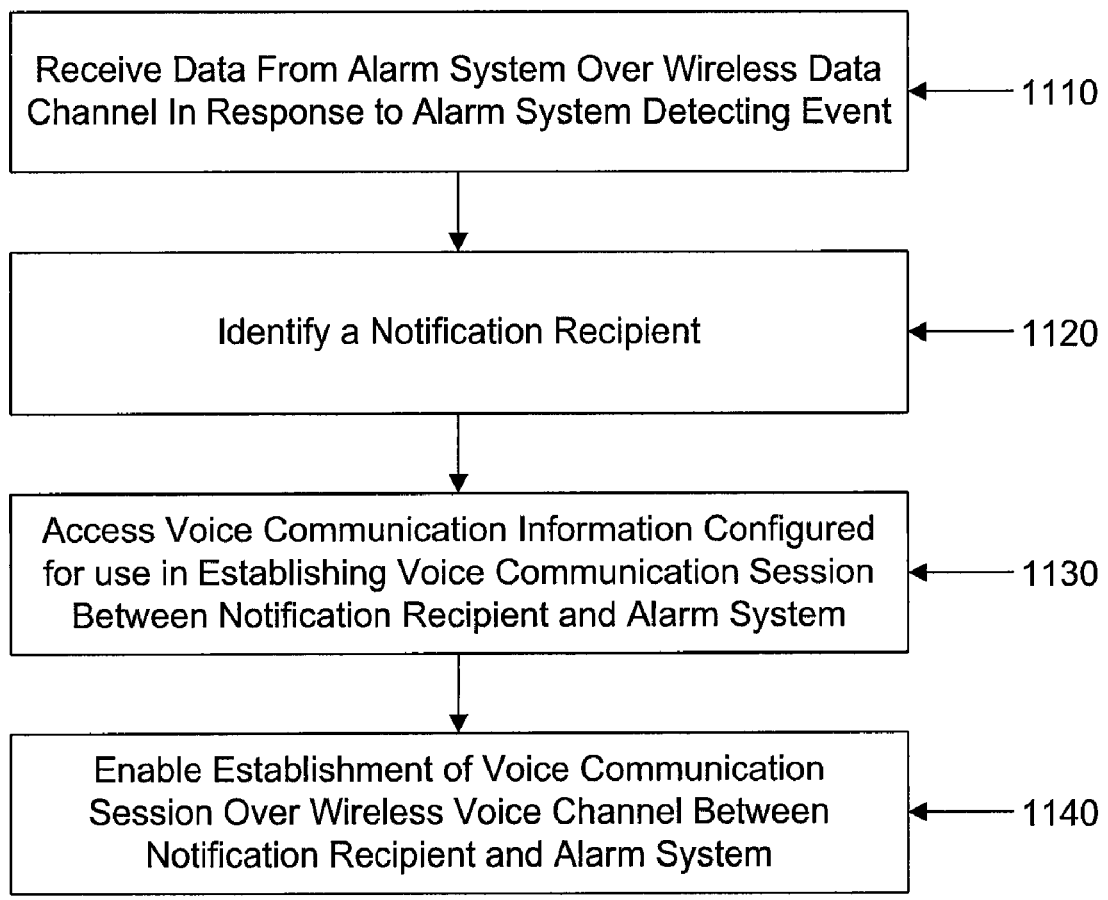
FIG. 11 is a flow chart illustrating an example of a process for establishing a voice communication session between an alarm system and a notification recipient.

FIG. 11 illustrates an example of a process 1100 for establishing a voice communication session between an alarm system and a notification recipient. The operations in flow chart 1100 are described generally as being performed by a processor. In some implementations, the processor may be included in an electronic device or system configured to send and receive communications over a network. For example, the processor may be included in an alarm server, a central monitoring station server, or another type of electronic device included in a system configured to monitor an alarm system. In another example, the operations of process 1100 may be performed by multiple processors included in one or more electronic devices or systems.

The processor receives event data from an alarm system over a wireless data channel in response to the alarm system detecting an event (1110). For example, the processor may receive event data from the alarm system over a GSM/GPRS data channel, a wireless data channel configured to transport IP packets, a wireless data channel configured to transport SMS message, or any other type of wireless data channel configured to transmit data. The event data may include alarm data as described above with respect to FIGS. 1-10 and the processor may receive event data from an alarm system over a wireless data channel in response to the alarm system detecting an event using techniques similar to those described above with respect to step 110 shown in FIG. 1.

In some implementations, the event data may be different from alarm data and may indicate an event or physical condition that does not give rise to an alarm event reported to a monitoring station, but may be of interest to a notification recipient or owner of the alarm system. For example, the event data may indicate that a medicine cabinet has been opened a residence monitored by the alarm system. In this example, although the event of the medicine cabinet being opened may not constitute an alarm event that is reported to a monitoring station, the event of the medicine cabinet being opened may be of interest to an owner of the alarm system and the owner may wish to be notified of the event. By notifying the owner of the event, the owner may be able to take action to determine whether a child has gotten into the medicine cabinet or whether an elderly person has taken the right medication. Other examples of events may include a temperature level in a residence (e.g., an owner of the residence may want to be notified if a child or a guest has adjusted a thermostat to a low level), an oven being turned on (e.g., an owner of the residence may want to be notified if the oven has been turned on to prevent a potentially dangerous condition), a video game system or television being turned on (e.g., an owner of the residence may want to be notified if the video game system or television is turned on to monitor a child's use of those devices), etc.

In response to receiving the event data, the processor identifies a notification recipient (1120). For instance, the processor may process the event data, identify an alarm system associated with the alarm data, and identify an owner of the identified alarm system. In some examples, the event data may include a customer account number and the processor may extract the customer account number from the event data. In these examples, the processor may use the customer account number to identify a notification recipient.

In some implementations, the processor accesses, from electronic storage, stored information related to rules for identifying a notification recipient. The stored information may indicate that the processor should notify a particular notification recipient (e.g., an owner of the alarm system) every time the alarm system detects an event. In some examples, the rules in the stored information may identify different notification recipients depending on the circumstances surrounding the detected event. For instance, the rules may specify different notification recipients depending on the type of event detected. For example, the processor may identify a father as the notification recipient if the detected event is the medicine cabinet being opened and a mother may be notified if the detected event is a video game system being turned on. The rules may specify a notification recipient that is best suited to handle the type of event detected.

In other examples, the processor may use the time and day associated with the detected event to identify a notification recipient. In one example, the processor may identify a father as a notification recipient if the alarm system detects an event between 8:00 A.M. and 12:00 P.M. because the father does not work during these hours and may be able to handle the event better than a mother who does work during these hours. In this example, the processor may identify the mother as a notification recipient if the alarm system detects an event between 3:00 P.M. and 7:00 P.M. because the mother does not work during these hours and may be able to handle the event better than the father who does work during these hours. Further, in this example, for detected events during times other than between 8:00 A.M. and 12:00 P.M. and between 3:00 P.M. and 7:00 P.M., the processor may identify both the father and mother as notification recipients because during these times the father and mother are either both working or both not working and are equally suited to handle the alarm event.

In implementations in which the processor uses date information to identify a notification recipient, the processor may identify a notification based on a day of a week or based on a travel schedule of notification recipients. For example, if the alarm system detects an event during Monday through Friday, the processor may identify a nanny as a notification recipient because parents may be at work and unlikely to be available to handle the event. In this example, if the alarm system detects an event on Saturday or Sunday, the processor may identify a parent as a notification recipient because the parent may not be working and may be available to handle the event. The processor also may identify a notification recipient based on a travel schedule of one or more notification recipients. For instance, if a mother is traveling between the dates of June 23 through June 30, the processor may identify a father as a notification recipient during these dates. The processor also may access calendar information for one or more potential notification recipients and identify a notification recipient based on the calendar information (e.g., the processor may not identify a particular notification recipient if that recipient's calendar information indicates that the recipient is in a meeting or out of the office).

In other implementations, the processor may use a combination of type of event, time of day, date, or any other relevant factors to identify the notification recipient. For instance, the stored information related to rules for identifying a notification recipient may identify a father as the notification recipient if the detected event is the medicine cabinet being opened on a Saturday between the hours of 8:00 A.M. to 12:00 P.M., identify a mother as the notification recipient if the detected event is the medicine cabinet being opened on a Saturday between the hours of 12:00 P.M. to 8:00 P.M., identify a nanny as the notification recipient if the detected event is the medicine cabinet being opened on a Tuesday between the hours of 8:00 A.M. to 12:00 P.M., and identify a mother as the notification recipient if the detected event is a video game system being played on a Saturday between the hours of 8:00 A.M. to 12:00 P.M.

In further implementations, the event data may include information identifying the notification recipient and the processor may identify the notification recipient based on the event data. For instance, the processor may extract, from the event data, notification recipient information added to the event data by the alarm system. In these implementations, the alarm system may store information including rules for identifying a notification recipient and determine an appropriate notification recipient prior to transmitting the event data.

The processor accesses voice communication information configured for use in establishing a voice communication session between the identified notification recipient and the alarm system (1130). For example, the processor may access, from electronic storage, voice communication information associated with the alarm system and/or voice communication information associated the identified notification recipient. The voice communication information may be a telephone number, an IP address, or any other type of information that the processor may use to establish a voice communication session between the alarm system and the notification recipient. In some examples, the processor may access the voice communication information from the event data or from other electronic communications received from the alarm system or an electronic device associated with the notification recipient.

The processor enables establishment of a voice communication session over a wireless voice channel between the identified notification recipient and the alarm system (1140). For example, in implementations in which the processor accesses voice communication information associated with the notification recipient, the processor may transmit the voice communication information associated with the notification recipient to the alarm system and the alarm system may use the voice communication information to establish a voice communication session with the notification recipient. In this example, the voice communication information may be a telephone number for a mobile device of the notification recipient and the alarm system may place a wireless voice call over a wireless voice channel to the telephone number for the mobile device of the notification recipient to establish a two-way voice communication session with the notification recipient.

In implementations in which the processor accesses voice communication information associated with the alarm system, the processor may transmit the voice communication information associated with the alarm system to an electronic device associated with the notification recipient and the notification recipient may use the voice communication information to establish a voice communication session with the alarm system. For instance, the voice communication information may be a telephone number for a wireless communication module included in the alarm system and the notification recipient may place a wireless voice call over a wireless voice channel to the telephone number for the wireless communication module included in the alarm system to establish a two-way voice communication session with the alarm system. In some implementations, the alarm system may require the notification recipient to provide a pass code or other authentication information with call information included in the call placed to the wireless communication module. In these implementations, the wireless communication module may only accept calls that include call information that has a pass code or that the alarm system may otherwise authenticate (e.g., by the telephone number being used to place the call or device identification information provided in the call information). The processor may negotiate or provide the pass code or other authentication information to the notification recipient and/or the alarm system.

In further implementations, the processor may establish a voice call with the alarm system over a wireless voice channel and establish a voice call with a device associated with the notification recipient over a wired or wireless connection. In these implementations, the processor may connect the call with the alarm system to the call with the device associated with the notification recipient to establish a two-way voice communication session between the alarm system and the notification recipient.

The two-way voice communication session may be an intercom-like communication session between the notification recipient and the alarm system. The two-way voice communication session may enable the notification to listen-in to an area of the location monitored by the alarm system and enable the operator to communicate with a person who is in the area of the location monitored by the alarm system. For example, as discussed above, if the event data indicates that a medicine cabinet has been opened, the two-way voice communication session may enable the notification recipient to ask a person in an area proximate to the medicine cabinet which medicine the person took. In this example, the notification recipient may determine that the person took incorrect medicine and may be able to send medical assistance to the person. In the event that person took medicine that resulted in the person having an allergic reaction that incapacitated the person such that the person could not move to a phone to call emergency services, the notification recipient may be able to speak the person and call emergency services for the person. In other examples, parents may be able to communicate with a child in response to detecting an event when the parent is not home (e.g., ask the child to turn off an oven or tell the child that he or she is not allowed to use the video game system) or owners of a home may be able to communicate with guests in a house (e.g., ask the guest to turn the thermostat back to a higher setting in response to detecting that the temperature in the home has fallen to a low level).

Figure 12:
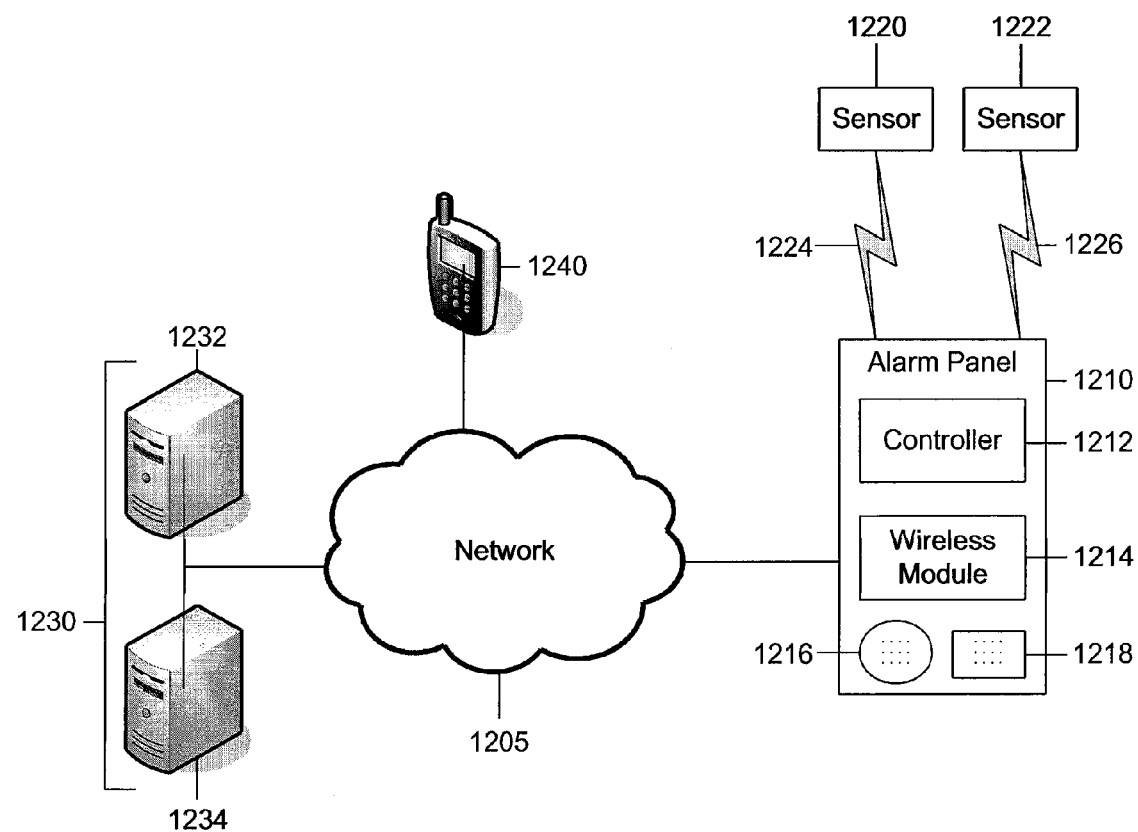
FIG. 12 is a block diagram of an example of an electronic system configured to establish a voice communication session between an alarm system and a notification recipient.

FIG. 12 illustrates an example of an electronic system 1200 configured to establish a voice communication session between an alarm system and a notification recipient. The electronic system 1200 includes a network 1205, an alarm panel 1210, an alarm server 1230, and a recipient electronic device 1240. The network 1205 facilitates communications between the alarm panel 1210, the alarm server 1230, and the recipient electronic device 1240.

The network 1205 is configured to enable exchange of electronic communications between devices connected to the network 1205. For example, the network 1205 may be configured to enable exchange of electronic communications between the alarm panel 1210, the alarm server 1230, and the recipient electronic device 1240. In some implementations, the network 1205 may be similar to the network 205 described above with respect to FIG. 2.

The alarm panel 1210 includes a controller 1212, a wireless communication module 1214, a speaker 1216, and a microphone 1218. The alarm panel 1210 may be similar to the alarm panel 1210 described above with respect to FIG. 2. Accordingly, the controller 1212 may be similar to the controller 212, the wireless communication module 1214 may be similar to the wireless communication module 214, the speaker 1216 may be similar to the speaker 216, and the microphone 1218 may be similar to the microphone 218.

The alarm system that includes the alarm panel 1210 includes one or more sensors or detectors. The sensors or detectors may be provided on security monitoring items (e.g., doors, windows, etc.) and may be provided on other items monitored by the alarm system (e.g., a medicine cabinet, a closet door, other electronic devices in a building, etc.) The sensors or detectors may communicate using the alarm system using wired or wireless data pathways and may communicate using different protocols. For instance, a sensor provided on an electronic device (e.g., an oven, a video game system, etc.) included in a building monitored by the alarm system may communicate with the alarm system over a wireless connection using the Bluetooth protocol. In some implementations, the alarm system may include multiple sensors 1220 and 1222 that communicate with the alarm panel 1210 using communication links 1224 and 1226. The sensors 1220 and 1222 and the communication links 1224 and 1226 may be similar to the sensors 220 and 222 and the communication links 224 and 226 described above with respect to FIG. 2.

The alarm server 1230 includes one or more electronic devices (e.g., servers, hosts, computers, etc.) configured to provide alarm/event monitoring services by exchanging electronic communications with the alarm panel 1210 over the network 1205. As shown, the alarm server 1230 includes multiple electronic devices 1232 and 1234. The alarm server 1230 may be similar to the alarm server 240 described above with respect to FIG. 2.

In some implementations, the alarm server 1230 may be configured to receive event data from the wireless communication module 1214 included in the alarm panel 1210 and identify a notification recipient based on the event data. For example, the alarm server 1230 may include an electronic data store with which the alarm server 1230 may store information used in identifying a notification recipient. In this example, the alarm server 1230 may store information related to customer accounts, alarm panels, and rules for identifying particular notification recipients for certain customers or alarm panels. In response to identifying a notification recipient based on event data received from the alarm panel 1210, the alarm server 1230 may exchange communications with the recipient electronic device 1240 and enable establishment of a two-way voice communication session between the recipient electronic device 1240 and the alarm panel 1210.

The recipient electronic device 1240 may be a mobile device or a device designed for a specific function. For example, the requesting user device 210 may include a cell phone, a smart phone, a tablet PC, a personal digital assistant ("PDA"), or any other portable device configured to communicate over a network and display information. For example, implementations may also include Blackberry devices, electronic organizers, iPod devices or other portable music players, other communication devices, and handheld or portable electronic devices for gaming, communications, and/or data organization. Although shown as a mobile device, the recipient electronic device 1240 may be a general-purpose computer (e.g., a desktop personal computer, a workstation, or a laptop computer) that is configured to communicate devices over the network 1205. The recipient electronic device 1240 may be any type of electronic device configured to receive electronic communications from the alarm server 1230 over the network 1205 and establish a voice communication session with the alarm panel 1210.

Figure 13:
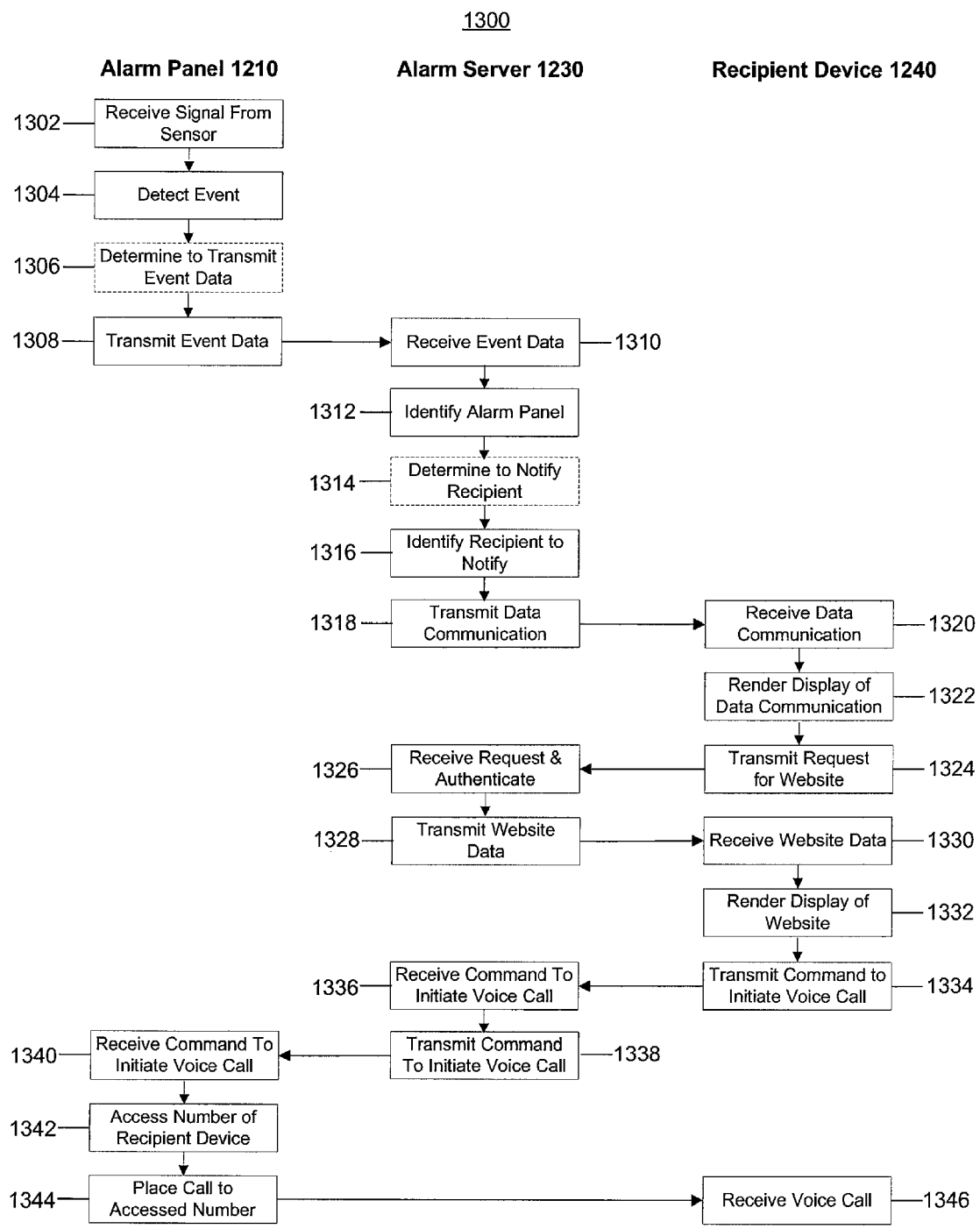
FIGS. 13-18 are flow charts illustrating examples of processes for establishing a voice communication session between an alarm system and a notification recipient.

FIG. 13 illustrates an example of a process 1300 for establishing a voice communication session between an alarm system and a notification recipient. For convenience, particular components described with respect to FIG. 12 are referenced as performing the process 1300. However, similar methodologies may be applied in other implementations where different components are used to define the structure of the system, or where the functionality is distributed differently among the components.

The alarm panel 1210 receives a signal from the sensor 1220 (1302). For example, the controller 1212 may receive a signal from the sensor 1220 over the communication link 1224. The signal may provide information associated with an event detected by the sensor 1220. For instance, the sensor 1220 may be a contact sensor attached to a door of a medicine cabinet and the signal may be a signal that the contact has been broken (e.g., that the door to the medicine cabinet has been opened). In other examples, the sensor 1220 may be a temperature and the signal may indicate the temperature in a building or the sensor 1220 may be a sensor on an electronic gaming system and the signal may indicate that the electronic gaming system has been turned on.

The alarm panel 1210 detects an event based on the signal (1304). For example, the controller 1212 analyzes the signal received from the sensor 1220 and determines whether an event has occurred based on the signal. The controller 1212 may access a set of criteria used in detecting events and compare the received signal to the set of criteria to determine whether an alarm event has occurred. For instance, the controller 1212 may determine that an alarm event has occurred in response to receiving the signal from the sensor 1220 when the alarm system has been set to an armed state.

The alarm panel 1210, optionally, determines whether or not to transmit event data associated with the detected event (1306). For example, the alarm panel 1210 may determine whether the detected event is one that a user of the alarm system desires to receive notifications. In this example, the user of the alarm system may decide which events the user wishes to be notified of and configure the alarm panel to send event data for events that the user wishes to be notified or, but not others.

In some implementations, the alarm panel may access a set of criteria or rules to determine whether or not to transmit event data associated with the detected event. The set of criteria or rules may require multiple signals from multiple sensors prior to detecting an alarm event or may compare other factors, such as time and date, prior to determining to transmit event data. For example, the controller 1212 may determine to transmit event data for an event only when both a motion sensor and a contact sensor have been triggered. In this example, a user of the alarm system may wish to be notified when a medicine cabinet door has been opened, but only when the medicine cabinet door has been opened intentionally. Accordingly, the controller 1212 may transmit event data only when the motion sensor and the contact sensor are triggered to avoid inadvertent events when the medicine cabinet door is opened without presence of a person being detected. In another example, the controller 1212 may compare the signal with a time or date associated with the received signal in determining whether to transmit event data. In this example, the alarm panel 1210 only may transmit event data if the signal is received at a particular date and/or time. For instance, the alarm system may transmit event data associated with turning on an electronic device only when the electronic device is turned on between the hours of 8:00 P.M. to 8:00 A.M.

In other implementations, the alarm panel 1210 may transmit event data for all detected events without making a determination as to whether or not to transmit the event data. In these implementations, a notification recipient may be notified of all events or the alarm server 1230 may determine whether to notify a recipient as discussed below.

In response to detecting an alarm event and, optionally, determining to transmit event data, the alarm panel 1210 transmits event data to the alarm server 1230 (1308). For example, the wireless communication module 1214 may transmit the event data over a wireless data channel to the alarm server 1230. In some implementations, the wireless communication module 1214 may send the alarm data in IP packets over a wireless data channel configured to transport IP packets. In other implementations, the wireless communication module 1214 may send the alarm data in an SMS message over a wireless data channel configured to transport SMS messages.

The event data includes information sufficient for the alarm server 1230 to handle the event. For instance, the event data may include information identifying the alarm panel 1210, the user of the alarm panel 1210, or the location associated with the alarm panel 1210. The alarm data may include a customer account number with which the alarm server 1230 may access stored information associated with the customer's account. In addition, the event data may include information indicating the type of alarm event (e.g., security breach, fire alarm, medicine cabinet opening, electronic device being turned on, etc.) and the specific sensor or detected condition that triggered the alarm event (e.g., basement door sensor, third floor smoke detector, medicine cabinet in master bathroom, oven being turned on, etc.).

The alarm server 1230 receives the event data from the wireless communication module 1214 (1310) and identifies the alarm panel 1210 (1312). For instance, the alarm server 1230 receives the alarm data over a wireless data channel using a wireless communication interface. Upon receipt of the event data, the alarm server 1230 processes the alarm data to identify the alarm panel that transmitted the event data and determine information associated with the event. In some implementations, the alarm server 1230 extracts an account number from the event data and accesses, from electronic storage associated with the alarm server 1230, information associated with the account number. The alarm server 1230 may access information related to the address of the location that the alarm system associated with the account number is protecting and information related to the name and telephone number of the user associated with the account number. For instance, the alarm server 1230 may access information identifying the alarm panel 1210 as being the alarm panel that transmitted the alarm data and access information associated with contacting the alarm panel 1210.

The alarm server 1230, optionally, determines whether to notify a recipient based on the event associated with the event data (1314). For example, the alarm server 1230 compares the event data with information indicating the types of events of which users of the alarm panel 1210 wish to be notified and determines whether to notify a recipient based on comparison results. In some implementations, the alarm server 1230 determines whether to notify a recipient based on the event associated with the event data using techniques similar to those discussed above with respect to the alarm panel determining whether or not to transmit event data associated with the detected event (step 1306).

The alarm server 1230 identifies a recipient to notify (1316). For example, the alarm server 1230 may access information related to one or more notification recipients associated with the identified alarm panel. In this example, the alarm server 1230 may use the customer account number for the identified alarm panel to identify an owner or user of an alarm panel as the notification recipient. In some implementations, the alarm server 1230 accesses, from electronic storage, stored information related to rules for identifying a notification recipient. In these implementations, the alarm server 1230 may identify a notification recipient using techniques similar to those discussed above with respect to step 1120 shown in FIG. 11.

In response to identifying a notification recipient, the alarm server 1230 transmits a data communication to the recipient device 1240 to notify the notification recipient of the event (1318). For example, the alarm server 1230 may access communication information associated with the notification recipient and send, based on the accessed communication information, a data communication to the recipient device 1240 over the network 1205. The data communication may be an SMS message, an instant message, an electronic mail message, a pager message, or any other type of electronic data communication. The alarm server 1230 may transmit the data communication over wireless or wired connection. For instance, the alarm server 1230 may transmit the data communication as an SMS message over a wireless data channel configured to transport SMS messages or the alarm server 1230 may transmit the data communication as an electronic mail message over the Internet.

The data communication includes information sufficient to notify the recipient of the event. The data communication may include information sufficient to notify the recipient that an event has occurred and that the recipient may be able to obtain more information about the event through other mechanisms. For instance, the data communication may merely include information indicating that an event has occurred and that the notification recipient should access a website of the alarm server 1230 to obtain more information about the event. The data communication may include a link to a website or the alarm server 1230 may have provided website information to the notification recipient previously. In other implementations, the data communication may include more information about the event. In these implementations, the data communication may include information identifying the alarm panel 1210 as being the alarm panel that detected the event, the type of alarm event, etc. By providing some information to the notification recipient in the data communication, the notification recipient may be able to determine whether the notification recipient wishes to obtain more information or establish a two-way voice communication session with the alarm panel 1210.

The recipient device 1240 receives the data communication (1320) and renders a display of the data communication (1322). For example, the recipient device 1240 receives the data communication over the network 1205. The recipient device 1240 may receive the data communication as electronic mail message using an electronic mail program, may receive the data communication as an instant message using an instant messaging program, may receive the data communication as an SMS message using an SMS application, or may receive the data communication in another format or using another type of communication protocol. The recipient device 1240 renders a display of the data communication on a display associated with the recipient device. The display may be connected to the recipient device 1240 over a wired or wireless connection or may be integrally formed in the recipient device 1240. For instance, the recipient device may be a mobile phone and the mobile phone may render a display of the data communication on a display of the mobile phone.

The recipient device 1240 transmits a request for a website associated with the alarm server 1230 (1324). For example, the notification recipient may control the recipient device 1240 to request the website associated with the alarm server 1230 in response to viewing the data communication. The recipient device 1240 may use a web browsing application to request the website. In some implementations, the recipient device 1240 requests the website in response to the notification recipient selecting a link included in the display of the data communication rendered by the recipient device 1240. The notification recipient also may know the address of the website and control the recipient device 1240 to access the known website. The request for the website may include authentication credentials or other authentication information with which the alarm server 1230 may authenticate the request.

The alarm server 1230 receives and authenticates the request (1326) and transmits website data to the recipient device 1240 (1328). In some implementations, the alarm server 1230 receives the request for the website, identifies the notification recipient associated with the request, and authenticates the request based on authentication credentials or other authentication information included in the request. In these implementations, after authenticating the request, the alarm server 1230 accesses website data associated with the identified notification recipient and transmits the website data to the recipient device 1240 over the network 1205. The website data may be personal to the notification recipient and may include additional information about the event. For example, the website data may include detailed information associated with the specific condition that triggered detection of the event (e.g., that the medicine cabinet in the third floor bathroom has been opened). The website data also may include a control that the recipient may use to initiate a two-way voice communication session with the alarm panel 210. The website further may include information associated with the other events detected by the alarm panel 1210, information associated with the notification recipient's account, or other information that may be useful in handling the event (e.g., a telephone number for poison control if the event detected is the opening of a medicine cabinet).

The recipient device 1240 receives the website data (1330) and renders a display of the website (1332). For example, the recipient device 1240 receives the website data over the network 1205. The recipient device 1240 may receive the website data in IP packets over the Internet and use an Internet browsing application to render a display of the website data. The recipient device 1240 renders a display of the website data on a display connected to the recipient device 1240 over a wired or wireless connection or a display that is integrally formed in the recipient device 1240. For instance, the recipient device may be a mobile phone and the mobile phone may render a display of the website data on a display of the mobile phone.

The recipient device transmits a command for the alarm panel 1210 to initiate a voice call to the recipient device 1240 (1334). For example, the notification recipient may control the recipient device 1240 to transmit the command to initiate a voice call in response to viewing the website data. The recipient may use the recipient device 1240 to select an interface element (e.g., a command button) displayed on the website to transmit the command to initiate a voice call. In some implementations, the recipient also may include information regarding which telephone number or device the recipient would like the alarm panel to call. In these implementations, the recipient may indicate that the recipient would like to establish a two-way voice communication session with the alarm panel 1210 using a home telephone rather than the mobile phone with which the notification recipient received the data communication and website data. The alarm panel 1210 may place a call to the telephone number or device specified by the notification recipient. The recipient device 1240 may transmit the command to the alarm server 1230 over the network 1205.

The alarm server 1230 receives the command for the alarm panel 1210 to initiate a voice call to the recipient device 1240 (1336) and transmits the command for the alarm panel 1210 to initiate a voice call to the recipient device 1240 to the alarm panel 1210 (1338). For instance, the alarm server 1230 receives the command over the network 1205 and forwards the command to the alarm panel 1210 over the network 1205. In some implementations, the alarm server 1230 may convert the command to a format or communication protocol used by the alarm panel 1210. The alarm server 1230 may receive the command from the recipient device 1240 as an HTTP request over the Internet and transmit the command to the alarm panel 1210 as an SMS message over a wireless data channel. The alarm server 1230 also may add information to the command. For example, the alarm server 1230 may add telephone number information for the notification recipient to the command. In this example, the alarm panel 1210 may place a call to the telephone number added to the command by the alarm server 1230. In another example, the alarm server 1230 adds identification information to the command to enable the alarm panel 1210 to identify which notification recipient to call.

The alarm panel 1210 receives the command for the alarm panel 1210 to initiate a voice call to the recipient device 1240 (1340). For instance, the alarm panel 1210 receives the command from the alarm server 1230 over the network 1205. In this example, the alarm panel 1210 may receive the command from the alarm server over a wireless data channel (e.g., a GSM/GPRS data channel).

The alarm panel 1210 accesses a telephone number for the recipient device 1240 (1342) and places a call to the accessed number (1344). For example, the alarm panel 1210 may identify the notification recipient based on the command and access, from electronic storage, the telephone number for the recipient device 1240 associated with the identified notification recipient. In other examples, the alarm panel 1210 may access the telephone number from the command received from the alarm server 1230. The alarm panel 1210 may use the wireless communication module 1214 to place a wireless voice call over a wireless voice channel to the accessed telephone number associated with the recipient device 1240.

The recipient device 1240 receives the wireless voice call (1346). For example, the recipient device 1240 receives the wireless voice call placed by the wireless communication module 1214 over a wireless voice channel and routed to the recipient device 1240 by a wireless service provider associated with the wireless communication module 1214. In response to receiving the call, the recipient device 1240 and the alarm panel 1210 establish a two-way voice communication session in which the recipient may listen-in to an area proximate to the alarm panel 1210 and communicate with people in the area proximate to the alarm panel 1210.

Figure 14:
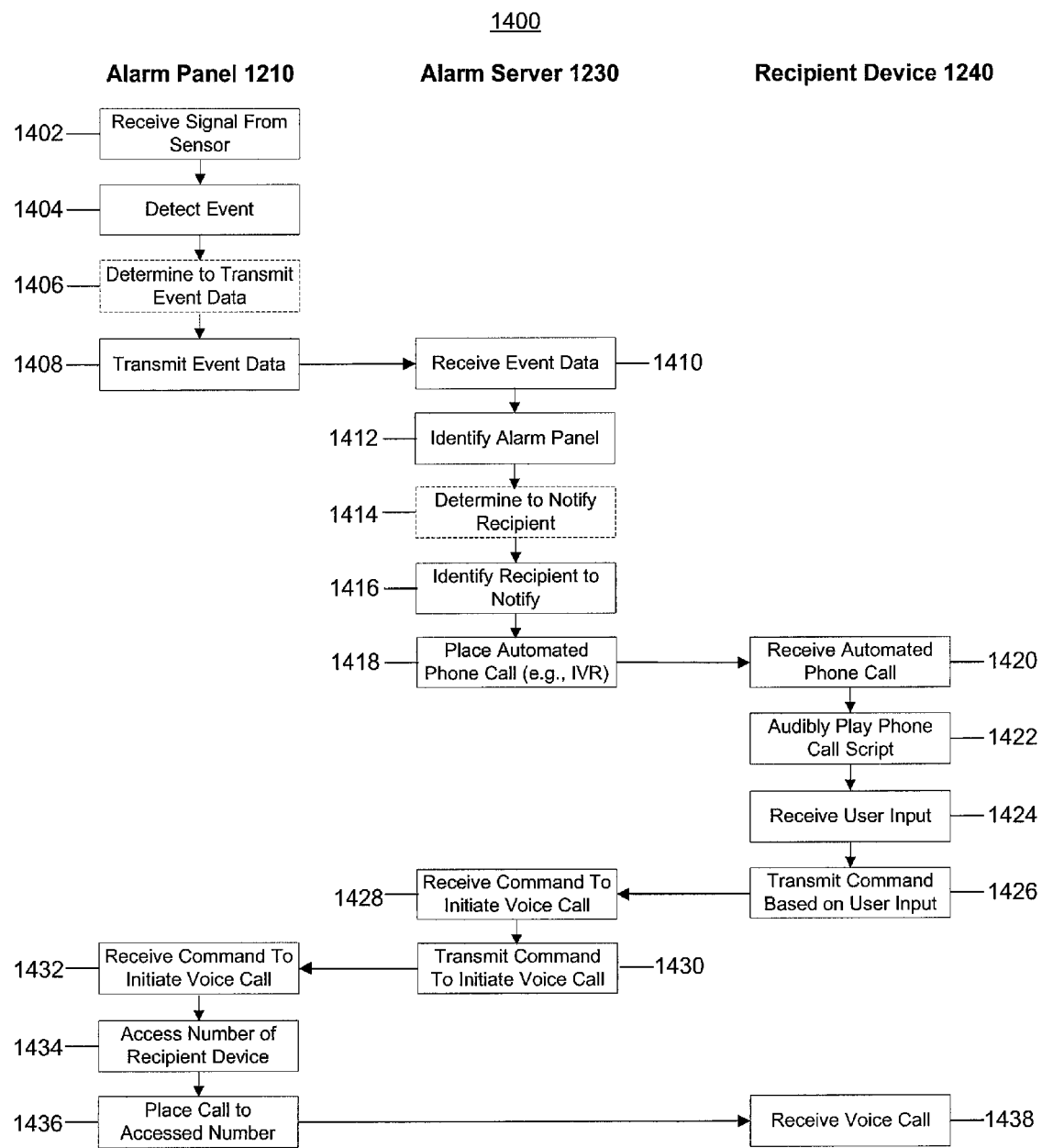

FIG. 14 illustrates another example of a process 1400 for establishing a voice communication session between an alarm system and a notification recipient. For convenience, particular components described with respect to FIG. 12 are referenced as performing the process 1400. However, similar methodologies may be applied in other implementations where different components are used to define the structure of the system, or where the functionality is distributed differently among the components.

The alarm panel 1210 receives a signal from the sensor 1220 (1402), detects an event based on the signal (1404), optionally, determines whether or not to transmit event data associated with the detected event (1406), and transmits event data to the alarm server 1230 (1408). For example, the alarm panel 1210 receives a signal from the sensor 1220, detects an event based on the signal, optionally, determines whether or not to transmit event data associated with the detected event, and transmits event data to the alarm server using techniques similar to those described above with respect to steps 1302, 1304, 1306, and 1308 shown in FIG. 13.

The alarm server 1230 receives the event data from the wireless communication module 1214 (1410), identifies the alarm panel 1210 (1412), optionally, determines whether to notify a recipient based on the event associated with the event data (1414), and identifies a recipient to notify (1416). For example, the alarm server 1230 receives the event data from the wireless communication module 1214, identifies the alarm panel 1210, optionally, determines whether to notify a recipient based on the event associated with the event data, and identifies a recipient to notify using techniques similar to those described above with respect to steps 1310, 1312, 1314, and 1316 shown in FIG. 13.

In response to identifying a notification recipient, the alarm server 1230 places an automated phone call to the recipient device 1240 (1418). For example, the alarm server 1230 may access communication information associated with the notification recipient and place, based on the accessed communication information, a voice call to the recipient device 1240 over the network 1205. The automated phone call may be an interactive voice response (IVR) phone call placed to the recipient device 1240. The IVR phone call may include a phone call script with which the recipient may interact using the recipient device 1240. The phone call script may indicate to the recipient that the alarm panel 1210 detected an event and enable the recipient to respond to options included in the phone call script. For instance, the phone call script may include information indicating the type of alarm detected by the alarm panel 1210 and enable the recipient to respond to the phone call script by entering a command using the recipient device (e.g., pressing a button) or speaking a command.

The recipient device 1240 receives the automated phone call (1420) and audibly plays the phone call script to the recipient (1422). For example, the recipient device 1240 receives the automated phone call over the network 1205 (e.g., over a wireless voice channel) and audibly plays the phone call script to the notification recipient using a speaker included in the recipient device 1240. The recipient may listen to the phone call script to determine information associated with the event that the alarm panel 1210 detected.

The recipient device 1240 receives user input (1424) and transmits a command based on the user input (1426). In some implementations, the recipient device 1240 may receive user input from the recipient by the recipient pressing a button on the recipient device 1240 or speaking a command into a microphone associated with the recipient device 1240. The user input may be related to whether or not the recipient wishes to establish a two-way voice communication session with the alarm panel 1210 based on the information included in the phone call script. For example, the user may press the button "one" or speak the word "yes" to indicate that the user wishes to establish a voice communication session with the alarm panel 1210. In this example, the user may press the button "two" or speak the word "no" to indicate that the user does not wish to establish a voice communication session with the alarm panel 1210. The recipient device 1240 transmits a command to the alarm server 1230 over the network 1205 based on the user input. In the example described above, the recipient device 1240 may transmit a command to initiate a voice communication session in response to the recipient pressing the button "one" or speaking the word "yes" and may transmit a command not to initiate a voice communication session in response to the recipient pressing the button "two" or speaking the word "no." The recipient device 1240 may interpret the user input and generate the command based on the interpretation of the user input or may directly transmit the user input received from the recipient as the command.

The alarm server 1230 receives the command for the alarm panel 1210 to initiate a voice call to the recipient device 1240 (1428) and transmits, to the alarm panel 1210, the command for the alarm panel 1210 to initiate a voice call to the recipient device 1240 (1430). For instance, the alarm server 1230 receives the command for the alarm panel 1210 to initiate a voice call to the recipient device 1240 and transmits, to the alarm panel 1210, the command for the alarm panel 1210 to initiate a voice call to the recipient device 1240 using techniques similar to those described above with respect to steps 1336 and 1338 shown in FIG. 13.

The alarm panel 1210 receives the command for the alarm panel 1210 to initiate a voice call to the recipient device 1240 (1432), accesses a telephone number for the recipient device 1240 (1434), and places a call to the accessed number (1436). For example, the alarm panel 1210 receives the command for the alarm panel 1210 to initiate a voice call to the recipient device 1240, accesses a telephone number for the recipient device 1240, and places a call to the accessed number using techniques similar to those described above with respect to steps 1340, 1342, and 1344 shown in FIG. 13.

The recipient device 1240 receives the wireless voice call (1438). For example, the recipient device 1240 receives the wireless voice call using techniques similar to those described above with respect to step 1346 shown in FIG. 13.

Figure 15:
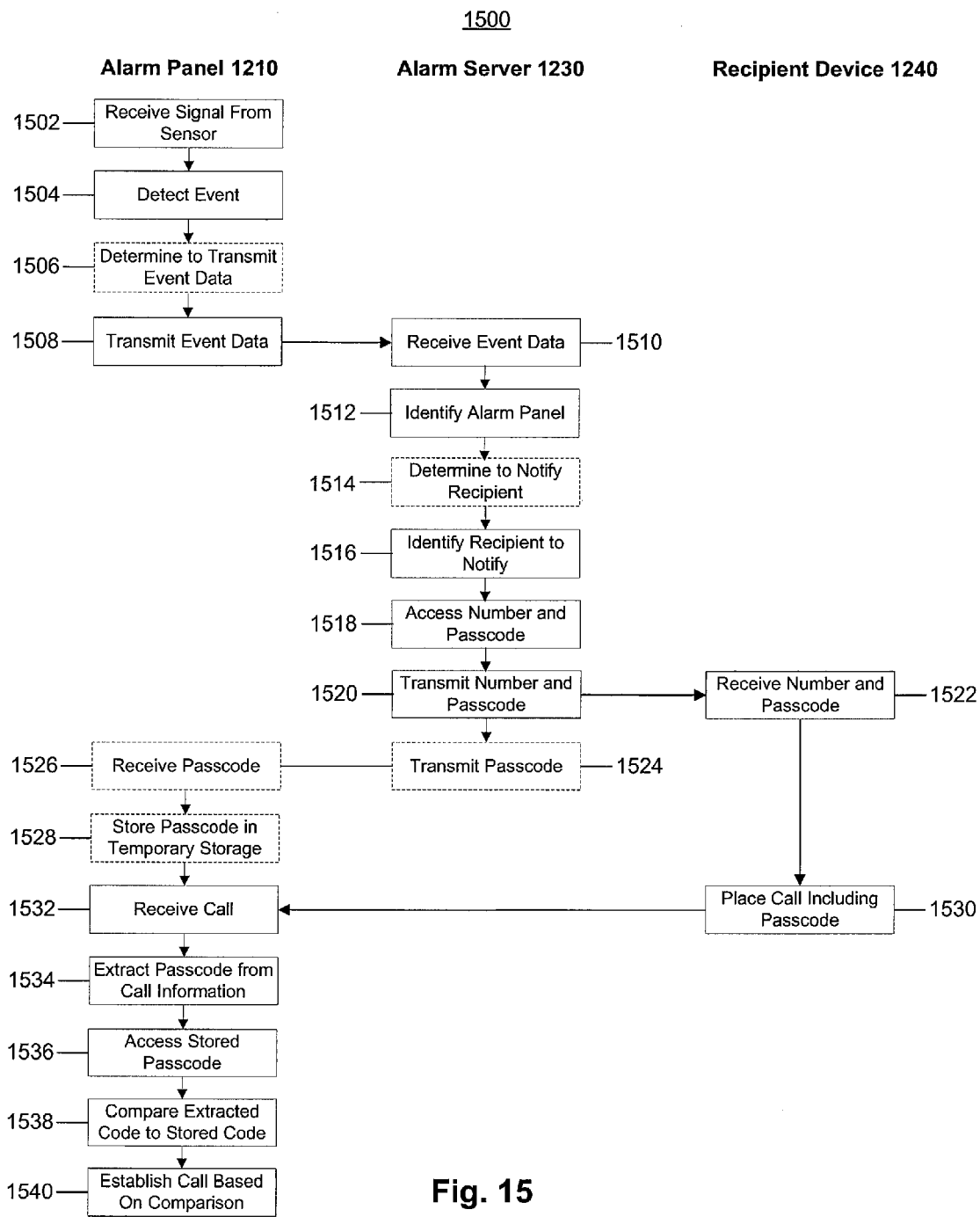

FIG. 15 illustrates a further example of a process 1500 for establishing a voice communication session between an alarm system and a notification recipient. For convenience, particular components described with respect to FIG. 12 are referenced as performing the process 1500. However, similar methodologies may be applied in other implementations where different components are used to define the structure of the system, or where the functionality is distributed differently among the components.

The alarm panel 1210 receives a signal from the sensor 1220 (1502), detects an event based on the signal (1504), optionally, determines whether or not to transmit event data associated with the detected event (1506), and transmits event data to the alarm server 1230 (1508). For example, the alarm panel 1210 receives a signal from the sensor 1220, detects an event based on the signal, optionally, determines whether or not to transmit event data associated with the detected event, and transmits event data to the alarm server using techniques similar to those described above with respect to steps 1302, 1304, 1306, and 1308 shown in FIG. 13.

The alarm server 1230 receives the event data from the wireless communication module 1214 (1510), identifies the alarm panel 1210 (1512), optionally, determines whether to notify a recipient based on the event associated with the event data (1514), and identifies a recipient to notify (1516). For example, the alarm server 1230 receives the event data from the wireless communication module 1214, identifies the alarm panel 1210, optionally, determines whether to notify a recipient based on the event associated with the event data, and identifies a recipient to notify using techniques similar to those described above with respect to steps 1310, 1312, 1314, and 1316 shown in FIG. 13.

The alarm server 1230 accesses a telephone number and a passcode (1518). For example, the alarm server 1230 accesses, from electronic storage or from the event data transmitted by the alarm panel 1210, a telephone number for the alarm panel 1210 and a passcode used by the alarm panel 1210 in authenticating received calls. The passcode may be static for the alarm panel and the alarm server 1230 may access the passcode from electronic storage. In other examples, the passcode may be dynamically generated by the alarm server 1230 or may be dynamically generated by the alarm panel 1210 and transmitted to the alarm server 1230 in the event data.

For security reasons, the alarm panel 1210 may be configured to accept incoming voice calls only if the incoming voice calls include the passcode in call information associated with the call. By requiring the passcode, the alarm panel 1210 may prevent unauthorized calls and prevent people from eavesdropping on a building monitored by the alarm panel 1210 by placing a call to the alarm panel 1210. In some implementations, other security measures may be taken. For instance, the passcode may be dynamically generated by the alarm panel 1210 or the alarm system 1230, the alarm panel 1210 may be configured to receive calls only a predetermined and configurable period of time after detecting an event, the alarm panel 1210 may limit the length of incoming voice calls, and the alarm panel 1210 may be configured to only accept calls from particular devices or phone numbers.

The alarm server 1230 transmits the telephone number and passcode to the recipient device (1520). For example, the alarm server 1230 may access communication information associated with the notification recipient and send, based on the accessed communication information, the telephone number and passcode to the recipient device 1240 over the network 1205. A data communication including the telephone number and passcode may be sent an SMS message, an instant message, an electronic mail message, a pager message, or any other type of electronic data communication. The alarm server 1230 may transmit the telephone number and passcode over wireless or wired connection. For instance, the alarm server 1230 may transmit the telephone number and passcode in an SMS message over a wireless data channel configured to transport SMS messages or the alarm server 1230 may transmit the telephone number and passcode in an electronic mail message over the Internet. The alarm server 1230 may transmit the telephone number and passcode using a secure communication mechanism or may encrypt the data including the telephone number and passcode.

The recipient device 1240 receives the telephone number and passcode (1522). For example, the recipient device 1240 receives the telephone number and passcode in an electronic communication over the network 1205. The recipient device 1240 may receive the electronic communication as electronic mail message using an electronic mail program, may receive the electronic communication as an instant message using an instant messaging program, may receive the electronic communication as an SMS message using an SMS application, or may receive the electronic communication in another format or using another type of communication protocol.

The alarm server 1230, optionally, transmits the passcode to the alarm panel 1210 (1524). For instance, the alarm server 1230 transmits the passcode to the alarm panel 1210 in implementations in which the alarm server 1230 dynamically generates the passcode. In these implementations, because the alarm server 1230 dynamically generated the passcode, the alarm server 1230 needs to transmit the passcode to the alarm panel 1210 to enable the alarm panel 1210 to authenticate a voice call received from the recipient device 1240. The alarm server 1230 may transmit the passcode to the alarm panel 1210 in an electronic communication over the network 1205. For example, the alarm server 1230 may transmit the passcode to the alarm panel 1210 in a data communication using a wireless data channel.

The alarm panel 1210, optionally, receives the passcode (1526) and stores the passcode in temporary electronic storage (1528). For example, the alarm panel 1210 receives the passcode in an electronic communication over the network 1205 and stores the passcode in temporary electronic storage associated with the alarm panel 1210. In this example, the alarm panel 1210 may receive the passcode from the alarm server 1230 in a data communication received over a wireless data channel. The alarm panel 1210 may store the passcode in temporary electronic storage for later access in authenticating a received call.

The recipient device 1240 places a voice call to the alarm panel including the passcode in call information associated with the voice call (1530). For instance, the recipient device places a wireless voice call to the telephone number associated with the alarm panel 1210 over a wireless voice channel. The recipient device may be a mobile telephone and the recipient may control the mobile telephone to call the alarm panel 1210. The recipient device 1240 may add the passcode to call information associated with the voice call. The call information may be part of the wireless voice call or may be additional information transmitted with the wireless voice call.

The alarm panel 1210 receives the voice call placed by the recipient device 1240 (1532) and extracts the passcode from the call information associated with the voice call (1534). For example, the alarm panel 1210 receives the call over the network 1205, accesses call information associated with the call, and parses the call information to extract the passcode included in the call information. The alarm panel 1210 may delay connection of the call until after determining whether the passcode included in the call information is authentic. If the received call does not include a passcode, the alarm panel 1210 drops the call and prevents the call from being connected. The extracted passcode may be a string of characters that the alarm panel 1210 may use to compare against a stored passcode.

The alarm panel 1210 accesses a stored passcode (1536) and compares the extracted pass code to the stored passcode (1538). For example, the alarm panel 1210 accesses a stored passcode from electronic storage associated with the alarm panel 1210. In this example, the passcode may be a permanent or dynamically generated passcode stored in persistent storage associated with the alarm panel 1210 or the passcode may be a temporary passcode dynamically generated by the alarm server 1230 and stored in temporary storage. The alarm panel 1210 compares the passcode extracted from the call information to the passcode accessed from electronic storage. For instance, the alarm panel 1210 may compare the characters included in the extracted passcode to the characters included in the stored passcode to determine whether the extracted passcode matches the stored passcode.

The alarm panel 1210 accepts the call and establishes a voice communication session with the recipient device 1240 based on the comparison (1540). For example, if the extracted passcode matches the stored passcode, the alarm panel 1210 determines that the received call is authentic and allows the received call to connect (e.g., answers the received call). By connecting the call, the alarm panel 1210 establishes a two-way voice communication session with the recipient device 1240 such that the notification recipient may listen-in to areas proximate to the alarm panel 1210 and communicate with people in the area proximate to the alarm panel 1210. If the extracted passcode does not match the stored passcode, the alarm panel 1210 determines that the received call is not authentic and prevents the received call from connecting (e.g., does not answer the call).

Figure 16:
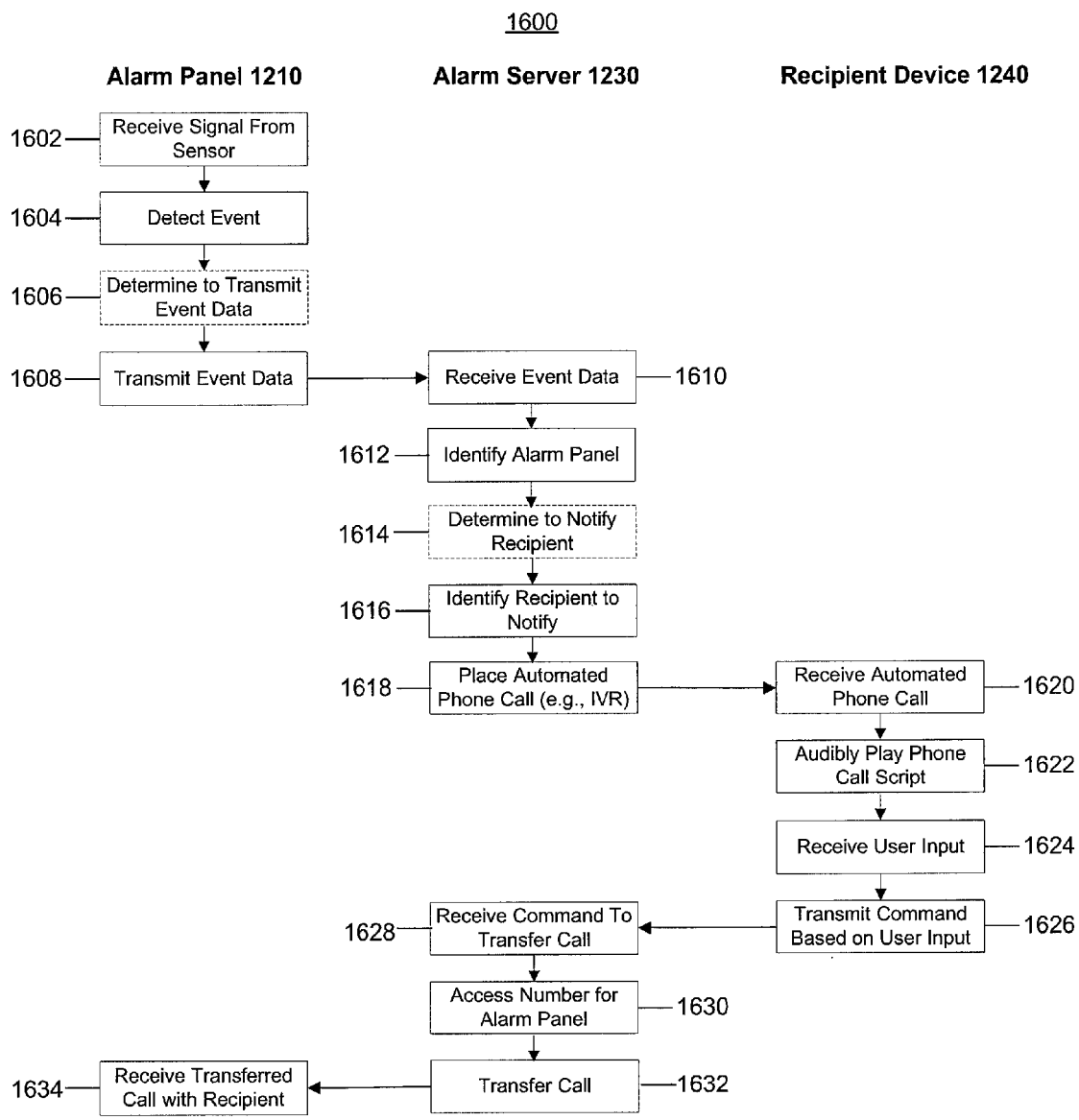

FIG. 16 illustrates another example of a process 1600 for establishing a voice communication session between an alarm system and a notification recipient. For convenience, particular components described with respect to FIG. 12 are referenced as performing the process 1600. However, similar methodologies may be applied in other implementations where different components are used to define the structure of the system, or where the functionality is distributed differently among the components.

The alarm panel 1210 receives a signal from the sensor 1220 (1602), detects an event based on the signal (1604), optionally, determines whether or not to transmit event data associated with the detected event (1606), and transmits event data to the alarm server 1230 (1608). For example, the alarm panel 1210 receives a signal from the sensor 1220, detects an event based on the signal, optionally, determines whether or not to transmit event data associated with the detected event, and transmits event data to the alarm server using techniques similar to those described above with respect to steps 1302, 1304, 1306, and 1308 shown in FIG. 13.

The alarm server 1230 receives the event data from the wireless communication module 1214 (1610), identifies the alarm panel 1210 (1612), optionally, determines whether to notify a recipient based on the event associated with the event data (1614), and identifies a recipient to notify (1616). For example, the alarm server 1230 receives the event data from the wireless communication module 1214, identifies the alarm panel 1210, optionally, determines whether to notify a recipient based on the event associated with the event data, and identifies a recipient to notify using techniques similar to those described above with respect to steps 1310, 1312, 1314, and 1316 shown in FIG. 13.

The alarm server 1230 places an automated phone call to the recipient device 1240 (1618). For example, the alarm server 1230 places an automated phone call to the recipient device 1240 using techniques similar to those described above with respect to step 1418 shown in FIG. 14.

The recipient device 1240 receives the automated phone call (1620), audibly plays the phone call script to the recipient (1622), receives user input (1624), and transmits a command based on the user input (1626). The command may be a command to transfer the automated phone call to the alarm panel 1210 to establish a voice communication session between the recipient device 1240 and the alarm panel 1210 using the transferred phone call. The recipient device 1240 may receive the automated phone call, audibly play the phone call script to the recipient, receive user input, and transmit a command based on the user input using techniques similar to those described above with respect to steps 1420, 1422, 1424, and 1426 shown in FIG. 14.

The alarm server 1230 receives the command to transfer the voice call with the recipient device 1240 to the alarm panel 1210 (1628). For instance, the alarm server 1230 receives the command using techniques similar to those described above with respect to step 1336 shown in FIG. 13.

In response to receiving the command to transfer the voice call with the recipient device 1240 to the alarm panel 1210, the alarm server 1230 accesses a telephone number for the alarm panel 1210 (1630) and transfer the call with the recipient device 1240 to the alarm panel 1210 (1632). For example, the alarm server 1230 accesses, from electronic storage, a telephone number for the alarm panel 1210 and transfers the call with the recipient device 1240 to the accessed telephone number. In this example, because the call to the alarm panel 1210 is being transferred from the alarm server 1230 and the alarm server 1230 is a trusted device, the alarm panel 1210 may assume the call is authentic and accept the call. In some implementations, the alarm panel 1210 may be configured to only accept calls from the alarm server 1230. In these implementations, the alarm panel 1210 may ignore calls that are not transferred or placed by the alarm server 1230 to prevent unauthorized calls from being received.

The alarm panel 1210 receives the transferred call with the recipient device 1240 (1634). For example, the alarm panel 1210 receives the transferred call with the recipient device 1240 over a wireless data channel. By receiving the transferred call previously connected with the recipient device 1240, the alarm panel 1210 establishes a two-way voice communication session with the recipient device 1240.

Figure 17:
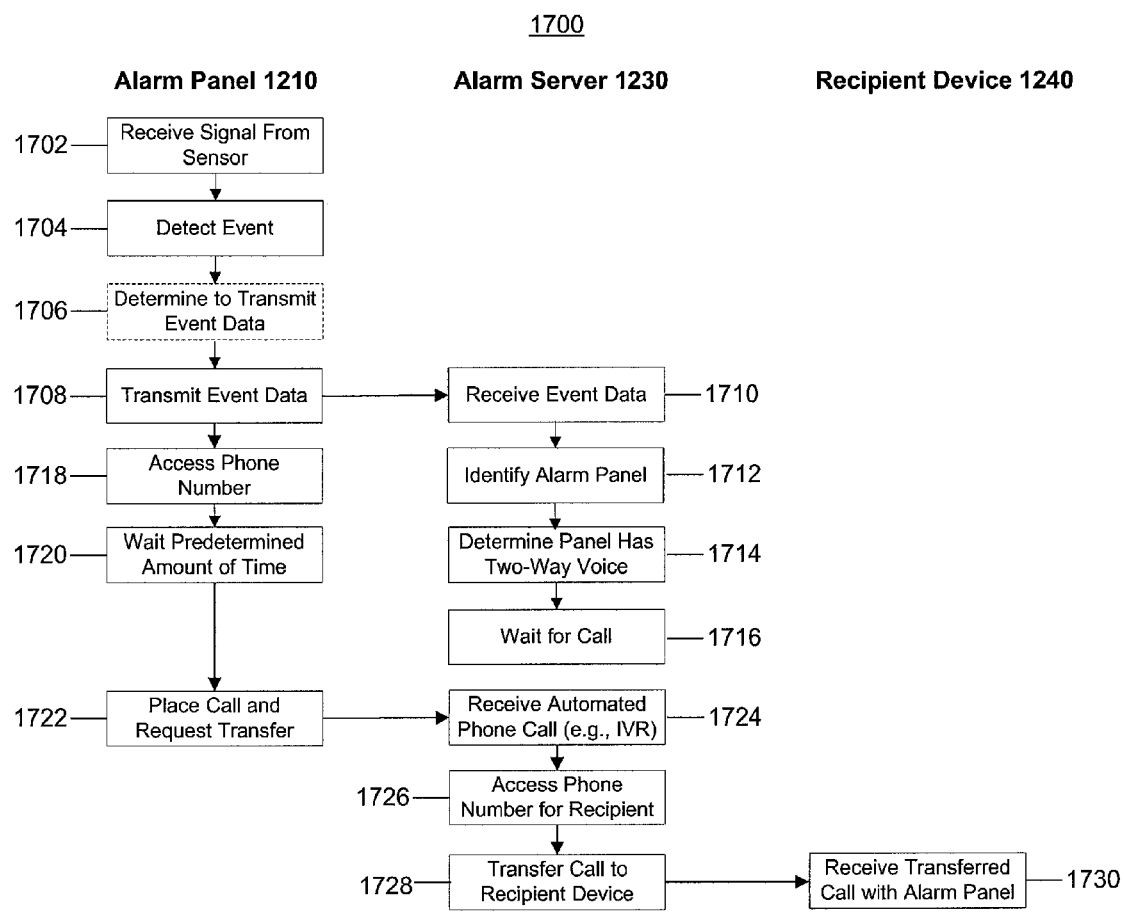

FIG. 17 illustrates another example of a process 1700 for establishing a voice communication session between an alarm system and a notification recipient. For convenience, particular components described with respect to FIG. 12 are referenced as performing the process 1700. However, similar methodologies may be applied in other implementations where different components are used to define the structure of the system, or where the functionality is distributed differently among the components.

The alarm panel 1210 receives a signal from the sensor 1220 (1702), detects an event based on the signal (1704), optionally, determines whether or not to transmit event data associated with the detected event (1706), and transmits event data to the alarm server 1230 (1708). For example, the alarm panel 1210 receives a signal from the sensor 1220, detects an event based on the signal, optionally, determines whether or not to transmit event data associated with the detected event, and transmits event data to the alarm server using techniques similar to those described above with respect to steps 1302, 1304, 1306, and 1308 shown in FIG. 13.

The alarm server 1230 receives the event data from the wireless communication module 1214 (1710) and identifies the alarm panel 1210 (1712). For example, the alarm server 1230 receives the event data from the wireless communication module 1214 and identifies the alarm panel 1210 using techniques similar to those described above with respect to steps 1310 and 1312 shown in FIG. 13.

The alarm server 1230 determines whether the alarm panel 1210 has a two-way voice feature (1714). For example, the monitoring system 1230 processes the event data to determine whether the alarm panel 1210 associated with the alarm data has a two-way voice feature. In some implementations, the event data may include information indicating whether the alarm panel 1210 associated with the alarm data has a two-way voice feature. In these implementations, a code or part of an account number included in the event data may indicate whether the alarm panel 1210 associated with the alarm data has a two-way voice feature and the alarm server 1230 may determine whether the alarm panel 1210 has a two-way voice feature by extracting the code or part of the account number and comparing the code or part of the account number to known information. In other implementations, the alarm server 1230 may access, from electronic storage associated with the alarm server 1230, information indicating whether the identified alarm panel has a two-way voice feature. In some examples, the alarm server 1230 may determine a model number associated with the alarm panel 1210 and access information indicating whether alarm panels with that model number have a two-way feature. In other examples, the alarm server 1230 may access information associated with the customer using the alarm panel 1210 and determine whether the customer has subscribed for monitoring services that include a two-way voice feature.

In response to determining that the alarm panel 1210 has a two-way voice feature, the alarm server 1230 waits for a call from the alarm panel 1210 (1716). For instance, the alarm server 1230 delays processing of the event data and monitors incoming calls for calls from the alarm panel 1210.

The alarm panel 1210 accesses a phone number associated with the alarm server 1230 (1718), waits a predetermined and configurable amount of time (1720), and places a call to the alarm server 1230 (1722). For example, the alarm panel 1210 accesses, from electronic storage, a phone number associated with the alarm server 1230 and waits a predetermined and configurable amount of time prior to placing a call to the alarm server 1230. In this example, the predetermined amount of time is an amount of time sufficient for the alarm server 1230 to receive the event and wait for the call from the alarm panel 1210. After waiting the predetermined amount of time, the alarm panel 1210 places a call to the alarm server 1230 and requests transfer of the call to a notification recipient.

The alarm server 1230 receives an automated phone call from the alarm panel 1210 (1724). For example, the alarm server 1230 receives a wireless voice call placed by the wireless communication module 1214 over a wireless voice channel and routed to the alarm server 1230 by a wireless service provider associated with the wireless communication module 1214. In response to receiving the call, the alarm server 1230 identifies the call as being from the alarm panel 1210 and determines to transfer the call to the recipient device 1240.

The alarm server accesses a phone number for the recipient device 1240 (1726) and transfers the call to the recipient device 1240 (1728). For example, the alarm server accesses a phone number for the recipient device 1240 and transfers the call to the recipient device 1240 using techniques similar to those described above with respect to steps 1630 and 1632 shown in FIG. 16.

The recipient device 1240 receives, from the alarm server 1230, the transferred call with the alarm panel 1210 (1730). For example, the recipient device receives the transferred call and establishes a two-way voice communication session with the alarm panel 1210. The recipient device 1240 may receive, from the alarm server 1230, the transferred call with the alarm panel 1210 using techniques similar to those described above with respect to step 1634 shown in FIG. 16.

Figure 18:
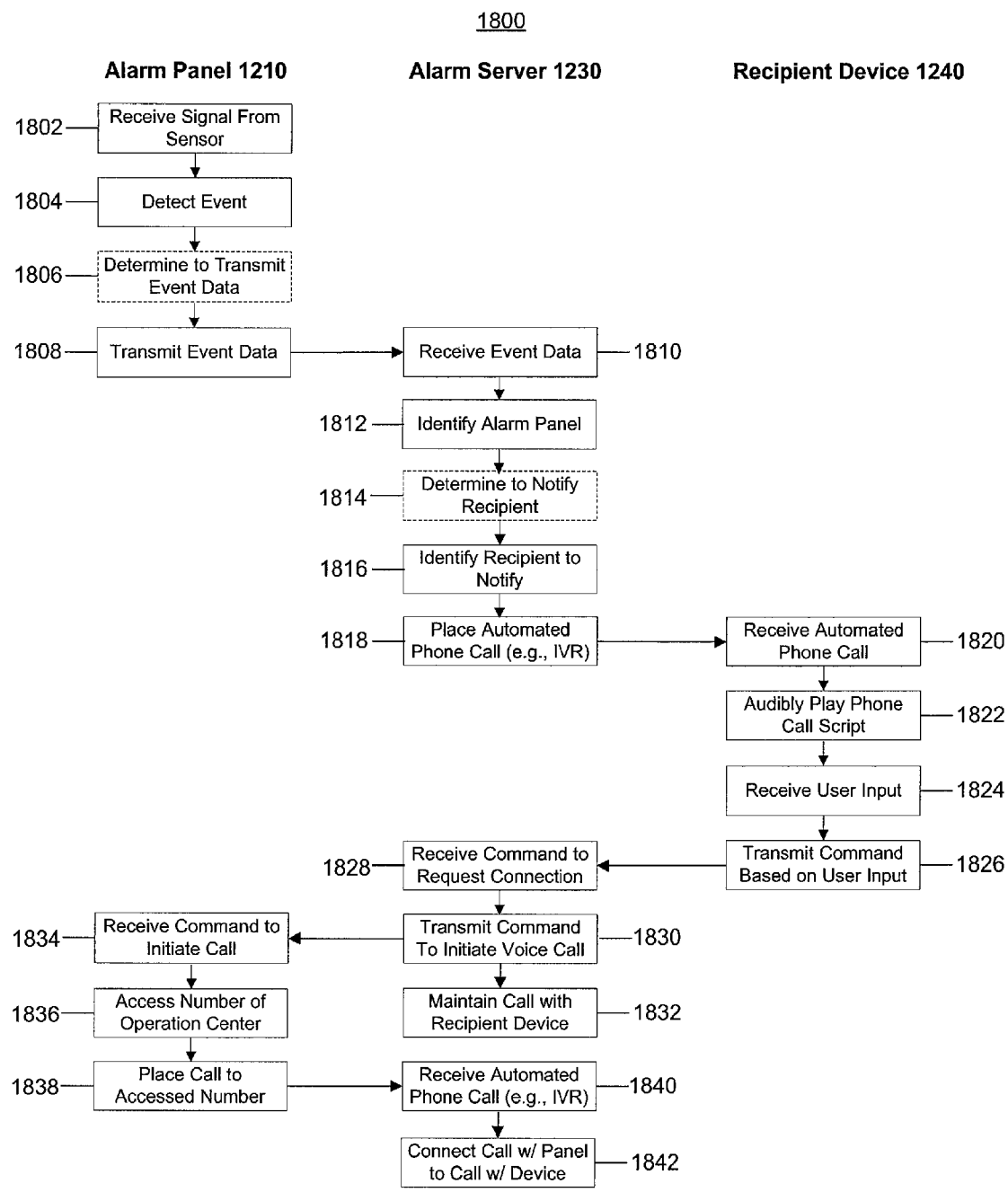

FIG. 18 illustrates a further example of a process 1800 for establishing a voice communication session between an alarm system and a notification recipient. For convenience, particular components described with respect to FIG. 12 are referenced as performing the process 1800. However, similar methodologies may be applied in other implementations where different components are used to define the structure of the system, or where the functionality is distributed differently among the components.

The alarm panel 1210 receives a signal from the sensor 1220 (1802), detects an event based on the signal (1804), optionally, determines whether or not to transmit event data associated with the detected event (1806), and transmits event data to the alarm server 1230 (1808). For example, the alarm panel 1210 receives a signal from the sensor 1220, detects an event based on the signal, optionally, determines whether or not to transmit event data associated with the detected event, and transmits event data to the alarm server using techniques similar to those described above with respect to steps 1302, 1304, 1306, and 1308 shown in FIG. 13.

The alarm server 1230 receives the event data from the wireless communication module 1214 (1810), identifies the alarm panel 1210 (1812), optionally, determines whether to notify a recipient based on the event associated with the event data (1814), and identifies a recipient to notify (1816). For example, the alarm server 1230 receives the event data from the wireless communication module 1214, identifies the alarm panel 1210, optionally, determines whether to notify a recipient based on the event associated with the event data, and identifies a recipient to notify using techniques similar to those described above with respect to steps 1310, 1312, 1314, and 1316 shown in FIG. 13.

The alarm server 1230 places an automated phone call to the recipient device 1240 (1818). For example, the alarm server 1230 places an automated phone call to the recipient device 1240 using techniques similar to those described above with respect to step 1418 shown in FIG. 14.

The recipient device 1240 receives the automated phone call (1820), audibly plays the phone call script to the recipient (1822), receives user input (1824), and transmits a command based on the user input (1826). The command may be a command to establish a voice communication session between the recipient device 1240 and the alarm panel 1210. The recipient device 1240 may receive the automated phone call, audibly play the phone call script to the recipient, receive user input, and transmit a command based on the user input using techniques similar to those described above with respect to steps 1420, 1422, 1424, and 1426 shown in FIG. 14.

The alarm server 1230 receives the command to establish a voice communication session between the recipient device 1240 and the alarm panel 1210 (1828) and transmits a command for the alarm panel 1210 to initiate a voice call to the alarm server 1230 (1830). For instance, the alarm server 1230 receives the command to establish a voice communication session between the recipient device 1240 and the alarm panel 1210 and transmits a command for the alarm panel 1210 to initiate a voice call to the alarm server 1230 using techniques similar to those described above with respect to steps 1336 and 1338 shown in FIG. 13.

The alarm server 1230 maintains connection of the call between the alarm server 1230 and the recipient device 1240 (1832). For instance, the alarm server 1230 places the call with the recipient device 1240 on hold and maintains the connection with the recipient device 1240. In some implementations, the alarm server 1230 may store information indicating that the maintained call should be connected with a call from the alarm panel 1210 if a call from the alarm panel 1210 is received.

The alarm panel 1210 receives the command for the alarm panel 1210 to initiate a voice call to the alarm server 1230 (1834), accesses a telephone number for the alarm server 1230 (1836), and places a call to the accessed number (1838). For example, the alarm panel 1210 receives the command for the alarm panel 1210 to initiate a voice call to the alarm server 1230, accesses a telephone number for the alarm server 1230, and places a call to the accessed number using techniques similar to those described above with respect to steps 1340, 1342, and 1344 shown in FIG. 13.

The alarm server 1230 receives an automated phone call from the alarm panel 1210 (1840) and connects the call with the alarm panel 1210 to the call maintained with the recipient device 1240 (1842). For example, the alarm server 1230 receives the wireless voice call placed by the wireless communication module 1214 over a wireless voice channel and routed to the alarm server 1230 by a wireless service provider associated with the wireless communication module 1214. In response to receiving the call, the alarm server 1230 identifies the call as being from the alarm panel 1210 and determines to connect the call received from the alarm panel 1210 with the call maintained with the recipient device 1240. The alarm server 1230 may establish a two-way voice communication session between the alarm panel 1210 and the recipient device 1240 by connecting the call with the alarm panel 1210 to the call with the recipient device 1240. By connecting the two calls, the notification recipient may use the recipient device 1240 to listen-in to an area proximate to the alarm panel 1210 and communicate with people in the area proximate to the alarm panel 1210.

In some implementations, an alarm panel supplies, and may be the only supply of, power to a wireless communication module included in the alarm panel. In these implementations, the alarm panel may control power supplied to the wireless communication module to assure that operation of the wireless communication module does not run down a battery (e.g., a backup battery) of the alarm panel. For example, in the event that AC power supply to the alarm panel is lost, the alarm panel may operate based on a backup battery and may disable voice communication operations of the wireless communication module to preserve power in the backup battery. In this example, if the alarm panel determines that operation of the voice component of the alarm application will draw an undue amount of power, the alarm panel may disable the capability of establishing two-way voice communication sessions with a monitoring station and/or notification recipients. By disabling voice communication operations, the alarm panel preserves battery power to perform other, perhaps more essential, operations including the sending of alarm data.

In implementations in which the alarm panel controls power supplied to the wireless communication module, the alarm data transmitted by the alarm panel may include information indicating whether the wireless communication module is operating at the time the alarm data is transmitted. For example, the alarm data may include a bit indicating the current state of the wireless communication module and an alarm server or monitoring system may analyze that bit to determine whether to anticipate a call from the wireless communication module. In this example, if the bit is set to high, the alarm server or monitoring system may determine that the wireless communication module is currently operating and process the alarm data in anticipation of a call with the alarm panel (e.g., wait for a call from the wireless communication module, place a call to the wireless communication module, etc.). If the bit is set to low, the alarm server or monitoring system may determine that the wireless communication module is not currently operating and process the alarm data without anticipating a call (e.g., immediately process the alarm data without waiting for a call from the wireless communication module, not place a call to the wireless communication module, etc.).

In further implementations, an alarm system may perform digital conversion of microphone and speaker input and output signals to enable the use of analog alarm system components with a digital wireless (e.g., cellular) communicator in establishing two-way voice communication sessions. For instance, the alarm system may convert analog voice signals received from a microphone to digital voice signals and transmit the digital voice signals over a wireless channel configured to transport digital voice signals. The digital signals may include a series of IP packets that are transmitted over a wireless channel configured to provide VoIP services. The alarm system also may convert digital voice signals received by the digital wireless communicator to analog voice signals and output the analog voice signals using a speaker. Wireless channels configured to transmit digital data may be used to establish voice communication sessions.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method of coordinating establishment of a voice communication session between an alarm system and an operator handling an alarm event for the alarm system, the method comprising:
   receiving alarm data that is transmitted over a wireless data channel by a wireless communication module included in an alarm system in response to the alarm system detecting an alarm event, the alarm data indicating the alarm event;
   in response to receiving the alarm data:
      enabling an operator at a monitoring station to handle the alarm event;
      identifying a number that is available for the operator handling the alarm event to receive a wireless voice call; and
      sending, over the wireless data channel to the wireless communication module, the identified number to enable the wireless communication module to place a wireless voice call, over a wireless voice channel that is decoupled from the wireless data channel, to the identified number; and
   coordinating establishment of a voice communication session, over the wireless voice channel, between a communication device used by the operator handling the alarm event and the wireless communication module included in the alarm system by enabling the wireless voice call to be routed, at the monitoring station, to the communication device used by the operator handling the alarm event.

2. The method of claim 1 wherein:
   the alarm system is a security system installed in a building, the security system being configured to receive a signal from at least one sensor and detect an alarm event based on the received signal, and
   coordinating establishment of the voice communication session, over the wireless voice channel, between the communication device used by the operator handling the alarm event and the wireless communication module included in the alarm system includes coordinating establishment of a voice communication session with the security system to enable the operator to listen in on an area in the building and communicate with a person who is in the area in the building.

3. The method of claim 1 wherein enabling the wireless voice call to be routed, at the monitoring station, to the communication device used by the operator handling the alarm event comprises sending, to the monitoring station, an electronic communication that includes data that enables the monitoring station to associate an incoming call placed to the identified number with the alarm data.

4. The method of claim 3 wherein sending, to the monitoring station, an electronic communication that includes data that enables the monitoring station to associate an incoming call placed to the identified number with the alarm data comprises sending, to the monitoring station, an electronic communication that includes data that enables identification of an incoming call identifier temporarily assigned to the alarm system.

5. The method of claim 1 wherein sending, over the wireless data channel to the wireless communication module, the identified number comprises sending, over the wireless data channel to the wireless communication module, a confirmation message that indicates receipt of the alarm data and that includes the identified number, the communication module included in the alarm system being configured to place the voice call to the identified number included with the confirmation message in response to receiving the confirmation message.

6. The method of claim 1 wherein sending, over the wireless data channel to the wireless communication module, the identified number comprises sending, over the wireless data channel to the wireless communication module, a command to initiate a voice call to the monitoring station that includes the identified number, the communication module included in the alarm system being configured to place the voice call to the identified number in response to receiving the command.

7. The method of claim 1 wherein:
the wireless data channel is a GSM/GPRS data channel; and
the wireless voice channel is a GSM voice channel.

8. The method of claim 1 wherein:
the alarm data is transmitted by the wireless communication module as Internet Protocol packets over a wireless data channel configured to transport Internet Protocol packets, and
the voice communication session includes exchanging cellular voice communications over a wireless voice channel configured to transport cellular voice communications.

9. The method of claim 1 wherein:
the alarm data is transmitted by the wireless communication module as a Short Message Service (SMS) message over a wireless data channel configured to transport SMS messages, and
the voice communication session includes exchanging cellular voice communications over a wireless voice channel configured to transport cellular voice communications.

10. A method of coordinating establishment of a voice communication session between an alarm system and an operator handling an alarm event for the alarm system, the method comprising:
receiving alarm data over a data communication channel, the alarm data being transmitted by a communication module included in an alarm system in response to the alarm system detecting an alarm event and the alarm data indicating the alarm event;
after receiving the alarm data over the data communication channel, receiving a voice call separate from the alarm data, the voice call being received from the communication module included in the alarm system over a voice communication channel that is decoupled from the data communication channel;
accessing, by a processor at a monitoring station, data that enables association of alarm information received over the data communication channel with voice calls received over the voice communication channel;
associating, at the monitoring station, the alarm data received over the data communication channel with the voice call received over the voice communication channel based on the accessed data that enables association of alarm information received over the data communication channel with voice calls received over the voice communication channel;
enabling an operator at the monitoring station to handle the alarm event; and
routing, at the monitoring station, the voice call to a communication device used by the operator handling the alarm event based on the association of the alarm data received over the data communication channel with the voice call received over the voice communication channel, thereby establishing a voice communication session, over the voice communication channel, between the communication device used by the operator handling the alarm event and the communication module included in the alarm system.

11. The method of claim 10:
wherein enabling an operator at the monitoring station to handle the alarm event comprises assigning an operator to process the alarm event and sending the alarm data to a device associated with the operator;
wherein accessing data that enables association of alarm information received over the data communication channel with voice calls received over the voice communication channel comprises:
identifying a number associated with the wireless communication module based on the voice call, and
accessing data that enables identification of alarm systems based on numbers associated with wireless communication modules;
wherein associating, at the monitoring station, the alarm data received over the data communication channel with the voice call received over the voice communication channel based on the accessed data that enables association of alarm information received over the data communication channel with voice calls received over the voice communication channel comprises:
identifying the voice call as being from the alarm system based on the identified number associated with the wireless communication module and the accessed data that enables identification of alarm systems based on numbers associated with wireless communication modules, and
identifying the operator assigned to process the alarm data associated with the alarm system; and
wherein routing, at the monitoring station, the voice call to a communication device used by the operator handling the alarm event based on the association of the alarm data received over the data communication channel with the voice call received over the voice communication channel comprises routing, at the monitoring station, the voice call to a communication device used by the identified operator assigned to process the alarm data associated with the alarm system.

12. The method of claim 11:
wherein accessing data that enables identification of alarm systems based on numbers associated with wireless communication modules comprises accessing data that enables identification of customer account numbers based on numbers associated with wireless communication modules;

wherein identifying the voice call as being from the alarm system based on the identified number associated with the wireless communication module and the accessed data that enables identification of alarm systems based on numbers associated with wireless communication modules comprises identifying the voice call as being from a customer account number associated with the alarm system based on the identified number associated with the wireless communication module and the accessed data that enables identification of customer account numbers based on numbers associated with wireless communication modules; and wherein identifying the operator assigned to process the alarm data associated with the alarm system comprises identifying the operator assigned to process the alarm data for the customer account number associated with the alarm system.

13. The method of claim 10, further comprising, in response to receiving the alarm data over the data communication channel, sending, over the data communication channel, a confirmation message indicating receipt of the alarm data, the communication module included in the alarm system being configured to place the voice call in response to receiving the confirmation message.

14. The method of claim 13, wherein sending, over the data communication channel, the confirmation message indicating receipt of the alarm data comprises sending, over the data communication channel, a confirmation message that includes a number that is available to receive a voice call, the communication module included in the alarm system being configured to place the voice call to the number included with the confirmation message.

15. The method of claim 14:
wherein receiving the voice call separate from the alarm data comprises receiving a voice call placed to the number included with the confirmation message;
wherein accessing data that enables association of alarm information received over the data communication channel with voice calls received over the voice communication channel comprises accessing data that associates the number included with the confirmation message with the alarm system; and
wherein associating, at the monitoring station, the alarm data received over the data communication channel with the voice call received over the voice communication channel based on the accessed data that enables association of alarm information received over the data communication channel with voice calls received over the voice communication channel comprises associating, at the monitoring station, the alarm data received over the data communication channel with the voice call received over the voice communication channel based on the accessed data that associates the number included with the confirmation message with the alarm system.

16. The method of claim 10, further comprising:
determining that the alarm system from which the alarm data was received has a two-way voice feature; and
in response to determining that the alarm system from which the alarm data was received has the two-way voice feature, holding the alarm data,
wherein associating, at the monitoring station, the alarm data received over the data communication channel with the voice call received over the voice communication channel based on the accessed data that enables association of alarm information received over the data communication channel with voice calls received over the voice communication channel comprises associating, at the monitoring station, the held alarm data received over the data communication channel with the voice call received over the voice communication channel, and
wherein enabling the operator at the monitoring station to handle the alarm event and routing, at the monitoring station, the voice call to a communication device used by the operator handling the alarm event comprises, in response to associating the held alarm data received over the data communication channel with the voice call received over the voice communication channel, identifying an available operator and routing the held alarm data and the voice call to the available operator.

17. The method of claim 16, wherein holding the alarm data comprises, when a call from the wireless communication module included in the alarm system is not received in a predetermined and configurable amount of time, initiating processing of the alarm data.

18. The method of claim 16 wherein holding the alarm data comprises, when a call from the wireless communication module included in the alarm system is not received in a predetermined and configurable amount of time, sending, to the wireless communication module included in the alarm system, a command indicating that the monitoring station is waiting to receive a voice call.

19. The method of claim 10, further comprising:
determining that the alarm system from which the alarm data was received has a two-way voice feature; and
in response to determining that the alarm system from which the alarm data was received has the two-way voice feature, transmitting a command to initiate a voice call to the monitoring station.

20. The method of claim 19, wherein transmitting the command to initiate a voice call to the monitoring station comprises transmitting a command that includes a number that is available to receive a voice call, the communication module included in the alarm system being configured to place the voice call to the number included with the command.

21. The method of claim 20:
wherein receiving the voice call separate from the alarm data comprises receiving a voice call placed to the number included with the command;
wherein accessing data that enables association of alarm information received over the data communication channel with voice calls received over the voice communication channel comprises accessing data that associates the number included with the command with the alarm system; and
wherein associating, at the monitoring station, the alarm data received over the data communication channel with the voice call received over the voice communication channel based on the accessed data that enables association of alarm information received over the data communication channel with voice calls received over the voice communication channel comprises associating, at the monitoring station, the alarm data received over the data communication channel with the voice call received over the voice communication channel based on the accessed data that associates the number included with the command with the alarm system.

22. The method of claim 10:
wherein accessing data that enables association of alarm information received over the data communication channel with voice calls received over the voice communication channel comprises accessing data that enables identification of an incoming call identifier temporarily assigned to the alarm system; and wherein associating, at the monitoring station, the alarm data received over the data communication channel with the voice call received over the voice communication channel based on the accessed data that enables association of alarm information received over the data communication channel with voice calls received over the voice communication channel comprises associating, at the monitoring station, the alarm data received over the data communication channel with the voice call received over the voice communication channel based on the accessed data that enables identification of the incoming call identifier temporarily assigned to the alarm system.

23. The method of claim 22:
wherein accessing data that enables identification of the incoming call identifier temporarily assigned to the alarm system comprises receiving, from an intermediary alarm server, an electronic communication that includes data that enables identification of an incoming call identifier temporarily assigned to the alarm system; and wherein associating, at the monitoring station, the alarm data received over the data communication channel with the voice call received over the voice communication channel based on the accessed data that enables identification of the incoming call identifier temporarily assigned to the alarm system comprises associating, at the monitoring station, the alarm data received over the data communication channel with the voice call received over the voice communication channel based on the received electronic communication that includes data that enables identification of the incoming call identifier temporarily assigned to the alarm system.

24. The method of claim 22 wherein associating, at the monitoring station, the alarm data received over the data communication channel with the voice call received over the voice communication channel based on the accessed data that enables identification of the incoming call identifier temporarily assigned to the alarm system comprises monitoring for a voice call received at an incoming call port associated with the incoming call identifier temporarily assigned to the alarm system.

25. The method of claim 10 wherein:
the data communication channel is a wireless data channel; and
the voice communication channel is a wireless voice channel.

26. The method of claim 25 wherein:
the wireless data channel is a GSM/GPRS data channel; and
the wireless voice channel is a GSM voice channel.

27. The method of claim 25 wherein:
the alarm data is transmitted by the wireless communication module as Internet Protocol packets over a wireless data channel configured to transport Internet Protocol packets, and
the voice communication session includes exchanging cellular voice communications over a wireless voice channel configured to transport cellular voice communications.

28. The method of claim 25 wherein:
the alarm data is transmitted by the wireless communication module as a Short Message Service (SMS) message over a wireless data channel configured to transport SMS messages, and
the voice communication session includes exchanging cellular voice communications over a wireless voice channel configured to transport cellular voice communications.

29. The method of claim 10 wherein:
the alarm system is a security system installed in a building, the security system being configured to receive a signal from at least one sensor and detect an alarm event based on the received signal; and
establishing the voice communication session, over the voice communication channel, between the communication device used by the operator handling the alarm event and the communication module included in the alarm system includes establishing a voice communication session with the communication module included in the security system that enables the operator to listen in on an area in the building proximate to the at least one sensor and that enables the operator to communicate with a person who is in an area in the building proximate to the at least one sensor.

30. An alarm server comprising:
at least one processor; and
at least one computer-readable storage medium coupled to the at least one processor having stored thereon instructions which, when executed by the at least one processor, causes the at least one processor to perform operations comprising:
receiving alarm data that is transmitted over a wireless data channel by a wireless communication module included in an alarm system in response to the alarm system detecting an alarm event, the alarm data indicating the alarm event;
in response to receiving the alarm data:
enabling an operator at a monitoring station to handle the alarm event;
identifying a number that is available for the operator handling the alarm event to receive a wireless voice call; and
sending, over the wireless data channel to the wireless communication module, the identified number to enable the wireless communication module to place a wireless voice call, over a wireless voice channel that is decoupled from the wireless data channel, to the identified number; and
coordinating establishment of a voice communication session, over the wireless voice channel, between a communication device used by the operator handling the alarm event and the wireless communication module included in the alarm system by enabling the wireless voice call to be routed, at the monitoring station, to the communication device used by the operator handling the alarm event.

31. The alarm server of claim 30 wherein:
the alarm system is a security system installed in a building, the security system being configured to receive a signal from at least one sensor and detect an alarm event based on the received signal, and
coordinating establishment of the voice communication session, over the wireless voice channel, between the communication device used by the operator handling the alarm event and the wireless communication module included in the alarm system includes coordinating establishment of a voice communication session with the security system to enable the operator to listen in on an area in the building and communicate with a person who is in the area in the building.

32. The alarm server of claim 30 wherein enabling the wireless voice call to be routed, at the monitoring station, to the communication device used by the operator handling the alarm event comprises sending, to the monitoring station, an electronic communication that includes data that enables the monitoring station to associate an incoming call placed to the identified number with the alarm data.

33. The alarm server of claim 30 wherein sending, to the monitoring station, an electronic communication that includes data that enables the monitoring station to associate an incoming call placed to the identified number with the alarm data comprises sending, to the monitoring station, an electronic communication that includes data that enables identification of an incoming call identifier temporarily assigned to the alarm system.

34. An alarm server comprising:
at least one processor; and
at least one computer-readable storage medium coupled to the at least one processor having stored thereon instructions which, when executed by the at least one processor, causes the at least one processor to perform operations comprising:
receiving alarm data over a data communication channel, the alarm data being transmitted by a communication module included in an alarm system in response to the alarm system detecting an alarm event and the alarm data indicating the alarm event;
after receiving the alarm data over the data communication channel, receiving a voice call separate from the alarm data, the voice call being received from the communication module included in the alarm system over a voice communication channel that is decoupled from the data communication channel;
accessing, by a processor at a monitoring station, data that enables association of alarm information received over the data communication channel with voice calls received over the voice communication channel;
associating, at the monitoring station, the alarm data received over the data communication channel with the voice call received over the voice communication channel based on the accessed data that enables association of alarm information received over the data communication channel with voice calls received over the voice communication channel;
enabling an operator at the monitoring station to handle the alarm event; and
routing, at the monitoring station, the voice call to a communication device used by the operator handling the alarm event based on the association of the alarm data received over the data communication channel with the voice call received over the voice communication channel, thereby establishing a voice communication session, over the voice communication channel, between the communication device used by the operator handling the alarm event and the communication module included in the alarm system.

35. The alarm server of claim 34:
wherein enabling an operator at the monitoring station to handle the alarm event comprises assigning an operator to process the alarm event and sending the alarm data to a device associated with the operator;
wherein accessing data that enables association of alarm information received over the data communication channel with voice calls received over the voice communication channel comprises:
identifying a number associated with the wireless communication module based on the voice call, and
accessing data that enables identification of alarm systems based on numbers associated with wireless communication modules;
wherein associating, at the monitoring station, the alarm data received over the data communication channel with the voice call received over the voice communication channel based on the accessed data that enables association of alarm information received over the data communication channel with voice calls received over the voice communication channel comprises:
identifying the voice call as being from the alarm system based on the identified number associated with the wireless communication module and the accessed data that enables identification of alarm systems based on numbers associated with wireless communication modules, and
identifying the operator assigned to process the alarm data associated with the alarm system; and
wherein routing, at the monitoring station, the voice call to a communication device used by the operator handling the alarm event based on the association of the alarm data received over the data communication channel with the voice call received over the voice communication channel comprises routing, at the monitoring station, the voice call to a communication device used by the identified operator assigned to process the alarm data associated with the alarm system.

36. The alarm server of claim 34, wherein the operations further comprise, in response to receiving the alarm data over the data communication channel, sending, over the data communication channel, a confirmation message indicating receipt of the alarm data that includes a number that is available to receive a voice call, the communication module included in the alarm system being configured to place the voice call to the number included with the confirmation message in response to receiving the confirmation message,
wherein receiving the voice call separate from the alarm data comprises receiving a voice call placed to the number included with the confirmation message;
wherein accessing data that enables association of alarm information received over the data communication channel with voice calls received over the voice communication channel comprises accessing data that associates the number included with the confirmation message with the alarm system; and
wherein associating, at the monitoring station, the alarm data received over the data communication channel with the voice call received over the voice communication channel based on the accessed data that enables association of alarm information received over the data communication channel with voice calls received over the voice communication channel comprises associating, at the monitoring station, the alarm data received over the data communication channel with the voice call received over the voice communication channel based on the accessed data that associates the number included with the confirmation message with the alarm system.

37. The alarm server of claim 34, wherein the operations further comprise:
determining that the alarm system from which the alarm data was received has a two-way voice feature; and
in response to determining that the alarm system from which the alarm data was received has the two-way voice feature, transmitting a command to initiate a voice call to the monitoring station that includes a number that is available to receive a voice call, the communication module included in the alarm system being configured to place the voice call to the number included with the command, wherein receiving the voice call separate from the alarm data comprises receiving a voice call placed to the number included with the command;

wherein accessing data that enables association of alarm information received over the data communication channel with voice calls received over the voice communication channel comprises accessing data that associates the number included with the command with the alarm system; and wherein associating, at the monitoring station, the alarm data received over the data communication channel with the voice call received over the voice communication channel based on the accessed data that enables association of alarm information received over the data communication channel with voice calls received over the voice communication channel comprises associating, at the monitoring station, the alarm data received over the data communication channel with the voice call received over the voice communication channel based on the accessed data that associates the number included with the command with the alarm system.

38. The alarm server of claim 34:

wherein accessing data that enables association of alarm information received over the data communication channel with voice calls received over the voice communication channel comprises accessing data that enables identification of an incoming call identifier temporarily assigned to the alarm system; and wherein associating, at the monitoring station, the alarm data received over the data communication channel with the voice call received over the voice communication channel based on the accessed data that enables association of alarm information received over the data communication channel with voice calls received over the voice communication channel comprises associating, at the monitoring station, the alarm data received over the data communication channel with the voice call received over the voice communication channel based on the accessed data that enables identification of the incoming call identifier temporarily assigned to the alarm system.

39. The alarm server of claim 38:

wherein accessing data that enables identification of the incoming call identifier temporarily assigned to the alarm system comprises receiving, from an intermediary alarm server, an electronic communication that includes data that enables identification of an incoming call identifier temporarily assigned to the alarm system; and wherein associating, at the monitoring station, the alarm data received over the data communication channel with the voice call received over the voice communication channel based on the accessed data that enables identification of the incoming call identifier temporarily assigned to the alarm system comprises associating, at the monitoring station, the alarm data received over the data communication channel with the voice call received over the voice communication channel based on the received electronic communication that includes data that enables identification of the incoming call identifier temporarily assigned to the alarm system.

\* \* \* \* \*